US010171280B2

(12) United States Patent
Limberg

(10) Patent No.: US 10,171,280 B2
(45) Date of Patent: Jan. 1, 2019

(54) DOUBLE-SIDEBAND COFDM SIGNAL RECEIVERS THAT DEMODULATE UNFOLDED FREQUENCY SPECTRUM

(71) Applicant: Allen LeRoy Limberg, Port Charlotte, FL (US)

(72) Inventor: Allen LeRoy Limberg, Port Charlotte, FL (US)

( * ) Notice: Subject to any disclaimer, the term of this patent is extended or adjusted under 35 U.S.C. 154(b) by 0 days.

(21) Appl. No.: 15/641,014

(22) Filed: Jul. 3, 2017

(65) Prior Publication Data
US 2018/0034677 A1 Feb. 1, 2018

Related U.S. Application Data

(60) Provisional application No. 62/369,568, filed on Aug. 1, 2016, provisional application No. 62/373,875, filed on Aug. 11, 2016, provisional application No. 62/379,109, filed on Aug. 24, 2016, provisional application No. 62/383,048, filed on Sep. 2, 2016,
(Continued)

(51) Int. Cl.
*H04L 27/26* (2006.01)
*H04B 7/12* (2006.01)
*H04L 27/38* (2006.01)
*H04L 1/00* (2006.01)
(Continued)

(52) U.S. Cl.
CPC ........... *H04L 27/2698* (2013.01); *H04B 7/12* (2013.01); *H04L 1/005* (2013.01); *H04L 1/0054* (2013.01); *H04L 1/0058* (2013.01); *H04L 25/03159* (2013.01); *H04L 27/0002* (2013.01);
(Continued)

(58) Field of Classification Search
CPC . H04L 27/2698; H04L 27/2649; H04L 27/38; H04L 1/0054; H04L 27/0002; H04L 25/03159; H04L 1/005; H04L 1/0058; H04L 1/0071; H04B 7/12
See application file for complete search history.

(56) References Cited

U.S. PATENT DOCUMENTS

2007/0092018 A1* 4/2007 Fonseka ................ H04L 1/0054
375/265
2007/0110020 A1* 5/2007 Kroeger ................ H04H 20/30
370/343
(Continued)

*Primary Examiner* — Syed Haider

(57) ABSTRACT

Prior-art receivers for double-sideband coded orthogonal frequency-division modulation (COFDM) signal, such as receivers for digital television (DTV) broadcasting, have folded the frequency spectrum in half by synchrodyne to baseband before discrete Fourier transform (DFT) and demapping quadrature amplitude-modulation (QAM) of COFDM signal subcarriers, thus to improve signal-to-noise ratio by 6 dB. Single-sideband or independent-sideband COFDM receivers that perform DFT and demapping of QAM of COFDM signal subcarriers in an unfolded frequency spectrum can improve signal-to-noise ratio by 8.5 dB by maximal-ratio combining bits of demapping results. Such improvement is achieved even when such a receiver is arranged for receiving a DSB-COFDM signal, in which double-sideband signal the frequency spectra of the lower and upper sidebands mirror each other. Reception range is increased by about a third over that of receivers which fold the frequency in half during synchrodyne to baseband. Such increase in reception range is particularly important for DTV receivers using indoor antennas.

30 Claims, 19 Drawing Sheets

Related U.S. Application Data provisional application No. 62/384,913, filed on Sep. 8, 2016, provisional application No. 62/396,566, filed on Sep. 19, 2016, provisional application No. 62/403,762, filed on Oct. 4, 2016, provisional application No. 62/415,810, filed on Nov. 1, 2016, provisional application No. 62/488,793, filed on Apr. 23, 2017.

(51) Int. Cl.
*H04L 27/00* (2006.01)
*H04L 25/03* (2006.01)

(52) U.S. Cl.
CPC .......... *H04L 27/2649* (2013.01); *H04L 27/38* (2013.01); *H04L 1/0071* (2013.01)

(56) References Cited

U.S. PATENT DOCUMENTS

| | | | |
|---|---|---|---|
| 2010/0119016 A1* | 5/2010 | Ghosh | H04L 5/0058 375/340 |
| 2013/0115903 A1* | 5/2013 | Kroeger | H04B 7/0845 455/193.1 |
| 2014/0153625 A1* | 6/2014 | Vojcic | H04L 1/005 375/224 |
| 2014/0161209 A1* | 6/2014 | Limberg | H04L 5/0016 375/299 |
| 2015/0155948 A1* | 6/2015 | Chen | H04B 10/5165 398/188 |

* cited by examiner

US 10,171,280 B2

DOUBLE-SIDEBAND COFDM SIGNAL RECEIVERS THAT DEMODULATE UNFOLDED FREQUENCY SPECTRUM

This application claims the benefit of the filing dates of U.S. provisional Pat. App. 62/369,568 filed 1 Aug. 2016, of U.S. provisional Pat. App. 62/373,875 filed 11 Aug. 2016, of U.S. provisional Pat. App. 62/379,109 filed 24 Aug. 2016, of U.S. provisional Pat. App. 62/383,048 filed 2 Sep. 2016, of U.S. provisional Pat. App. 62/384,913 filed 8 Sep. 2016, of U.S. provisional Pat. App. 62/396,566 filed 19 Sep. 2016, of U.S. provisional Pat. App. 62/403,702 filed 4 Oct. 2016, of U.S. provisional Pat. App. 62/415,810 filed 1 Nov. 2016, and of U.S. provisional Pat. App. 62/488,793 filed 23 Apr. 2017.

FIELD OF THE INVENTION

The invention relates to receivers for double-sideband (DSB) coded orthogonal frequency-division modulation (COFDM) radio-frequency (RF) signals, such as receivers for digital television (DTV) broadcasting signals.

BACKGROUND OF THE INVENTION

DSB-COFDM RF signals have been used several years for over-the-air broadcasting of DTV in accordance with the DVB-T and DVB-T2 Standards for Digital Video Broadcasting in several countries other than the United States of America and Canada. DSB-COFDM RF signals are being broadcast in the United States of America in accordance with an ATSC 3.0 Standard developed by the Advanced Television Systems Committee, an industry-wide consortium of DTV broadcasters, manufacturers of DTV transmitter apparatus and manufacturers of DTV receiver apparatus.

Prior-art receivers for DSB COFDM RF signals, such as receivers for DTV broadcasting, have folded the frequency spectrum in half by synchrodyne to baseband before discrete Fourier transform (DFT) and demapping quadrature amplitude-modulation (QAM) of COFDM signal subcarriers, thus to improve signal-to-noise ratio (SNR) by 6 dB.

U.S. Pat. No. 7,236,548 titled "Bit level diversity combining for COFDM system" issued 26 Jun. 2007 to Monisha Ghosh, Joseph P. Meehan and Xuemei Ouyang described a novel way of combining of multiple-input/multiple-output DSB-COFDM television signals after they are each synchrodyned to baseband. These synchrodyning procedures fold the frequency spectra of the COFDM signals in half to halve the number of spectral component terms obtained from subsequent DFT procedures performed on each COFDM signal. These spectral component terms are quadrature-amplitude modulation (QAM) symbols in regard to each COFDM subcarrier. U.S. Pat. No. 7,236,548 concerned the signal-to-noise ratio (SNR) obtained during reception via an additive white Gaussian noise (AWGN) channel. A 6 DB improvement in SNR is obtained by maximal-ratio combining corresponding QAM symbols obtained from the respective DFT procedures performed on each of a pair of COFDM signals of equal strength, such maximal-ratio combining being performed before demapping the QAM symbols resulting from such combining. U.S. Pat. No. 7,236,548 advocates an alternative procedure in which corresponding QAM symbols obtained from the respective DFT procedures performed on each of a pair of COFDM signals of equal strength are demapped individually, followed by maximal-ratio combining of the corresponding demapping results being performed at bit level. This alternative procedure improves the effective SNR for reception via an AWGN channel by an additional 2.5 dB or so over the 6 dB expected from the doubling of received power.

No evidence is known suggesting that the U.S. Pat. No. 7,236,548 technique of maximal-ratio combining of the corresponding demapping results being performed at bit level was ever previously applied to the lower and upper sidebands of a single DSB-OFDM signal. No evidence is known that indicates specifically how to weight the corresponding results of demapping corresponding QAM symbols from the lower and upper sidebands of a single DSB-OFDM signal during diversity combining of them.

SUMMARY OF THE INVENTION

Single-sideband or independent-sideband COFDM receivers that do not fold the frequency spectrum before DFT and demapping of QAM of COFDM signal subcarriers improve signal-to-noise ratio by 8.5 dB for reception via an AWGN channel, this being done by maximal-ratio combining bits of dual demapping results. Such improvement is achieved even when such a receiver is arranged for receiving a DSB-COFDM signal, in which double-sideband signal the frequency spectra of the lower and upper sidebands mirror each other. Reception range is increased by about a third over that of receivers which fold the frequency in half during synchrodyne to baseband. Such increase in reception range is particularly important for DTV receivers using indoor antennas.

BRIEF DESCRIPTION OF THE DRAWINGS

FIGS. 13 and 10 together form a schematic diagram of a variant of the receiver apparatus for independent-sideband (ISB) demodulation of DSB-COFDM depicted in FIGS. 9 and 10, digital circuitry depicted in FIG. 13 replacing some of the analog circuitry depicted in FIG. 9.

FIGS. 16 and 10 together form a schematic diagram of the general structure of receiver apparatus for independent-sideband (ISB) demodulation of DSB-COFDM signals using novel modified phase-shift methods, which receiver apparatus embodies aspects of the invention.

FIGS. 17 and 10 together form a schematic diagram of a variant of the receiver apparatus for independent-sideband (ISB) demodulation of DSB-COFDM depicted in FIGS. 9 and 10, digital circuitry depicted in FIG. 15 replacing some of the analog circuitry depicted in FIG. 14.

FIGS. 18 and 10 together form a schematic diagram of the general structure of receiver apparatus for independent-sideband (ISB) demodulation of DSB-COFDM signals using Weaver methods, which receiver apparatus embodies aspects of the invention.

FIGS. 19 and 10 together form a schematic diagram of a variant of the receiver apparatus for independent-sideband (ISB) demodulation of DSB-COFDM depicted in FIGS. 18 and 10, digital circuitry depicted in FIG. 19 replacing some of the analog circuitry depicted in FIG. 18.

DETAILED DESCRIPTION

Figure 1:
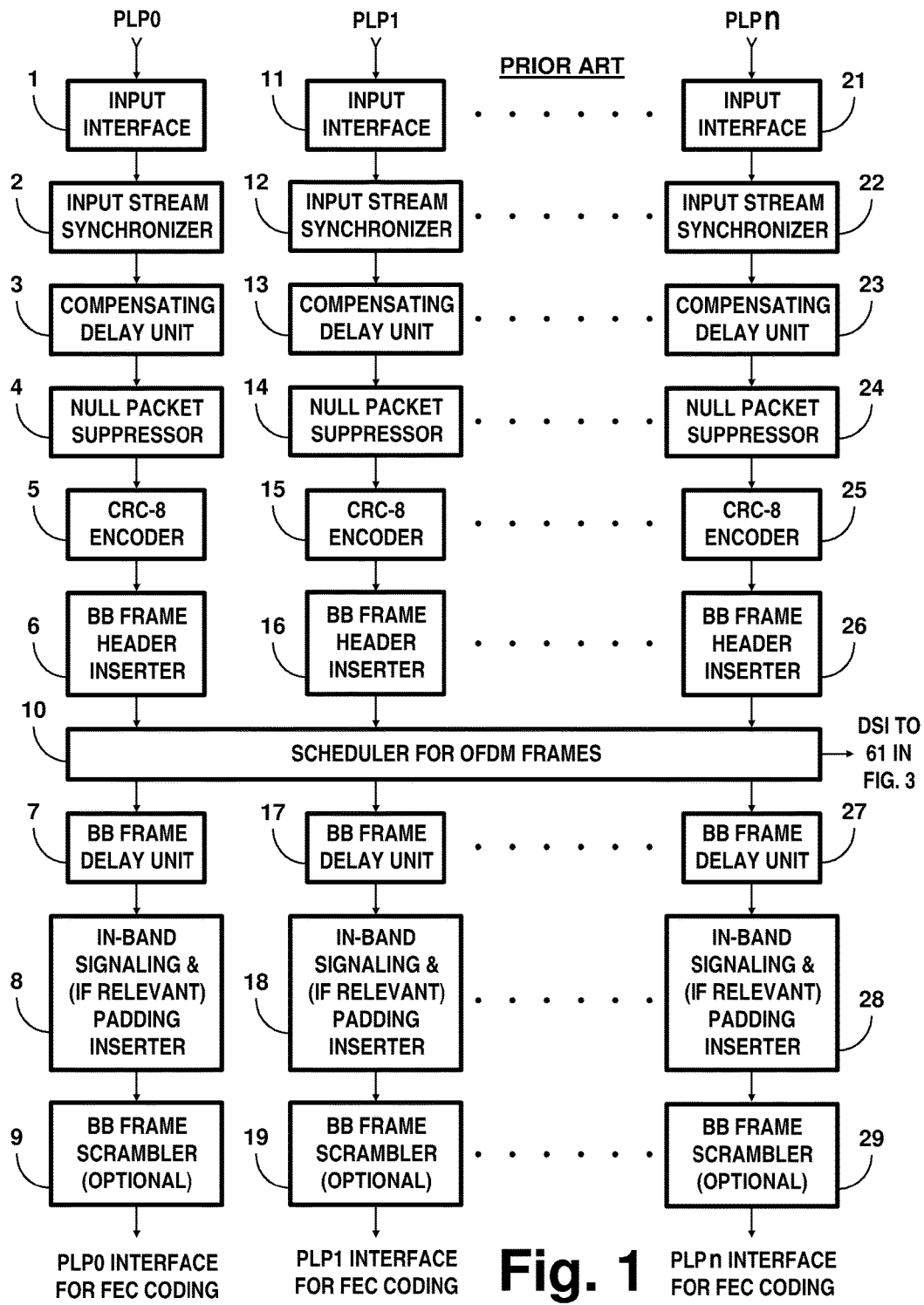
FIGS. 1, 2 and 3 together form a schematic diagram of COFDM transmitter apparatus for transmitting DSB-COFDM substantially in accordance with prior art—e. g., the ATSC 3.0 Standard for Digital Television Broadcasting.
Figure 2:
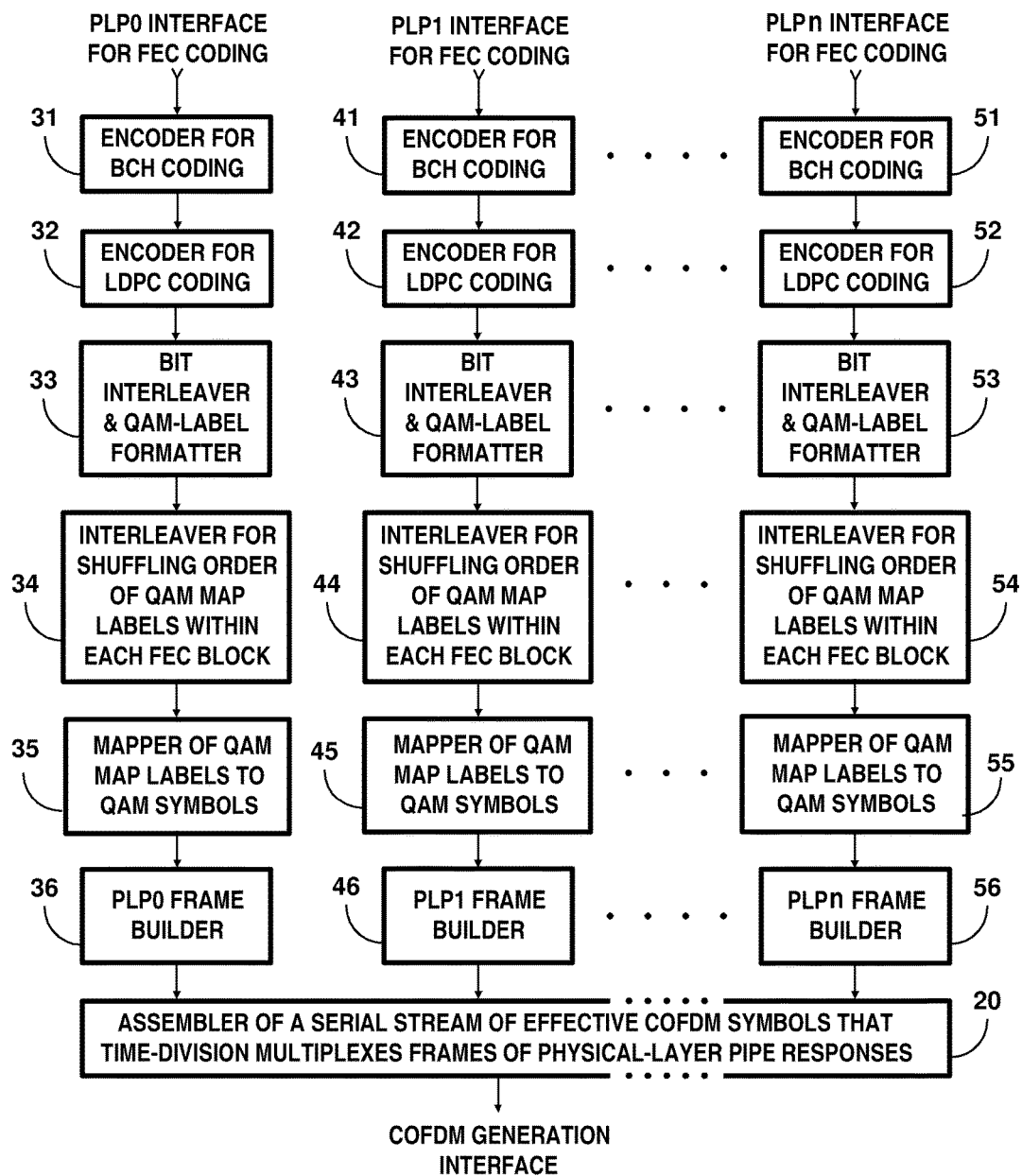
Figure 3:
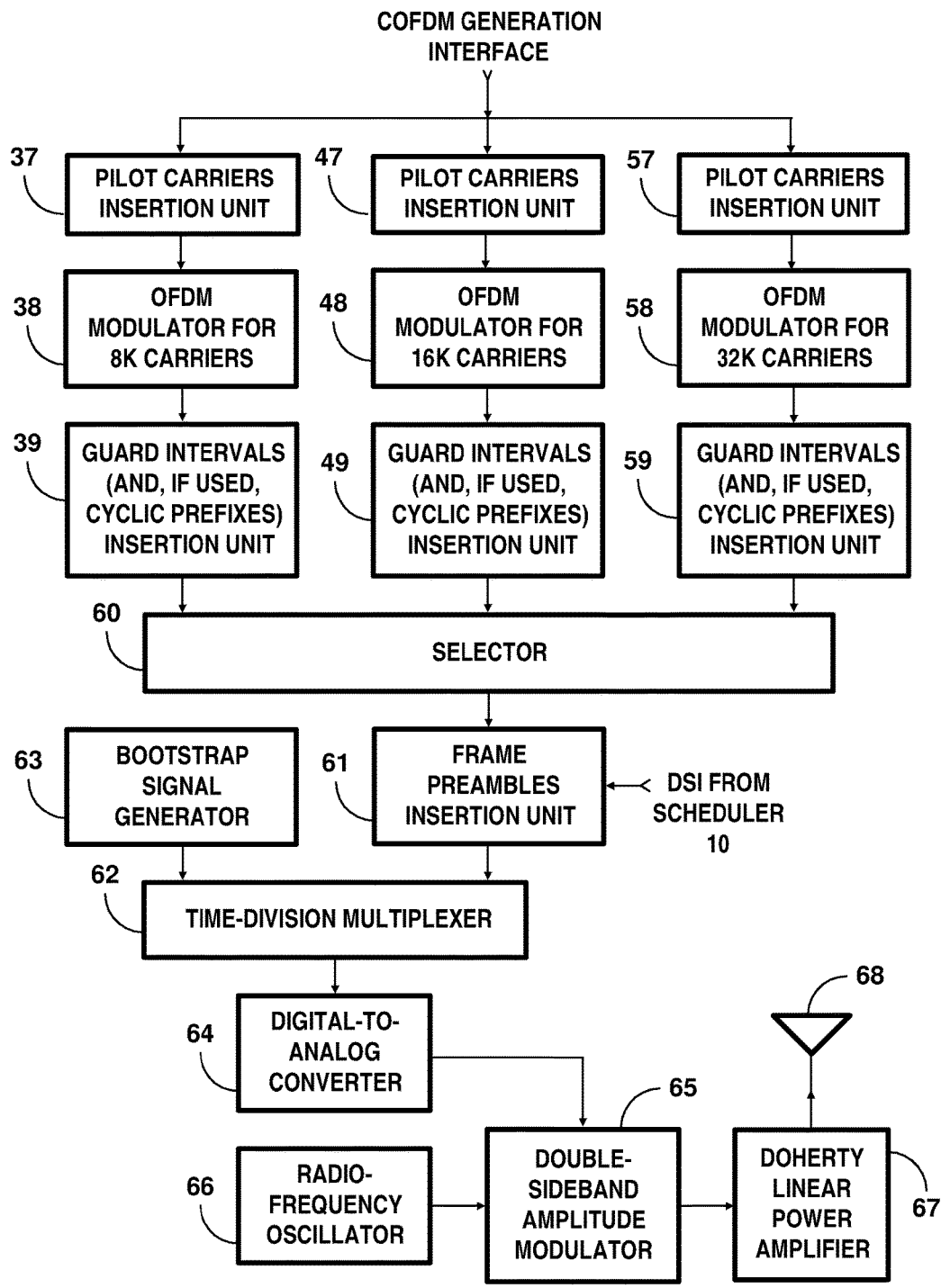

FIGS. 1, 2 and 3 depict a DTV transmitter apparatus generating COFDM signals designed for reception by DTV receivers. FIG. 1 depicts apparatus for generating baseband frames (BBFRAMES) at physical-layer-pipe (PLP) interfaces. FIG. 2 depicts apparatus for generating bit-wise forward-error-correction (FEC) coding and subsequent COFDM symbol blocks responsive to the BBFRAMEs supplied at the PLP interfaces. FIG. 3 depicts apparatus for generating and transmitting radio-frequency COFDM signals. Much of the DTV transmitter apparatus depicted in FIGS. 1, 2 and 3 is similar to that specified in European Telecommunications Standards Institute (ETSI) standard EN 302 755 V1.3.1 published in April 2012, titled "Digital Video Broadcasting (DVB); Frame structure channel coding and modulation for a second generation digital terrestrial television broadcasting system (DVB-T2)", and incorporated herein by reference. A significant difference is the inclusion of a bootstrap signal generator in accordance with the prescription of the ATSC 3.0 standard.

A scheduler 10 for interleaving time-slices of services to be broadcast to stationary DTV receivers is depicted in the middle of FIG. 1. The scheduler 10 schedules transmissions of time slices for a number (n+1) of physical layer pipes (PLPs), n being a positive integer at least zero. FIGS. 1 and 2 identify these PLPs by the letters "PLP" followed respectively by consecutive positive integers of a modulo-(n+1) numbering system. The scheduler 10 also generates and schedules dynamic scheduling information (DSI) for application to an additional PLP depicted in FIG. 3, which additional PLP generates OFDM symbol blocks that convey the DSI and first layer conformation specifications. Recommended practice is that at least the physical layer pipe PLP0 is a so-called "common" PLP used for transmitting data, such as a program guide, relating to the other "data" PLPs. The common PLP or PLPs are transmitted in each OFDM (or T2) frame following the P1 and P2 symbols, but before the data PLP or PLPs. A data PLP may be of a first type transmitted as a single slice per T2 frame, or a data PLP may be of a second type transmitted as a plurality of sub-slices disposed in non-contiguous portions of each T2 frame to achieve greater time diversity.

FIG. 1 depicts the (n+1)th physical layer pipe PLP0 comprising elements 1-6 in cascade connection before the scheduler 10 and further comprising elements 7-9 in cascade connection after the scheduler 10, but before a PLP0 interface for forward-error-correction (FEC) coding. More specifically, FIG. 1 indicates that a PLP0 stream of logical digital data is supplied to the input port of an input interface 1, the output port of which connects to the input port of an input stream synchronizer 2. The output port of the input stream synchronizer 2 connects to the input port of a compensating delay unit 3, the output port of which connects to the input port of a null-packet suppressor 4. The output port of the null-packet suppressor 4 connects to the input port of a CRC-8 encoder 5 operative at user packet level, the output port of which connects to the input port of an inserter 6 of headers for baseband (BB) frames. The output port of the BBFRAME header inserter 6 connects to a respective input port of the scheduler 10. The physical layer pipe PLP0 continues following the scheduler 10, with FIG. 1 showing a respective output port of the scheduler 10 connecting to the input port of a delay unit 7 for delaying baseband (BB) frames. FIG. 1 shows the output port of the BBFRAME delay unit 7 connecting to the input port of an inserter 8 for inserting in-band signaling into BBFRAMEs, which in-band signaling essentially consists of dynamic scheduling information (DSI) generated by the scheduler 10, and/or for inserting padding into the BBFRAME. Padding is inserted in circumstances when the user data available for transmission is insufficient to fill a BBFRAME completely, or when an integer number of user packets is required to be allocated to a BBFRAME. FIG. 1 shows the output port of the inserter 8 connecting to the input port of a BBFRAME scrambler 9, which data randomizes bits of the BBFRAME supplied from the output port of the BBFRAME scrambler 9 as the PLP0 interface for FEC coding. In practice the delay unit 7, the inserter 8 and the BBFRAME scrambler 9 are apt to be realized by suitable configuration of a random-access memory.

FIG. 1 depicts the first physical layer pipe PLP1 comprising elements 11-16 in cascade connection before the scheduler 10 and further comprising elements 17-19 in cascade connection after the scheduler 10, but before a PLP1 interface for forward-error-correction (FEC) coding. More specifically, FIG. 1 indicates that a PLP1 stream of logical digital data is supplied to the input port of an input interface 11, the output port of which connects to the input port of an input stream synchronizer 12. The output port of the input stream synchronizer 12 connects to the input port of a compensating delay unit 13, the output port of which connects to the input port of a null-packet suppressor 14. The output port of the null-packet suppressor 14 connects to the input port of a CRC-8 encoder 15 operative at user packet level, the output port of which connects to the input port of an inserter 16 of headers for BBFRAMEs. The output port of the BBFRAME header inserter 16 connects to a respective input port of the scheduler 10. The physical layer pipe PLP1 continues following the scheduler 10, with FIG. 1 showing a respective output port of the scheduler 10 connecting to the input port of a delay unit 17 for delaying BBFRAMEs. FIG. 1 shows the output port of the BBFRAME delay unit 17 connecting to the input port of an inserter 18 for inserting in-band signaling into BBFRAMEs, which in-band signaling essentially consists of DSI generated by the scheduler 10, and/or for inserting padding into the BBFRAME. FIG. 1 shows the output port of the inserter 18 connecting to the input port of a BBFRAME scrambler 19, which data-randomizes bits of the BBFRAME supplied from the output port of the BBFRAME scrambler 19 as the PLP1 interface for FEC coding. In practice the delay unit 17, the inserter 18 and the BBFRAME scrambler 19 are apt to be realized by suitable operation of a random-access memory.

FIG. 1 depicts the (n)th physical layer pipe PLPn comprising elements 21-26 in cascade connection before the scheduler 10 and further comprising elements 27-29 in cascade connection after the scheduler 10, but before a PLPn interface for forward-error-correction (FEC) coding. More specifically, FIG. 1 indicates that a PLPn stream of logical digital data is supplied to the input port of an input interface 21, the output port of which connects to the input port of an input stream synchronizer 22. The output port of the input stream synchronizer 22 connects to the input port of a compensating delay unit 23, the output port of which connects to the input port of a null-packet suppressor 24. The output port of the null-packet suppressor 24 connects to the input port of a CRC-8 encoder 25 operative at user packet level, the output port of which connects to the input port of an inserter 26 of headers for BBFRAMEs. The output port of the BBFRAME header inserter 26 connects to a respective input port of the scheduler 10. The physical layer pipe PLPn continues following the scheduler 10, with FIG. 1 showing a respective output port of the scheduler 10 connecting to the input port of a delay unit 27 for delaying BBFRAMEs. FIG. 1 shows the output port of the BBFRAME delay unit 27 connecting to the input port of an inserter 28 for inserting in-band signaling into BBFRAMEs, which in-band signaling essentially consists of dynamic scheduling information (DSI) generated by the scheduler 10, and/or for inserting padding into the BBFRAME. FIG. 1 shows the output port of the inserter 28 connecting to the input port of a BBFRAME scrambler 29, which data randomizes bits of the BBFRAME supplied from the output port of the BBFRAME scrambler 29 as the PLPn interface for FEC coding. In practice the delay unit 27, the inserter 28 and the BBFRAME scrambler 29 are apt to be realized by appropriate operation of a random-access memory.

The input stream synchronizers 2, 12, 22 etc. are operable to guarantee Constant Bit Rate (CBR) and constant end-to-end transmission delay for any input data format when there is more than one input data format. Some transmitters may not include ones of the input stream synchronizers 2, 12, 22 etc. or ones of the compensating delay units 3, 13, 23 etc. For some Transport-Stream (TS) input signals, a large percentage of null-packets may be present in order to accommodate various bit-rate services in a constant bit-rate TS. In such case, to avoid unnecessary transmission overhead, the null-packet suppressors 4, 14, 24 etc. identify TS null-packets from the packet-identification (PID) sequences in their packet headers and remove those TS null-packets from the data streams to be scrambled by the BBFRAME scramblers 9, 19, 29 etc. This removal is done in a way such that the removed null-packets can be re-inserted in the receiver in the exact positions that they originally were in, thus guaranteeing constant bit-rate and avoiding the need for updating the Program Clock Reference (PCR) or time-stamp. Further details of the operation of the input stream synchronizers 2, 12, 22 etc.; the compensating delay units 3, 13, 23 etc.; and the null-packet suppressors 4, 14, 24 etc. can be gleaned from ETSI standard EN 302 755 V1.3.1 for DVB-T2.

FIG. 2 specifically indicates FEC coding to be concatenated BCH/LDPC coding composed of Bose-Chaudhuri-Hocquenghem (BCH) outer block coding and low-density parity-check (LDPC) inner block coding, which FEC coding is currently favored in broadcasting as prescribed by the DVB-T2 standard or by the ATSC 3.0 standard. Alternatively, the FEC coding could take any one of a variety of other forms, including concatenated Reed-Solomon (RS) outer coding and turbo inner coding—e.g., as specified by the earlier DVB-T broadcast standard.

FIG. 2 depicts the (n+1)th physical layer pipe PLP0 further comprising elements 31-36 in cascade connection after the PLP0 interface for FEC coding, but before a respective input port of an assembler 20 for assembling a serial stream of effective COFDM symbols. More specifically, FIG. 2 depicts an encoder 31 for BCH coding with its input port connected to receive the PLP0 FEC-coding interface signal from the output port of the BBFRAME scrambler 9 and with its output port connected to the input port of an encoder 32 for LDPC coding. The output port of the encoder 32 connects to the input port of a bit interleaver and QAM-label formatter 33. FIG. 2 depicts the output port of the bit interleaver and QAM-label formatter 33 connected to the input port of an interleaver 34 for shuffling the order of QAM map labels within each forward-error-correction (FEC) block. The interleaver 34 customarily constructed of suitably configured dual-port memory. The output port of the interleaver 34 is connected for supplying the QAM map labels in shuffled temporal order to the input port of a QAM mapper 35 for mapping successive QAM map labels to the complex coordinates of respective successions of QAM symbol constellations. In the case of transmissions broadcast for reception by stationary DTV receivers, these QAM symbol constellations are apt to be square 64QAM symbol constellations, square 256QAM symbol constellations or even square 1024QAM symbol constellations, by way of specific examples. In the case of transmissions broadcast for reception by mobile DTV receivers, these QAM symbol constellations are apt to be square 16QAM symbol constellations, square 64QAM symbol constellations or 16APSK symbol constellations, by way of specific examples.

The output port of the QAM mapper 35 is connected for supplying the complex coordinates of a succession of QAM symbol constellations to the write input port of a memory configured as a PLP0 frame builder 36. The read output port of the memory configured as the PLP0 frame builder 36 is connected to a respective input port of the assembler 20 of a serial stream of effective COFDM symbols. The assembler 20 time-division multiplexes frames of PLP responses from the various physical layer pipes.

FIG. 2 depicts the first physical layer pipe PLP1 further comprising elements 41-46 in cascade connection after the PLP1 interface for FEC coding, but before a respective input port of the assembler 20 for assembling a serial stream of effective COFDM symbols. More specifically, FIG. 2 depicts an encoder 41 for BCH coding with its input port connected to receive the PLP1 FEC-coding interface signal from the output port of the BBFRAME scrambler 19 and with its output port connected to the input port of an encoder 42 for LDPC coding. The output port of the encoder 42 is connected to the input port of a bit interleaver and QAM-label formatter 43. FIG. 2 depicts the output port of the bit interleaver and QAM-label formatter 42 connected to the input port of a time interleaver 43 for successive QAM labels. The time interleaver 44 shuffles the order of the QAM symbols in each successive FEC block. This shuffling implements cyclic delay diversity that helps the FEC coding to overcome fading. The output port of the QAM-label time interleaver 43 connects to the input port of a QAM mapper 45 for mapping successive QAM labels to the complex coordinates of respective successions of QAM symbol constellations.

The output port of the QAM mapper 45 is connected for supplying the complex coordinates of a succession of QAM symbol constellations to the write input port of a memory configured as a PLP1 frame builder 46. The read output port of the memory configured as the PLP1 frame builder 46 is connected to a respective input port of the assembler 20 of a serial stream of effective COFDM symbols, in which stream frames of PLP responses from the various physical layer pipes are arranged in time-division multiplex.

FIG. 2 depicts the (n)th physical layer pipe PLPn further comprising elements 51-56 in cascade connection after the PLPn interface for FEC coding, but before a respective input port of the assembler 20 for assembling a serial stream of effective COFDM symbols. More specifically, FIG. 2 depicts an encoder 51 for BCH coding with its input port connected to receive the PLPn FEC-coding interface signal from the output port of the BBFRAME scrambler 29 and with its output port connected to the input port of an encoder 52 for LDPC coding. The output port of the encoder 52 is connected to the input port of bit interleaver and QAM-label formatter 53. FIG. 2 depicts the output port of the bit interleaver and QAM-label formatter 53 connected to the input port of a time interleaver 54 for successive QAM labels. The time interleaver 54 shuffles the order of the QAM symbols in each successive FEC block. This shuffling implements cyclic delay diversity (CDD) that helps the FEC coding to overcome fading. The output port of the QAM-label time interleaver 543 connects to the input port of a QAM mapper 55 for mapping successive QAM labels to the complex coordinates of respective successions of QAM symbol constellations.

The output port of the QAM mapper 55 is connected for supplying the complex coordinates of a succession of QAM symbol constellations to the write input port of a memory configured as a PLPn frame builder 56. The read output port of the memory configured as the PLPn frame builder 56 is connected to a respective input port of the assembler 20 of a serial stream of effective COFDM symbols, in which stream frames of PLP responses from the various physical layer pipes are are arranged in time-division multiplex.

Customarily there is a number of other physical layer pipes besides PLP0, PLP1 and PLPn, which other physical layer pipes are identified by the prefix PLP followed by respective ones of consecutive numbers two through (n−1). Each of the PLPs, n in number, may differ from the others in at least one aspect. One possible difference between these n PLPs concerns the natures of the FEC coding these PLPs respectively employ. The current trend is to use concatenated BCH coding and LDPC block coding for the FEC coding, but concatenated Reed-Solomon coding and convolutional coding have been used in the past. EN 302 755 V1.3.1 for DVB-T2 specifies a block size of 64,800 bits for normal FEC frames as a first alternative, and a block size of 16,200 bits is specified for short FEC frames as a second alternative. Also, a variety of different LDPC code rates are authorized. PLPs may differ in the number of OFDM carriers involved in each of their spectral samples, which affects the size of the DFT used for demodulating those OFDM carriers. Another possible difference between PLPs concerns the natures of the QAM symbol constellations (or possibly other modulation symbol constellations) they respectively employ.

FIG. 2 indicates that the output port of the assembler 20 of a serial stream of effective COFDM symbols, in which frames of PLP responses from the various physical layer pipes are time-division multiplexed, connects to subsequent elements via a COFDM generation interface as indicated in both FIGS. 2 and 3. These subsequent elements are depicted in FIG. 3.

FIG. 3 depicts a pilot carriers insertion unit 37 having an input port connected for receiving the serial stream of effective COFDM symbols supplied from the FIG. 2 assembler 20 thereof via the COFDM generation interface. The pilot carriers insertion unit 37 inserts pilot carrier symbols into the effective COFDM symbols to generate complete COFDM symbols suitable for a subsequent 8K inverse fast Fourier transform (I-FFT). The output port of the pilot carriers insertion unit 37 is connected for supplying complete COFDM symbols to the input port of an OFDM modulator 38 which performs that subsequent 8K I-FFT. FIG. 3 shows the output port of the OFDM modulator 38 connected for supplying 8K I-FFT results directly to the input port of a guard intervals insertion unit 39. In current practice the guard intervals insertion unit 39 customarily inserts a respective cyclic prefix within each guard interval.

FIG. 3 depicts a pilot carriers insertion unit 47 having an input port connected for receiving the serial stream of effective COFDM symbols supplied from the FIG. 2 assembler 20 thereof via the COFDM generation interface. The pilot carriers insertion unit 47 inserts pilot carrier symbols into the effective COFDM symbols to generate complete COFDM symbols suitable for a subsequent 16K I-FFT. The output port of the pilot carriers insertion unit 47 is connected for supplying complete COFDM symbols to the input port of an OFDM modulator 48 which performs that subsequent 16K I-FFT. FIG. 3 shows the output port of the OFDM modulator 48 connected for supplying 16K I-FFT results directly to the input port of a guard intervals insertion unit 49. In current practice the guard intervals insertion unit 39 customarily inserts a respective cyclic prefix within each guard interval.

FIG. 3 depicts a pilot carriers insertion unit 57 having an input port connected for receiving the serial stream of effective COFDM symbols supplied from the FIG. 2 assembler 20 thereof via the COFDM generation interface. The pilot carriers insertion unit 57 inserts pilot carrier symbols into the effective COFDM symbols to generate complete COFDM symbols suitable for a subsequent 32K I-FFT. The output port of the pilot insertion unit 57 is connected for supplying complete COFDM symbols to the input port of an OFDM modulator 58 which performs that subsequent 32K I-FFT. FIG. 3 shows the output port of the OFDM modulator 58 is connected for supplying 32K I-FFT results directly to the input port of a guard intervals insertion unit 59. In current practice the guard intervals insertion unit 59 customarily inserts a respective cyclic prefix within each guard interval.

FIG. 3 further depicts a selector 60 having respective input ports to which the output ports of the guard interval (and cyclic prefix) insertion units 39, 49 and 59 respectively connect. FIG. 3 depicts the output port of the selector 60 connected to the input port of a frame preambles insertion unit 61. The pilot carriers insertion unit 37, the OFDM modulator 38 and the guard interval insertion unit 39 may be selectively powered, being powered only when transmissions using close to 8K OFDM carriers are made. Elements 37, 38 and 39 may all be omitted in some transmitters. The pilot carriers insertion unit 47, the OFDM modulator 48 and the guard interval and cyclic prefix insertion unit 49 may be selectively powered, being powered only when transmissions using close to 16K OFDM carriers are made. Elements 47, 48 and 49 may all be omitted in some transmitters. The pilot carriers insertion unit 57, the OFDM modulator 58, and the guard interval insertion unit 59 may be selectively powered, being powered only when transmissions using close to 32K OFDM carriers are made. All the elements 57, 58 and 59 may be omitted in some transmitters.

FIG. 3 shows the output port of the frame preambles insertion unit 61 connected to one of the two input ports of a time-division multiplexer 62. The other of the two input ports of the time-division multiplexer 62 is connected for receiving a bootstrap signal that a bootstrap signal generator 63 supplies from its output port. The bootstrap signal is an innovation introduced by developers of the ATSC 3.0 Digital Television Standards. It conveys metadata descriptive of the transmission standard used for DTV broadcasting and critical information concerning the configuration of receivers for receiving DTV broadcasts made in accordance with that standard. The bootstrap signal is conveyed by an OFDM signal using a set of carriers that are apt to differ in frequencies in a defined way from the set of carriers used for COFDM transmission of DTV signal. The OFDM signal conveying the bootstrap is of narrower bandwidth (typically 4.5 MHz) than the 6 MHz, 7 MHz or 8 MHz signals currently used for DTV in various countries around the world. The baseband bootstrap signal developed for the ATSC 3.0 Digital Television Standards comprises a Zadoff-Chu sequence, which identifies the basic standard governing the DTV broadcasting, and a set of repetitive pseudo-random-noise sequences that convey further metadata. This is described more fully in ATSC Candidate Standard: System Discovery and Signaling (Doc. A/321, Part 1) published 6 May 2015.

FIG. 3 shows the output port of the time-division multiplexer 62 connected to the input port of a digital-to-analog register 64, the output port of which is connected for supplying analog COFDM carriers as modulating input signal to a first input port of an amplitude modulator 65. FIG. 3 shows the output port of a radio-frequency oscillator 66 connected for supplying radio-frequency (RF) carrier wave to a second input port of the amplitude modulator 65. The amplitude modulator 65 is of a type that generates a double-sideband (DSB) amplitude-modulation (AM) signal with a principal carrier that is suppressed at least to some degree. The output port of the amplitude modulator 65 is connected to supply RF analog COFDM signal to the input port of a linear power amplifier 67. The linear power amplifier is preferably allows the COFM signal to be amplified with very occasional peak clipping despite the peak-to-average-power ratio being as large as the 15 dB range. In order to avoid excessive power consumption while maintaining linearity average such range the linear power amplifier 67 is apt to be configured substantially in accordance with U.S. Pat. No. 6,625,430 issued 23 Sep. 2003 to Peter J. Doherty and titled "Method and apparatus for attaining higher amplifier efficiencies at lower power levels". FIG. 3 shows the output port of the linear power amplifier 67 connected for driving amplified RF analog COFDM signal power to a transmission antenna 68. FIG. 3 omits showing some DTV transmitter details, such as band-shaping filters for the RF signals.

The frame preambles inserted by the frame preambles insertion unit 61 convey the conformation of each OFDM frame structure and also convey the dynamic scheduling information (DSI) produced by the scheduler 10. This information is conveyed using at least some of OFDM carriers also used for conveying the baseband OFDM information in the input signals to the frame preambles insertion unit 61. The OFDM carriers supplied by the bootstrap signal generator 63 are apt to have different frequencies than OFDM carriers used for conveying the baseband OFDM information in the input signals to the frame preambles insertion unit 61. The OFDM carriers supplied by the bootstrap signal generator 63 are constrained to a narrower bandwidth than the OFDM carriers used for conveying the baseband OFDM information in the input signals to the frame preambles insertion unit 61. The bootstrap signal conveys basic information as to the standard to which OFDM broadcasts conform, the bandwidth of the RF channel, and the size of the I-FFT used in the broadcasting of groups of OFDM frames, for example. If bootstrap signals are not used in the standard used for COFDM broadcasting, the elements 62 and 63 will be omitted, and the output port of the frame preambles insertion unit 61 will connect directly to the input port of the digital-to-analog converter 64.

Figure 4:
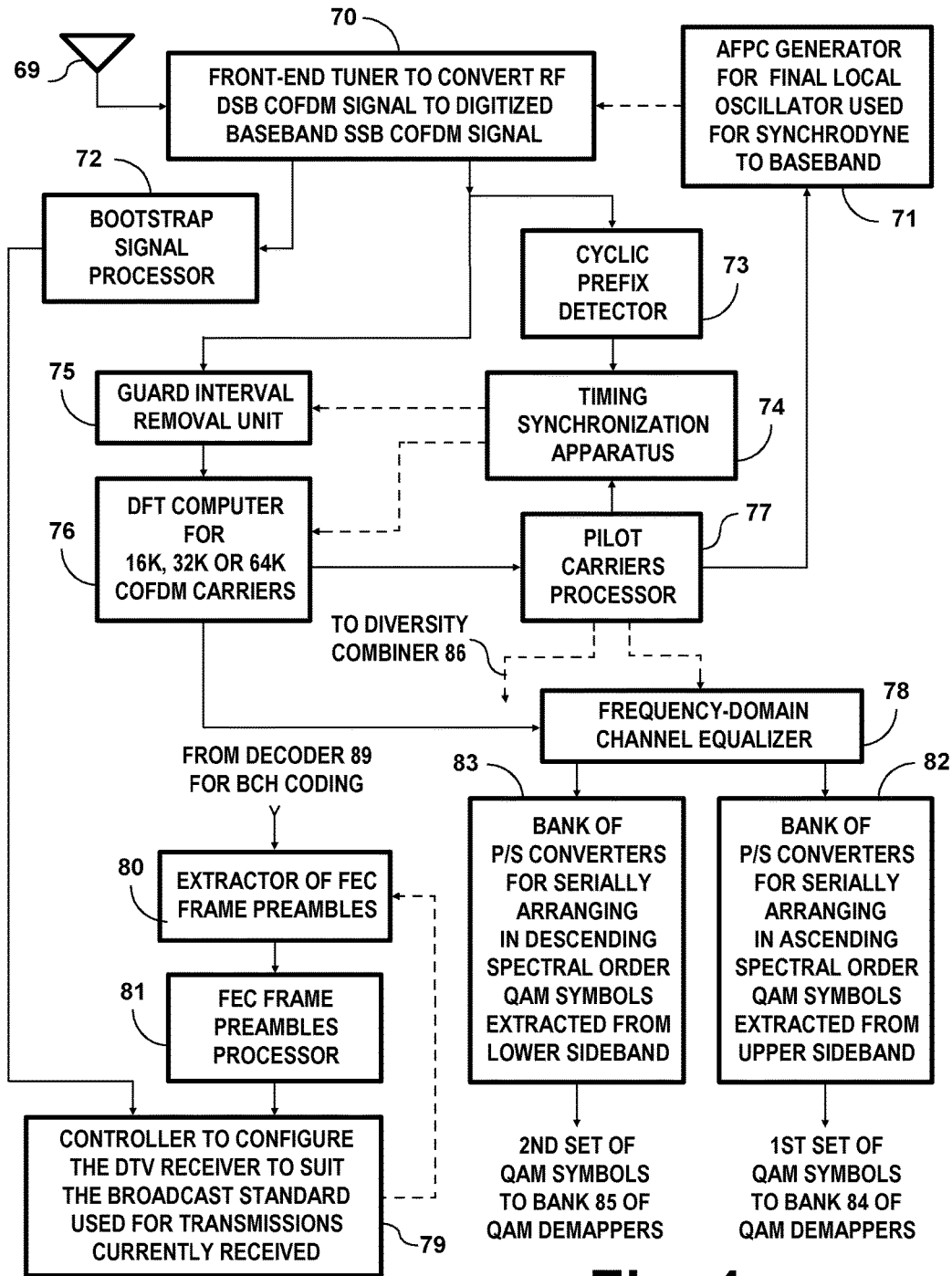
FIGS. 4 and 5 together form a schematic diagram of the general structure of receiver apparatus for single-sideband (SSB) demodulation of DSB-COFDM signals, which receiver apparatus embodies aspects of the invention.

FIG. 4 shows the initial portion of a receiver designed for iterative-diversity reception of COFDM signals as transmitted at VHF or UHF by a DTV transmitter, such as the one depicted in FIGS. 1, 2 and 3. A reception antenna 69 captures the radio-frequency COFDM signal for application as input signal to a front-end tuner 70 of the receiver. The front-end tuner 70 can be of a double-conversion type composed of initial single-conversion superheterodyne receiver circuitry for converting radio-frequency (RF) single-sideband COFDM signal to intermediate-frequency (IF) single-sideband COFDM signal followed by circuitry for performing a final conversion of the IF COFDM signal to baseband single-sideband COFDM signal. The initial conversion circuitry typically comprises a tunable RF amplifier for RF single-sideband COFDM signal incoming from the reception antenna, a tunable first local oscillator, a first mixer for heterodyning the amplified RF single-sideband COFDM signal with local oscillations from the first local oscillator to obtain the IF single-sideband COFDM signal, and an intermediate-frequency (IF) amplifier for the IF single-sideband COFDM signal. Typically, the front-end tuner 70 further includes a synchronous demodulator for performing the final conversion from IF COFDM signal to baseband single-sideband COFDM signal and an analog-to-digital converter for digitizing that baseband signal. Synchronous demodulation circuitry typically comprises a final local oscillator with automatic frequency and phase control (AFPC) of its oscillations, a second mixer for synchrodyning amplified IF single-sideband COFDM signal with local oscillations from the final local oscillator to obtain the baseband single-sideband COFDM signal, and a low-pass filter for suppressing image signal accompanying the baseband single-sideband COFDM signal. The frequency of oscillations that the final local oscillator generates is controlled to be the same as the frequency of an edge pilot carrier at either the lowest frequency or the highest frequency of the intermediate-frequency DSB-COFDM signal. In some designs of the front-end tuner 70, synchronous demodulation is performed in the analog regime before subsequent analog-to-digital conversion of the resulting complex baseband single-sideband COFDM signal. In other designs of the front-end tuner 70, analog-to-digital conversion is performed before synchronous demodulation is performed in the digital regime.

Simply stated, the front-end tuner 70 converts radio-frequency double-sideband COFDM signal received at its input port to digitized samples of baseband single-sideband COFDM signal supplied from its output port. Typically, the digitized samples of the real component of the baseband single-sideband COFDM signal are alternated with digitized samples of the imaginary component of that baseband signal for arranging the complex baseband single-sideband COFDM signal in a single stream of digital samples. FIG. 4 shows an AFPC generator 71 for generating the automatic frequency and phase control (AFPC) signal for controlling the final local oscillator within the front-end tuner 70.

The output port of the front-end tuner 70 is connected for supplying digitized samples of baseband single-sideband COFDM signal to the respective input ports of a bootstrap signal processor 72 and a cyclic prefix detector 73. The cyclic prefix detector 73 differentially combines the digitized samples of baseband single-sideband COFDM signal with those samples as delayed by the duration of an effective COFDM symbol. Nulls in the difference signal so generated should occur, marking the guard intervals of the baseband single-sideband COFDM signal. The nulls are processed to reduce any corruption caused by noise and to generate better-defined indications of the phasing of COFDM symbols. The output port of the cyclic prefix detector 73 is connected to supply these indications to a first of two input ports of timing synchronization apparatus 74.

A first of two output ports of the timing synchronization apparatus 74 is connected for supplying gating control signal to the control input port of a guard interval remover 75, the signal input port of which is connected for receiving digitized samples of baseband COFDM signal from the output port of the front-end tuner 70. The output port of the guard interval remover 75 is connected for supplying the input port of discrete-Fourier-transform computer 76 with windowed portions of the baseband single-sideband COFDM signal that contain effective COFDM samples. A second of the output ports of the timing synchronization apparatus 74 is connected for supplying the DFT computer 76 with synchronizing information concerning the effective COFDM samples.

The indications concerning the phasing of COFDM symbols that the cyclic prefix detector 73 supplies to the timing synchronization apparatus 74 are sufficiently accurate for initial windowing of a baseband single-sideband COFDM signal that the guard interval remover 75 supplies to the DFT computer 76. A first output port of the DFT computer 76 is connected for supplying respective demodulation results for each of the pilot carriers in parallel to the input port of a pilot carriers processor 77, and a second output port of the DFT computer 76 is connected for supplying the signal input port of a frequency-domain channel equalizer 78 in parallel with respective demodulation results for each of the COFDM carriers conveying data. The processor 77 processes the demodulation results concerning pilot carriers, part of which processing generates weighting coefficients for channel equalization filtering in the frequency domain. A first of four output ports of the processor 77 that are explicitly shown in FIG. 4 is connected for supplying these weighting coefficients (via wiring depicted as a dashed-line connection) to the frequency-domain channel equalizer 78, which uses those weighting coefficients for adjusting its responses to the demodulation results for each of the COFDM carriers conveying data.

A second of the output ports of the pilot carriers processor 77 that are explicitly shown in FIG. 4 is connected for supplying more accurate window-positioning information to the second input port of the timing synchronization apparatus 74. This window-positioning information is an adjustment generated by a feedback loop that seeks to minimize the noise accompanying pilot carriers, which noise increases owing to intercarrier interference from adjoining modulated carriers when window positioning is not optimal.

A third of the output ports of the pilot carriers processor 77 explicitly shown in FIG. 4 is connected for forwarding unmodulated pilot carriers to the input port of the AFPC generator 71. The real components of the unmodulated pilot carriers are multiplied by their respective imaginary components in the AFPC generator 71. The resulting products are summed and low-pass filtered to develop the AFPC signal that the AFPC generator 71 supplies to the front-end tuner 70 for controlling the final local oscillator therein. Other methods to develop AFPC signals for the final local oscillator in the front-end tuner 70 are also known, which can replace or supplement the method described above. One such other method is described in U.S. Pat. No. 5,687,165 titled "Transmission system and receiver for orthogonal frequency-division multiplexing signals, having a frequency-synchronization circuit", which was granted to Flavio Daffara and Ottavio Adami on 11 Nov. 1997. In that method complex digital samples from the tail of each OFDM symbol are multiplied by the conjugates of corresponding digital samples from the cyclic prefix of the OFDM symbol. The resulting products are summed and low-pass filtered to develop the AFPC signal that the AFPC generator 71 supplies to the front-end tuner 70 for controlling the final local oscillator therein.

A fourth of the output ports of the pilot carriers processor 77 explicitly shown in FIG. 4 is connected for supplying a diversity combiner 86 (depicted in FIG. 5) with information concerning the frequency spectrum of each successive COFDM symbol.

The DFT computer 76 is configured so it can demodulate any one of 16K, 32K and 128K options as to the nominal number of OFDM carriers. The correct option is chosen responsive to an instruction from a controller 79 that generates a number of instructions used to configure the COFDM receiver to suit the broadcast standard used transmissions currently received. The front-end tuner 70 does not combine the lower-sideband OFDM carriers and upper-sideband OFDM carriers conveying similar coded digital data before computing DFT, so the DFT computer 76 has to compute twice as large DFTs as is the case in COFDM receivers that do combine those carriers. There is no synchrodyne of double-sideband COFDM signals to baseband, as folds the halves of their frequency spectrum together so as to halve the sizes of DFTs to be computed in a receiver for those DSB-COFDM signals.

Figure 5:
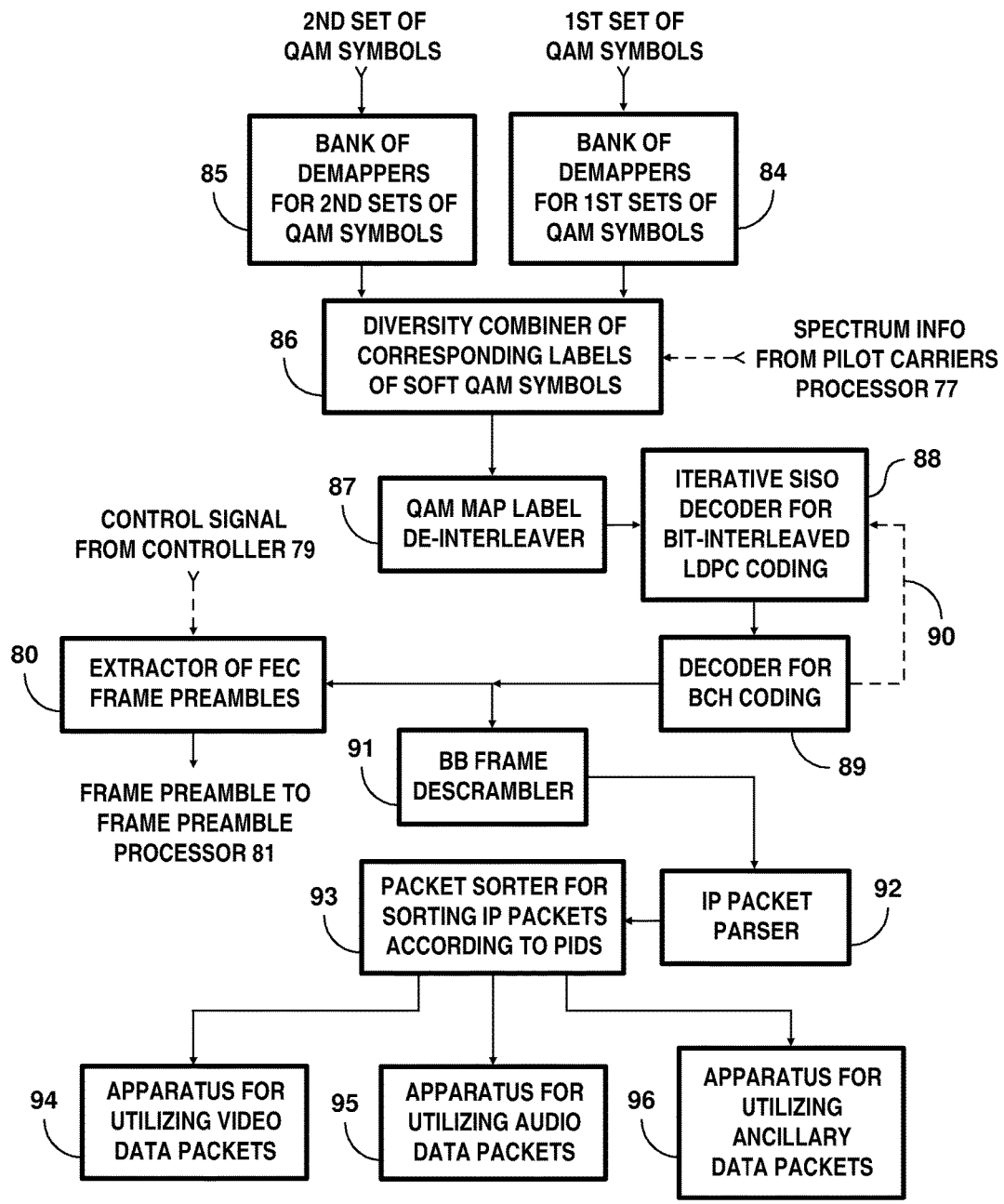

To keep the drawings from being too cluttered to be easily understood, the various figures thereof do not explicitly illustrate the multitudinous connections from the controller 79 to the elements of the receiver controlled by respective instruction from the controller 79. The controller 79 is connected for responding to elements of the bootstrap signal forwarded to a first of its input ports from an output port of the bootstrap signal processor 72. Since the bootstrap signal is not always received acceptably free of error, it is good design to provide a source alternative to the bootstrap generator 72 for supplying the controller 79 back-up information as to the nature of received DTV signal. Such a source is necessary if bootstrap signal is not transmitted at all, as will be the case for DTV signal transmitted per the DVB-T2 standard. Accordingly the response of a decoder 89 for BCH coding, which decoder 89 is depicted in FIG. 5, is supplied to input port of an extractor 80 of FEC frame preambles from the decoder 89 response. The output port of the extractor 80 of FEC frame preambles is connected for supplying them to the input port of a FEC frame preambles processor 81. The output port of the FEC frame preambles processor 81 is connected for supplying an input port of the controller 79 with information as to the nature of received DTV signal, the interconnection between which ports may comprise a plurality of separate connections. FIG. 4 shows a connection from the controller 79 to the extractor 80 of FEC frame preambles through which connection the controller 79 can supply the extractor 80 a control signal including predictions of when FEC frame preambles are expected to occur.

As noted supra, the second output port of the DFT computer 76 is connected to supply demodulated complex digital samples of the complex coordinates of QAM symbol constellations in parallel to the input port of the frequency-domain channel equalizer 78. To implement a simple form of frequency-domain channel equalization, the pilot carriers processor 77 measures the amplitudes of the demodulated pilot carriers to determine basic weighting coefficients for various portions of the frequency spectrum. The pilot carriers processor 77 then interpolates among the basic weighting coefficients to generate respective weighting coefficients supplied to the frequency-domain channel equalizer 78 with which to multiply the complex coordinates of QAM symbol constellations supplied from the DFT computer 76. Various alternative types of frequency-domain channel equalizer are also known, and it is known that time-domain equalization although much less practical is a possible alternative to frequency-domain equalization.

As noted supra, the controller 79 is connected for responding to elements of the bootstrap signal forwarded to a first of its input ports from the output port of the bootstrap signal processor 72. The bootstrap signal prescribes the basic sample rate and the size of I-FFT that the controller 79 instructs the DFT computer 76 to use in its operation regarding DTV signal. Responsive to the FEC frame preambles from the extractor 80 of them, the FEC frame preambles processor 81 supplies similar prescription to the controller 79. The controller 79 instructs the channel equalizer 78, the extractor 80 of frame preambles, and the frame preambles processor 81 to configure themselves to suit the size of DFT that the controller 79 instructs the DFT computer 76 to generate.

The frequency-domain channel equalizer 78 is connected for supplying complex coordinates of the QAM symbol constellations in each upper-frequency half COFDM symbol within a COFDM frame, in parallel and in ascending spectral order, to a bank 82 of parallel-to-serial (P/S) converters for the complex coordinates of successive first sets of QAM symbol constellations in each COFDM symbol. The frequency-domain channel equalizer 78 is further connected for supplying complex coordinates of the QAM symbol constellations in each lower-frequency half COFDM symbol within a COFDM frame, in parallel and in descending spectral order, to a bank 83 of parallel-to-serial (P/S) converters for the complex coordinates of successive second sets of QAM symbol constellations in each COFDM symbol. Each of the banks 82 and 83 of P/S converters comprises respective P/S converters that are appropriate for each number of OFDM carriers that can obtain in a half COFDM symbol. The pair of P/S converters selected for current reception is determined by a control signal that the controller 79 supplies in common to each of the banks 82 and 83 of P/S converters.

The first sets of QAM symbol constellations are those that are extracted from the upper sideband of the received DSB-COFDM signal and are supplied serially from the output port of the bank 82 of P/S converters to the input port of a bank 84 of demappers for the first sets of QAM symbol constellations, which is shown in FIG. 5. The second sets of QAM symbol constellations are those that are extracted from the lower sideband of the received DSB-COFDM signal and are supplied serially from the output port of the bank 83 of P/S converters to the input port of a bank 85 of demappers for the second sets of QAM symbol constellations, which is shown in FIG. 5. Each of the banks 84 and 85 of demappers comprises a respective set of QAM demappers for different sizes of QAM symbol constellations—e.g., one for 16APSK, one for 64QAM, one for 256QAM, one for 1024 QAM, possibly one for 4096QAM, and possibly one for square 16QAM. The pair of demappers selected for current reception is determined by a control signal that the controller 79 supplies in common to each of the banks 84 and 85 of QAM demappers. The pairs of similar QAM demappers in the banks 84 and 85 of demappers are usually paired Gray demappers, and these are well-suited for the maximal-ratio combining techniques taught in U.S. Pat. No. 7,236,548. However, in theory it is possible to use paired natural mappers, paired anti-Gray demappers, paired "optimal" demappers of various types or some mixture of those types of paired demappers. It is practical for each of the QAM demappers to constitute a plurality of read-only memories (ROMs), one for each bit of map labeling, addressed by the complex coordinates descriptive of the current QAM symbol. Each ROM is read to provide a "hard" bit followed by a confidence factor indicating how likely that bit is to be correct. Customarily these confidence factors are expressed as logarithm of likelihood ratios (LLRs). The confidence factors are usually based, at least in part, on judgments of the distance of the complex coordinates descriptive of the current QAM symbol from the edges of the bin containing the "hard" bit. The confidence factors can be further based on whether or not the bin containing the "hard" bit is at an edge of the current QAM symbol constellation and, if so, whether the complex coordinates descriptive of that current QAM symbol closely approach that edge or even pass beyond it. The confidence factor that the "hard" bit is correct is increased if the complex coordinates descriptive of that current QAM symbol closely approach a symbol constellation edge or even pass beyond it. This increase applies to all bits in the map label. This effect obtains even if mapping of QAM symbol constellations is other than Gray mapping.

FIG. 5 shows connections from the output ports of the banks 84 and 85 of demappers to respective input ports of a diversity combiner 86 of corresponding soft QAM labels. Each soft QAM label is composed of a a plurality of "soft" bits. Each of these "soft" bits constitutes a "hard" bit and a confidence factor that that "hard" bit has been correctly decided; this confidence factor is conventionally expressed as a logarithm of likelihood ratio (LLR). This information is utilized in subsequent soft decoding procedures of the FEC coding reproduced in interleaved form from the diversity combiner 86. This information can be utilized by the diversity combiner 86, as well, to implement maximal-ratio combining. The output port of the diversity combiner 86 serially supplies soft bits of successive QAM labels to the input port of a QAM map label de-interleaver 87. The QAM map label de-interleaver 87 can be constructed per custom, using dual-port random-access memory.

FIGS. 4 and 5 indicate that there is a connection from the pilot carriers processor 77 in FIG. 4 to the diversity combiner 86 in FIG. 5, via which connection the pilot carriers processor 77 provides the diversity combiner 86 information concerning the respective frequency spectra of the first and second sets of QAM symbols. This spectral information is useful to the diversity combiner 86 if it is configured to perform some sort of signal-selective combining of the first and second sets of QAM symbols. This spectral information can also be used to influence, or even fully control, maximal-ratio combining of the first and second sets of QAM symbols by the diversity combiner 86.

FIG. 5 shows the read-output port of the QAM map label de-interleaver 87 connected to the input port of an iterative soft-input/soft-output (SISO) decoder 88 for bit-interleaved LDPC coding. FIG. 5 further shows the output port of the decoder 88 connected for supplying the results of its decoding bit-interleaved LDPC coding to the input port of a decoder 89 of BCH coding. FIG. 5 shows a control connection 90 from the decoder 89 of BCH coding back to the decoder 88 of LDPC coding, through which connection 90 the decoder 89 sends an indication of when it has decoded a correct BCH codeword. This indication signals the decoder 88 of bit-interleaved LDPC coding that it can discontinue iterative decoding before reaching a limit on the maximum number of iterations permitted, which early discontinuation of iterative decoding conserves power consumption by the receiver. The output port of the decoder 89 is connected for supplying the results of its decoding BCH coding to the input port of a BB Frame descrambler 91, which includes a de-jitter buffer and null-packet re-inserter that are not explicitly shown in FIG. 5.

FIG. 5 shows the output port of the BB Frame descrambler 91 connected to supply IP packets to the input port of an internet-protocol packet parser 92. The output port of the IP packet parser 92 is connected to supply IP packets to a packet sorter 93 for sorting IP packets according to their respective packet identifiers (PIDs) to one of the respective input ports of apparatus 94 for utilizing video data packets, apparatus 95 for utilizing audio data packets, and apparatus 96 for utilizing ancillary data packets.

FIG. 5 depicts a single SISO decoder 88 for bit-interleaved LDPC coding in cascade connection with a single decoder 89 for BCH coding thereafter. In actual practice there are apt to be at least two such cascade connections available, suitable to respective different sizes of FEC code blocks, with one of these cascade connections selected for supplying decoded data to the input port of the BB frame descrambler 91 in accordance with instructions from the controller 79. Alternatively, decoders for other types of FEC coding replace the decoders 88 and 89 in other receiver apparatus embodying aspects of the invention. For example, a cascade connection of decoders for concatenated RS and turbo coding is used instead of the decoders 88 and 89.

Figure 12:
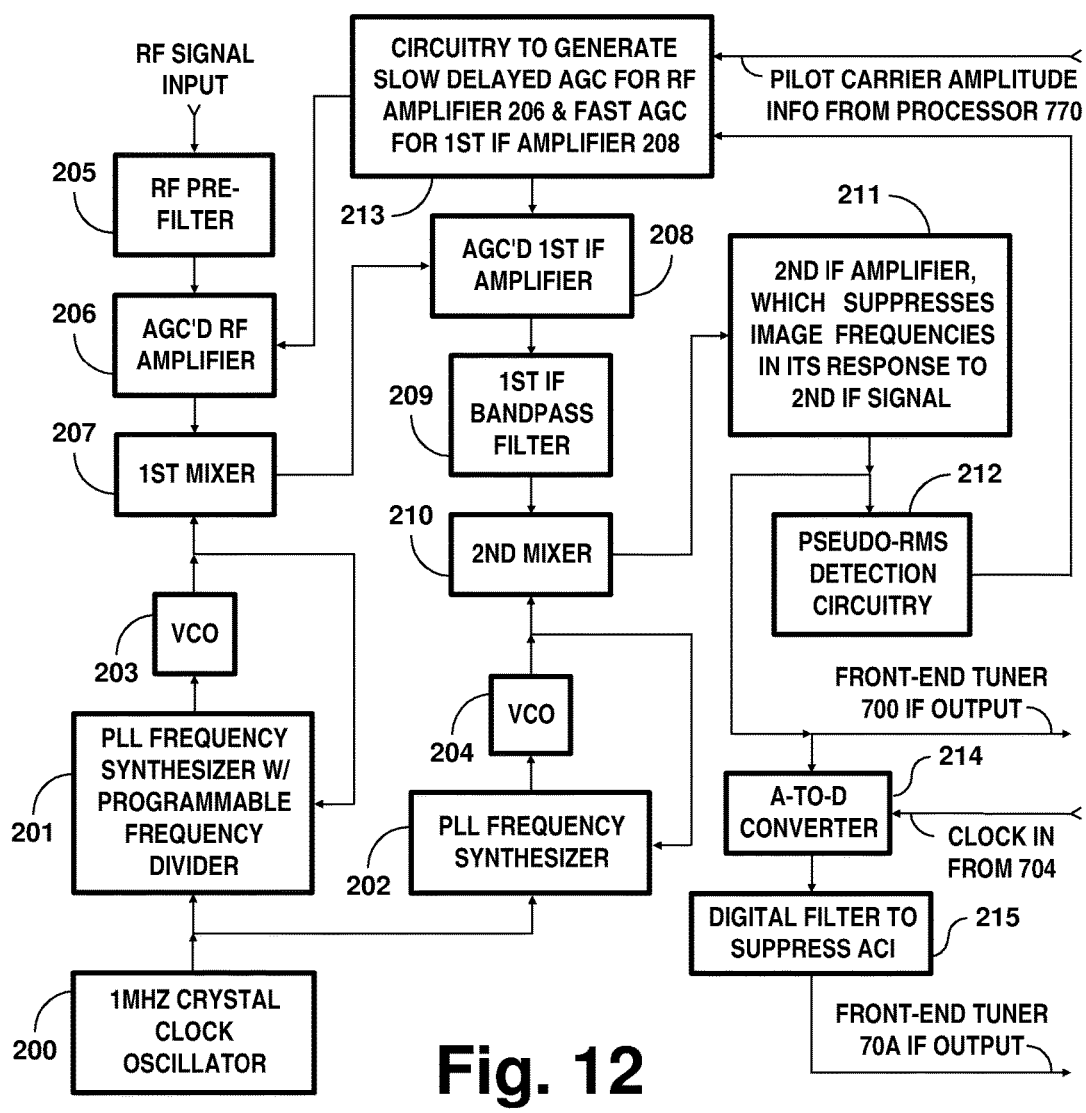
FIG. 12 is a schematic diagram of double superheterodyne front-end tuner structure suitable for inclusion in any of the apparatuses for demodulating DSB-COFDM signals depicted in FIGS. 9 and 13-17.
Figure 13:
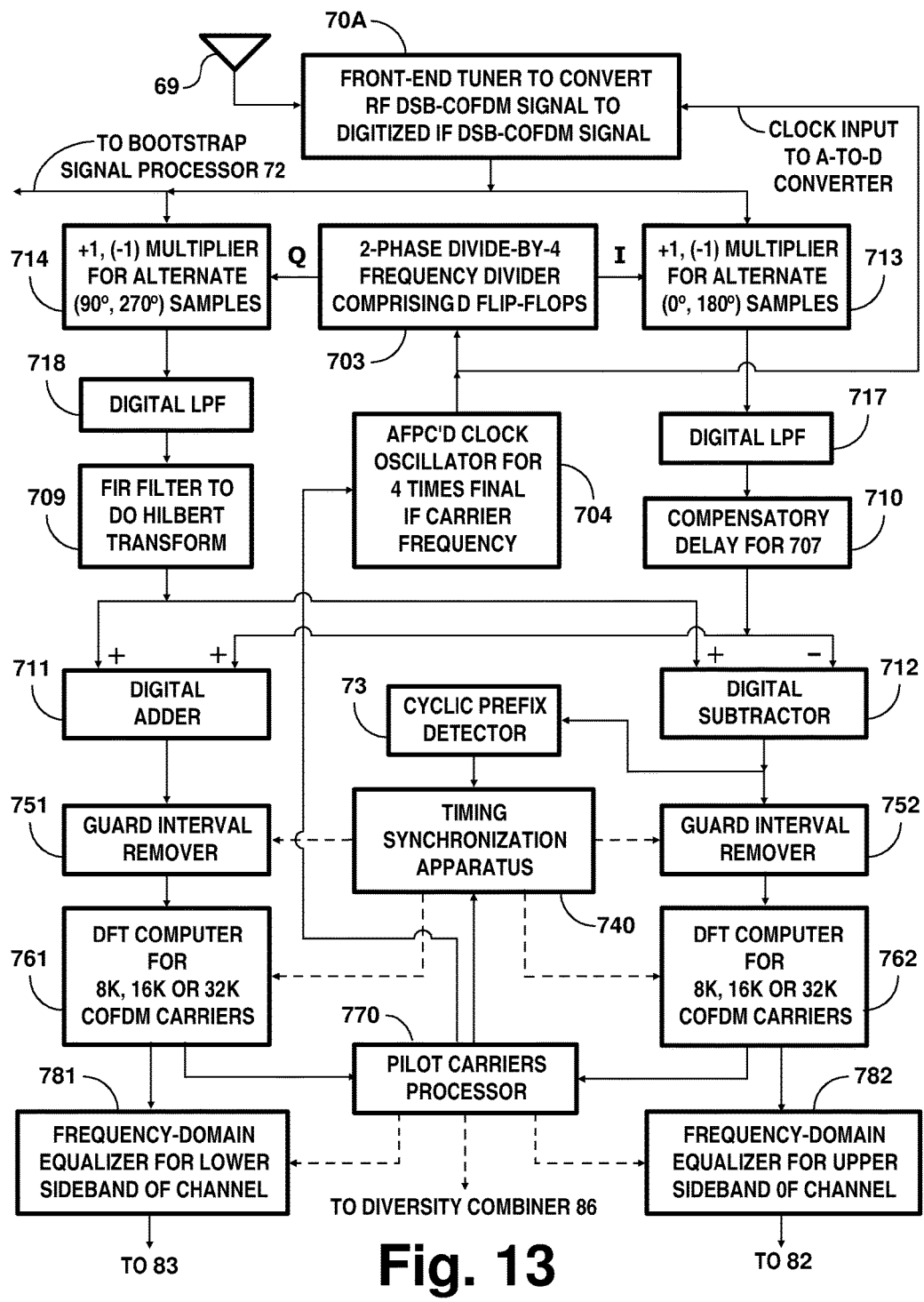

Not all COFDM communication systems will concatenate BCH coding and LDPC coding. Cyclic redundancy check (CRC) coding can be used instead of BCH coding for detecting the successful conclusion of LDPC decoding. In such case, the general structure of COFDM receiver apparatus depicted in FIGS. 12 and 13 is modified to replace the decoder 89 for BCH coding with a decoder for CRC coding. However, unlike the decoder 89 for BCH coding, the decoder for CRC coding will not be capable of correcting remnant errors from iterative decoding of LDPC coding. LDPC coding that lends itself to being successfully decoded in a few iterations will allow the decoder 88 to be replaced by direct connection from the SISO decoder 88 to the input port of the BB Frame descrambler 91. The LDPC block coding that has customarily been used in DTV broadcasting can be replaced with LDPC convolutional coding. Multi-level coding (MLC) can be used, rather than bit-interleaved coded modulation (BICM). If MLC is used, there is less reason to consider replacing uniform QAM of OFDM carriers with non-uniform QAM than there is for BICM. (Incidentally, convolutional LDPC coding is better adapted to MLC than is block LDPC coding.)

Figure 6:
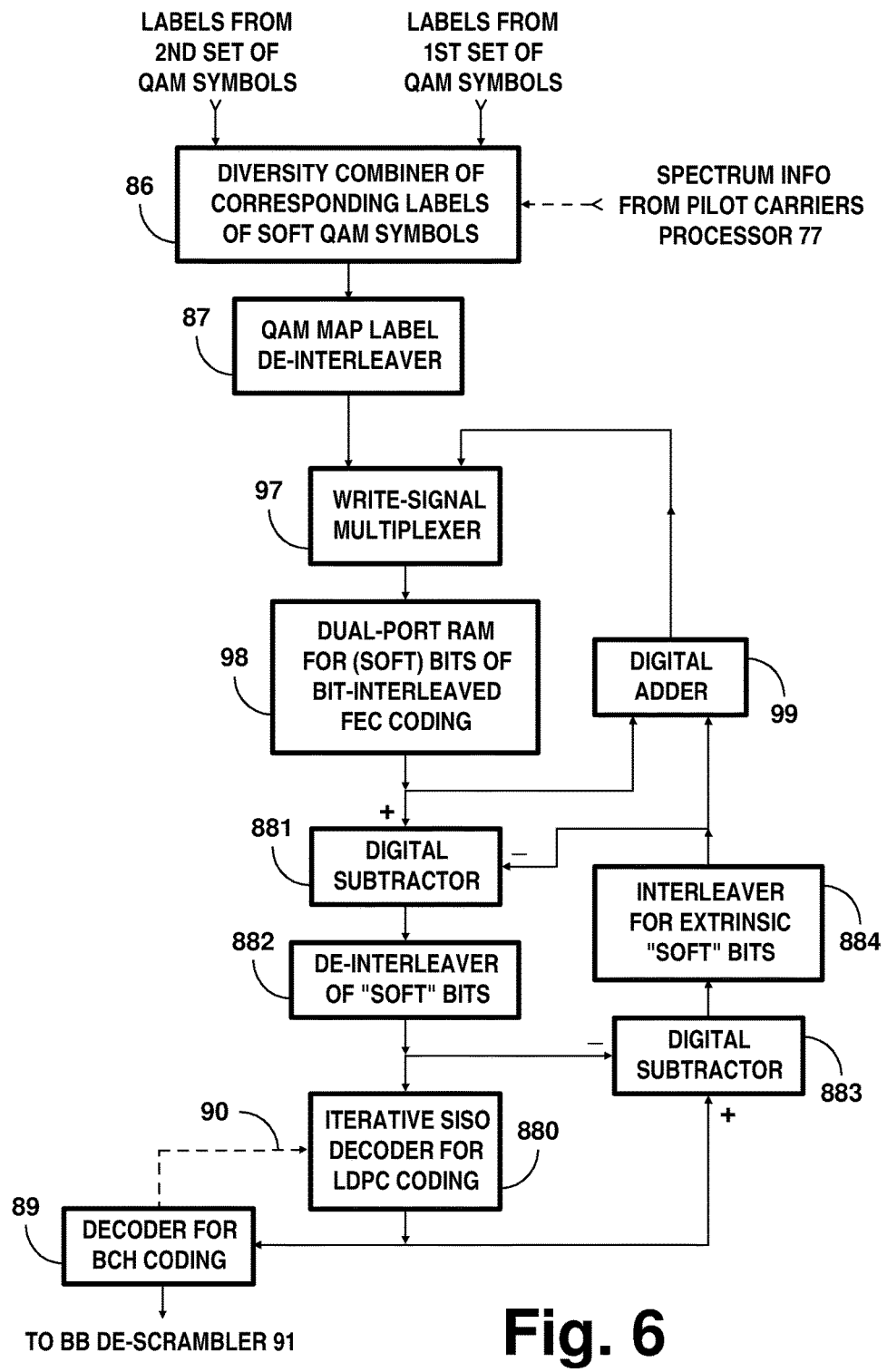
FIG. 6 is a detailed schematic diagram of modifications made to the receiver apparatus shown in any of FIGS. 5, 7 and 10 to arrange for performing soft-demapping and soft-decoding procedures iteratively in accordance with the "turbo" principle.
Figure 7:
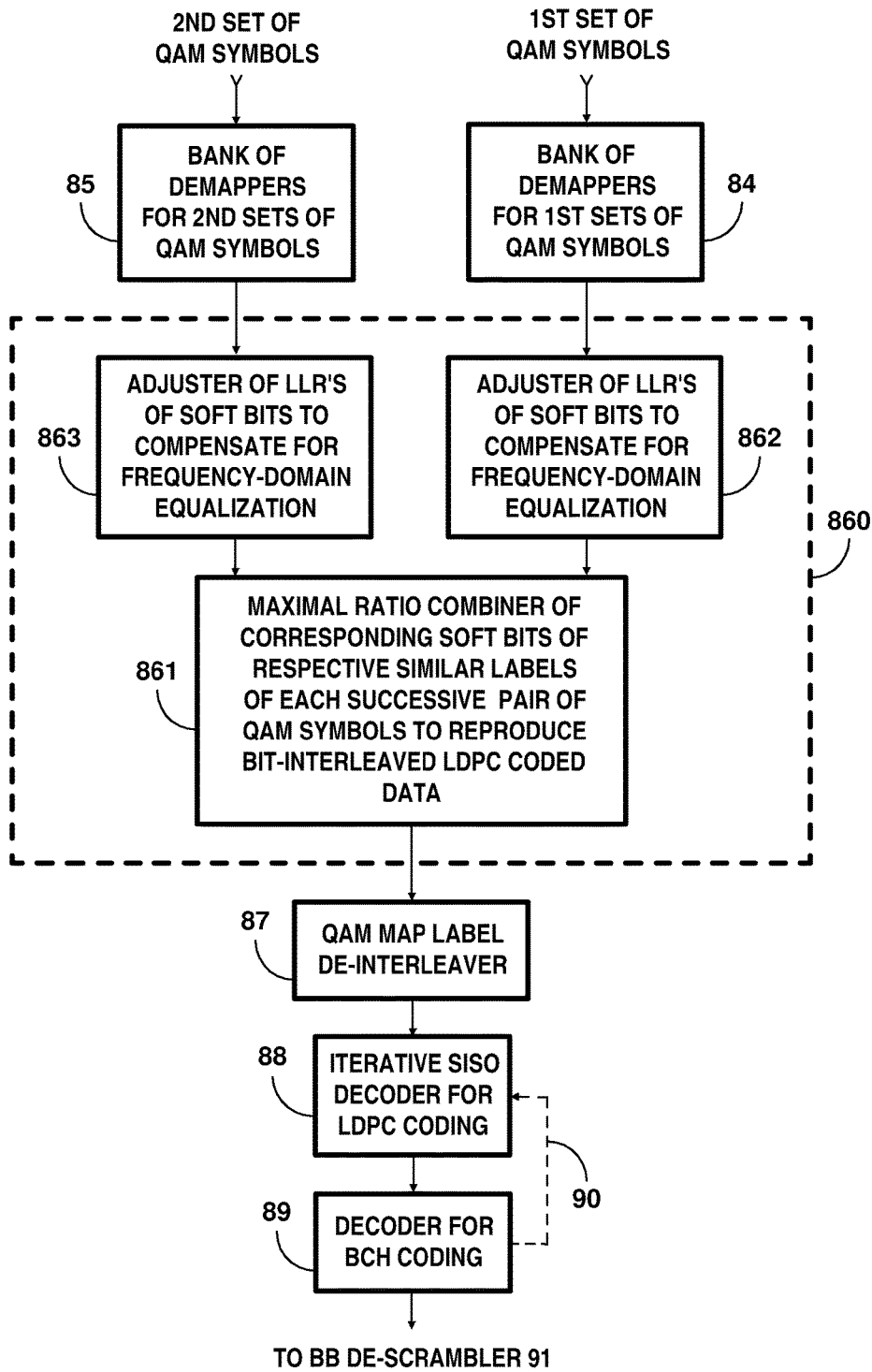
FIG. 7 is a schematic diagram of a representative portion of some COFDM receiver apparatus per FIG. 5, in which the diversity combiner used for combining the results of dual QAM demappers more specifically comprises a maximal-ratio combiner operative on soft bits at bit level, rather than at symbol level, the results of the dual QAM demappers being adjusted prior to application to the maximal-ratio combiner thus to implement a degree of selective diversity combining.
Figure 10:
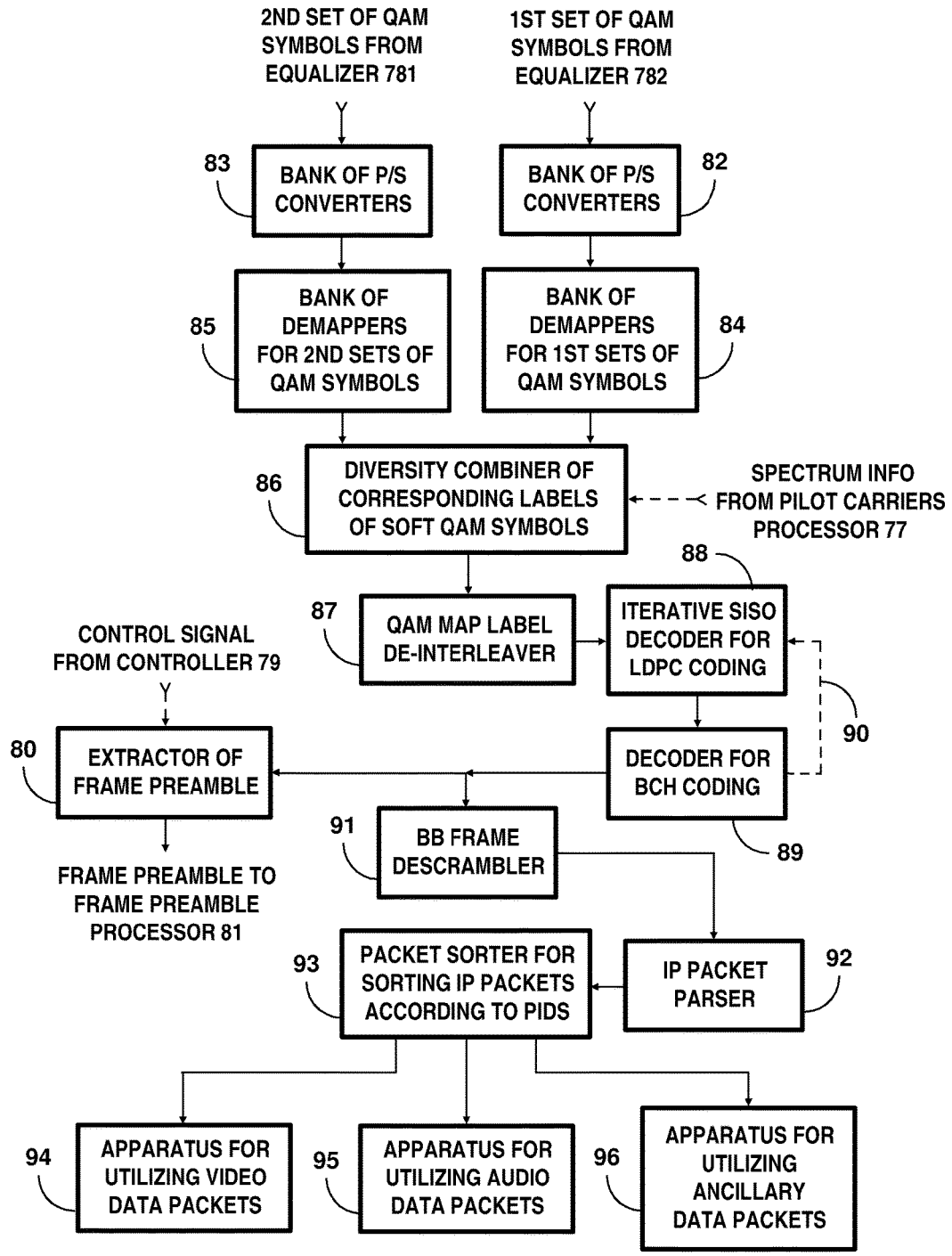

FIG. 6 is a detailed schematic diagram of modifications made to the receiver apparatus shown in any of FIGS. 5, 7 and 10. FIG. 6 depicts the iterative SISO decoder 88 for bit-interleaved LDPC coding in further detail as comprising an iterative SISO decoder 880 for LDPC coding, a digital subtractor 881, a de-interleaver 882 of "soft" bits, a digital subtractor 883 and an interleaver 884 for extrinsic "soft" bits. FIG. 6 further depicts a write-signal multiplexer 97, a dual port random-access memory 98 and a digital adder 99 arranged to cooperate with demappers of QAM symbols to perform soft-demapping and soft-decoding procedures iteratively in accordance with the "turbo" principle. U.S. Pat. No. 6,353,911 titled "Iterative demapping" granted 5 Mar. 2002 to Stefan ten Brink provides generic description of an arrangement for performing such soft-demapping and soft-decoding procedures, which arrangement includes an adaptive QAM demapper. A question that arises with regard to a receiver which includes two QAM demappers, one for the lower sideband of a DSB-COFDM signal and the other for the upper sideband of that DSB-COFDM signal, is how adaptive demapping can be implemented.

FIG. 6 shows the output port of the diversity combiner 86 connected via the QAM map label de-interleaver 87 to a first of two input ports of the write-signal multiplexer 97. The output port of the multiplexer 97 connects to the write-input port of a dual-port random-access memory 98. The diversity combiner 86 periodically supplies soft bits of bit-interleaved LDPC-coded data to the input port of the QAM map label de-interleaver 87. The de-interleaver 87 response is supplied to the write-signal multiplexer 97, thence to be written into the dual-port RAM 98. The read-output port of the dual-port RAM 98 connects to a first addend-input port of a digital adder 99, the second addend-input port of which adder 99 is connected for receiving a bit-interleaved extrinsic error signal. The sum output port of the adder 99 connects to the second of the two input ports of the write-signal multiplexer 98.

The read-output port of the dual-port RAM 98 is further connected for supplying a posteriori soft demapping results to the minuend-input port of the digital subtractor 881. The subtrahend-input port of the digital subtractor 881 is connected for receiving the bit-interleaved extrinsic error signal from the output port of the interleaver 884 for extrinsic "soft" bits. The difference output port of the digital subtractor 881 connects to the input port of the de-interleaver 882 for bit-interleaved soft bits. The output port of the de-interleaver 88 connects to the input port of the soft-input/soft-output (SISO) decoder 880 for LDPC coding and further connects to the subtrahend input port of the digital subtractor 883. The minuend input port of the subtractor 883 is connected to receive the soft bits of decoding results from the output port of the SISO decoder 880. The subtractor 883 generates soft extrinsic data bits from the SISO decoder 88 by comparing the soft output bits supplied from the SISO decoder 880 with soft input bits supplied to the SISO decoder 880. The output port of the subtractor 883 is connected to supply these soft extrinsic data bits to the input port of the bit-interleaver 884, which is complementary to the de-interleaver 882. The output port of the bit-interleaver 884 is connected for feeding back bit-interleaved soft extrinsic data bits to the second addend-input port of the digital adder 99, there to be additively combined with previous a posteriori soft demapping results read from the dual-port RAM 98 to generate updated a priori soft demapping results to write over the previous ones read from that memory 98.

More specifically, the RAM 98 is read concurrently with memory within the bit-interleaver 884, and the soft bits read out in LLR form from the memory 98 are supplied to the first input port of the digital adder 98. The adder 98 adds the interleaved soft extrinsic bits fed back from the SISO decoder 88 to respective ones of the soft bits of a posteriori soft demapping results read from the RAM 98 to generate updated a priori soft demapping results supplied from the sum output port of the adder 99 to the write-input port of the RAM 98 via the write signal multiplexer 97. The soft bits of previous a posteriori demapping results temporarily stored in the RAM 98 are each written over after its being read and before another soft bit is read.

The output port of the bit-interleaver 884 is also further connected for feeding back bit-interleaved soft extrinsic data bits to the subtrahend input port of the subtractor 881. The subtractor 881 differentially combines the bit-interleaved soft extrinsic data bits fed back to it with respective ones of soft bits of the a posteriori demapping results read from the RAM 98, to generate soft extrinsic data bits for the adaptive soft demapper from the difference-output port of the subtractor 881 for application to the input port of the de-interleaver 882. As thus far described, the SISO decoder 88 and the adaptive soft demapper (comprising elements 97, 98 and 99) are in a turbo loop connection with each other, and the turbo cycle of demapping QAM constellations and decoding LDPC can be iterated many times to reduce bit errors in the BCH coding that the SISO decoder 88 finally supplies from its output port to the input port of the decoder 89 of BCH coding. Successful correction of BCH codewords can be used for terminating iterative demapping and decoding of LDPC coding after fewer turbo cycles than the maximum number permitted.

FIG. 7 depicts in more detail a representative portion of COFDM receiver apparatus per FIG. 5 including a preferred embodiment 860 of the diversity combiner 86. In FIG. 7 the diversity combiner 860 used for combining the results of dual QAM demappers 84 and 85 comprises a maximal-ratio combiner 861 operative on soft bits at bit level, rather than symbol level. Preferably, maximal-ratio combining is performed at bit level, rather than QAM symbol level, if the QAM symbols employ Gray mapping. Then, combining at the QAM symbol level increases the effective SNR for an AWGN channel by 3 dB, whether done before or after QAM demapping. Combining at the bit level after QAM demapping increases the effective SNR for the AWGN channel by an additional 2.5 dB or so, however, if the dual mapping uses the same QAM mapping in each transmission. This was described by Monisha Ghosh, Joseph P. Meehan and Xuemei Ouyang in U.S. Pat. No. 7,236,548 issued 26 Jun. 2007 and titled "Bit level diversity combining for COFDM system". The 2.5 dB gain in SNR will increase the maximum range of acceptable reception of the COFDM signal for given transmitter power, given a proper receiver. The 2.5 dB gain in SNR is in effect an absolute gain of 1.78 in terms of signal power. Presuming received power falls off as the square of distance from the transmitter, an absolute gain of 1.78 in terms of signal power supports an increase in the maximum range of acceptable reception of the COFDM signal for given transmitter power by a factor of $1.78^{(1/2)}$ =1.33. That is, there is a 33% increase in the maximum range of acceptable reception of the COFDM signal for given transmitter power.

Maximal-ratio combining at bit level is performed after QAM demapping, rather than before. Each demapper of QAM symbols comprises a plurality of read-only memories (ROMs), one ROM for each bit of a particular size of QAM map label, which ROMs each receive as input address thereto the complex coordinates descriptive of a current one of a succession of QAM symbol. Each ROM generates a respective "soft" bit, a bit metric composed of the more likely one of the "hard" bits 1 and 0 accompanied by a confidence factor. Customarily, the confidence factor is a logarithm of likelihood ratio (LLR) indicating how likely that decision as to the "hard" bit is correct. The maximal-ratio combiner 861 considers 1 and 0 "hard" bits as sign bits when combining the LLRs of each successive pair of "soft" bits in a signed addition. The sign bit of the resultant sum determines the "hard" bit in the "soft" bit response from the maximal-ratio combiner 861 and the rest of this resultant sum determines the LLR of the correctness of this "hard" bit in the "soft" bit response from the maximal-ratio combiner 861. Since the frequency-diverse QAM signals being combined are transmitted over the same RF channel, the respective phasings of the quadrature-amplitude-modulated OFDM carriers are in relatively well-defined relationship relative to each other. Maintaining constant relative phasings among the OFDM carriers is considerably easier than when two diverse transmissions travel over paths different in length or are propagated at respective times further apart.

Maximal-ratio combining of frequency-diverse QAM signals is recognized as being superior to all other well-known types of diversity combining when those signals are afflicted by AWGN, atmospheric noise, Johnson noise within the receiver, or imperfect filtering of power from an alternating-current power source. However, maximal-ratio combining of frequency-diverse QAM signals performs less satisfactorily when one QAM signal is corrupted by burst noise or in-channel interfering signal and the other is not. Signal-selective methods of diversity combining are less disrupted by one QAM signal being corrupted by burst noise or in-channel interfering signal while the other is not. Designing diversity combining that can accommodate all the conditions of adverse reception described supra has been a challenging problem.

FIG. 7 shows the bank 84 of QAM demappers being followed by an adjuster 862 of the LLRs of the soft bits in its various demapping results before applying them to a first input port of the maximal-ratio combiner 861. FIG. 7 shows the bank 85 of QAM demappers being followed by an adjuster 863 of the LLRs of the soft bits in its various demapping results before applying them to a second input port of the maximal-ratio combiner 861. In practice, each of the adjusters 862 and 863 of LLRs actually comprises a respective bank of separate adjusters, one for each size of QAM symbol constellation that is apt to be received. The adjusters 862 and 863 of LLRs respond to spectrum information provided to them from the pilot carriers processor 77 depicted in FIG. 4 to introduce a degree of signal-selective combining into the results of maximal-ratio combining that the maximal-ratio combiner 861 supplies to the input port of the de-interleaver 87 of QAM map labels.

The frequency-domain equalization of QAM map coordinates ordinarily employed in a COFDM receiver boosts the levels of selectively faded frequency-diverse QAM components of COFDM symbols. This dilutes maximum-ratio combining towards equal-power combining. Noise components generated within the receiver are amplified together with boosting the selectively faded QAM, resulting in low effective SNRs. These amplified noise components can tax the data-slicing capabilities of a QAM demapper severely, especially for the less robust bits in QAM labels. The adjusters 862 and 863 of LLRs are designed to reduce the LLR confidence levels of the less robust soft bits of reproduced QAM labels, responsive to substantial boosting of the levels of the QAM constellations that give rise to those labels. To further such design, the pilot carriers processor 77 in FIG. 4 provides each of the adjusters 862 and 863 of LLRs information concerning the relative amplitudes of the QAM symbols in the first and second sets of them. Preferably, as channel equalization boosts gain more for one of a pair of QAM constellations that convey similar segments of bit-interleaved coded data than for the other, the LLRs of more soft bits of its QAM label are reduced, including increasingly robust ones of those soft bits. This frequency-selective LLR reduction procedure causes the maximal-ratio combiner to rely less on the one of a pair of QAM symbols that convey similar segments of bit-interleaved coded data, which QAM symbol is more selectively-faded than the other one of that pair of QAM symbols. The more robust soft bits of the QAM label of the more selectively faded one of the pair of QAM symbols apt to have reasonably good SNR still figure significantly in the results of combining supplied from the maximal-ratio combiner 861. However, the less robust soft bits of the QAM label of the more selectively faded one of the pair of QAM symbols apt to have poor SNR will figure less significantly, if at all, in the results of combining supplied from the maximal-ratio combiner 861.

Burst noise customarily drives the analog-to-digital conversion in a QAM demapper out of normal range, ruining its data-slicing capabilities. This adverse effect is detectable by the pilot carriers processor 77 depicted in FIG. 4, which processor 77 supplies control signals to the frequency-domain channel equalizer 78.

The pilot carriers processor 77 in FIG. 4 further provides the adjuster 862 of LLRs with indications as to whether a currently unmapped QAM symbol is very likely to be in error for being out of normal range of the complex-number analog-to-digital converter in the one of the bank 84 of demappers selected for processing the currently received first set of QAM symbols. Responsive to such an indication the adjuster 862 reduces to zero the LLRs of soft bits of QAM symbols affected by the analog-to-digital conversions in the selected one of the bank 84 of demappers being out of normal range. If at the same time the analog-to-digital conversions in the selected one of the demappers in the bank 85 of demappers are within normal range, the maximal-ratio combiner 861 will be conditioned to function as a signal-selective diversity combiner, reproducing the soft bits of QAM symbols from the selected demapper in the bank 85 of de-mappers.

The pilot carriers processor 77 in FIG. 4 further provides the adjuster 863 of LLRs with indications as to whether a currently unmapped QAM symbol is very likely to be in error for being out of normal range of the complex-number analog-to-digital converter in the one of the bank 85 of demappers selected for processing the currently received second set of QAM symbols. Responsive to such an indication the adjuster 863 reduces to zero the LLRs of soft bits of QAM symbols affected by the analog-to-digital conversions in the selected one of the bank 85 of demappers being out of normal range. If at the same time the analog-to-digital conversions in the selected one of the demappers in the bank 84 of demappers are within normal range, the maximal-ratio combiner 862 will be conditioned to function as a signal-selective diversity combiner, reproducing the soft bits of QAM symbols from the selected demapper in the bank 84 of de-mappers.

Sustained narrow-band co-channel interference (CCI) can cause the frequency-domain channel equalizer to reduce gain a lot for the OFDM carriers of affected frequencies. Such large reduction in gain keeps analog-to-digital conversion in the affected one of the QAM demappers 84 and 85 within normal range, but causes error in its demapping. Indications from the pilot carriers processor 77 in FIG. 4 that the frequency-domain channel equalizer will reduce gain much more for the affected frequencies than for other frequencies condition the maximal-ratio combiner 861 to function as a signal-selective diversity combiner, reproducing the soft bits of QAM symbols from the one of the demappers in banks 84 and 85 of them not affected by the sustained narrow-band CCI. The responses of the frequency-domain channel equalizer to burst noise and to sustained narrow-band CCI differ, because the responses of the pilot carriers processor 77 to respective OFDM carriers are averaged over a few COFDM symbol intervals. The control signals supplied from the pilot carriers processor 77 that condition the maximal-ratio combiner 861 to function as a signal-selective diversity combiner are supplied on a COFDM symbol by COFDM symbol basis. The control signals are similar whether the OFDM carriers are affected by sustained CCI, giving the frequency-domain channel equalizer plenty of time to respond, or instead are momentarily affected by burst noise, so the frequency-domain channel equalizer has insufficient time to respond fully.

Figure 8:
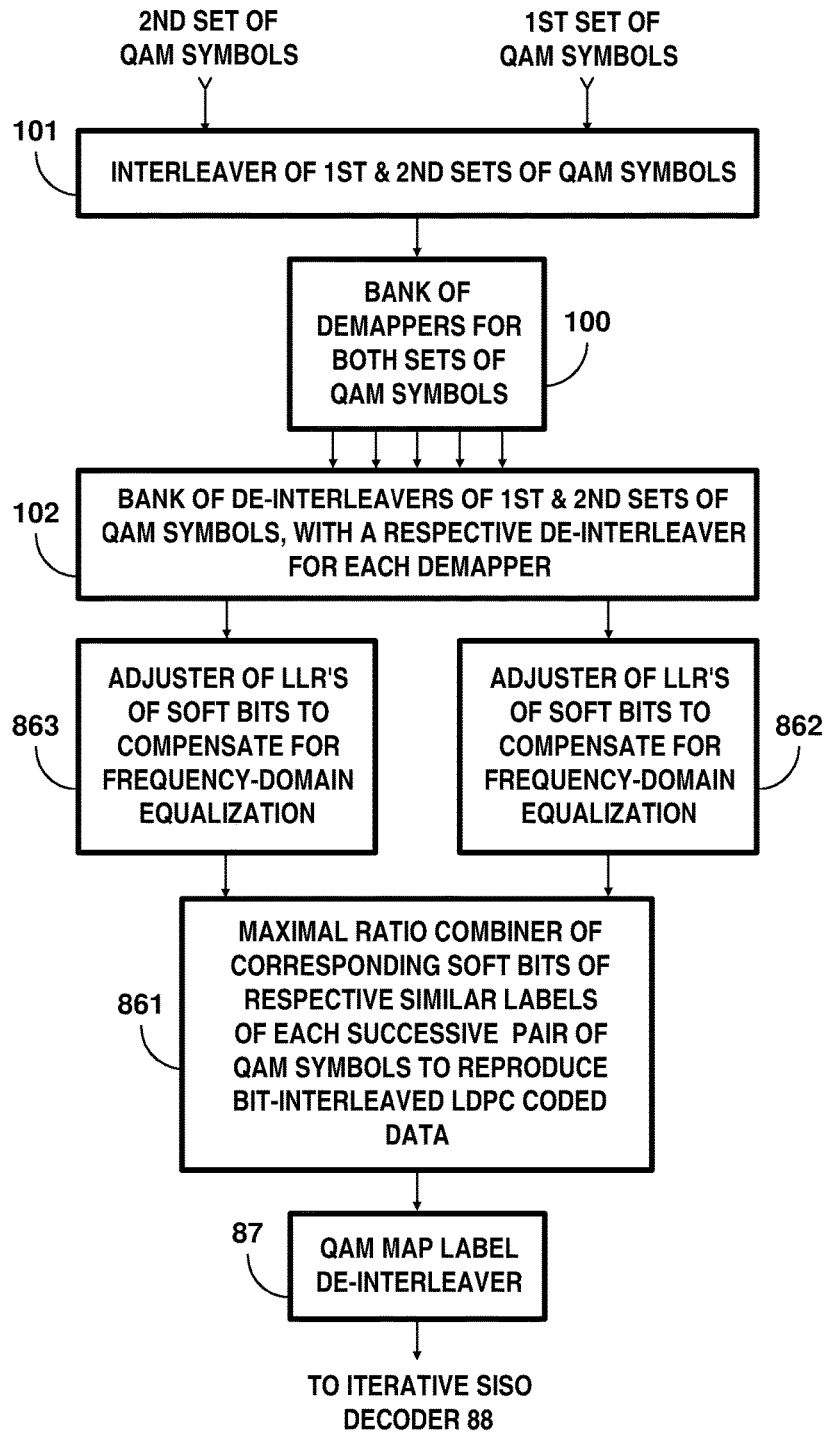
FIG. 8 is a schematic diagram of a modification of the FIG. 7 representative portion of some COFDM receiver apparatus per FIG. 5, as used in alternative embodiments of the invention.

FIG. 8 is a schematic diagram of a modification of the FIG. 7 representative portion of some COFDM receiver apparatus per FIG. 5, as used in alternative embodiments of the invention. The FIG. 8 modification employs a single bank 100 of demappers for QAM symbols instead of a bank 84 of demappers for the first sets of QAM symbol constellations from the upper sidebands of DSB-OFDM signals and another bank 85 of demappers for the first sets of QAM symbol constellations from the lower sidebands of DSB-OFDM signals. The output port of the bank 82 of P/S converters is connected for supplying the first set of QAM symbol constellations to a first input port of an interleaver 101 for QAM symbols, and the output port of the bank 83 of P/S converters is connected for supplying the second set of QAM symbol constellations to a second input port of that interleaver 101. The output port of the QAM symbols interleaver 101 is connected for supplying QAM symbol constellations alternatively selected from the first and second sets of them to the input port of the bank 100 of demappers for both sets of QAM symbols.

The respective output port of each of the demappers in bank 100 of them connects to a respective input port of one of the de-interleavers in bank 102 of them. Responsive to received COFDM signal, the controller 79 supplies control signals for selecting a suitable one of the bank 100 of demappers and the one of the bank 102 of de-interleavers that is associated with that selected demapper. The selected one of the bank 102 of de-interleavers is conditioned to supply a separated first set of map labels from a first output port thereof to the input port of the adjuster 862 of the LLRs of the soft bits in those map labels. The selected one of the bank 102 of de-interleavers is also conditioned to supply a separated second set of map labels from a second output port thereof to the input port of the adjuster 863 of the LLRs of the soft bits in those map labels.

The front-end tuner 70 depicted in the FIG. 4 portion of receiver apparatus can usefully employ the well-known "phase-shift method" for single-sideband (SSB) demodulation of double-sideband COFDM signals. Respective mixers can perform in-phase and quadrature heterodynes of a selected selected DSB-COFDM signal with beat-frequency oscillations of the frequency of an edge pilot carrier. The complex samples resulting from the quadrature heterodyne are Hilbert transformed for combining with suitably delayed complex samples resulting from the in-phase heterodyne.

If the frequency of the beat-frequency oscillations corresponds to the lowest-frequency edge pilot carrier of the selected DSB-COFDM signal, the Hilbert transformed complex samples resulting from the quadrature heterodyne are subtracted from corresponding delayed samples resulting from the in-phase heterodyne to generate the baseband single-sideband COFDM signal applied to the DFT computer 70 after removal of guard intervals. This procedure effectively suppresses artifacts of any adjacent channel signal lower in frequency than the selected DSB-COFDM signal, without affecting low frequencies of the baseband single-sideband COFDM signal. The effects of any adjacent channel signal higher in frequency than the selected DSB-COFDM signal are readily suppressed in DFT computation by the DFT computer 70 after removal of guard intervals.

If the frequency of the beat-frequency oscillations corresponds to the highest-frequency edge pilot carrier of the selected DSB-COFDM signal, the Hilbert transformed complex samples resulting from the quadrature heterodyne are added to corresponding delayed samples resulting from the in-phase heterodyne to generate the baseband single-sideband COFDM signal applied to the DFT computer 70 after removal of guard intervals. This procedure effectively suppresses artifacts of any adjacent channel signal higher in frequency than the selected DSB-COFDM signal, without affecting low frequencies of the baseband single-sideband COFDM signal. The effects of any adjacent channel signal lower in frequency than the selected DSB-COFDM signal are readily suppressed in DFT computation by the DFT computer 70 after removal of guard intervals.

The methods described in the foregoing two paragraphs can largely, if not completely, avoid problems of the frequency response of the baseband single-sideband COFDM signal being affected by bandpass filtering of the RF and IF double-sideband COFDM signal. However, implementation of an FIR Hilbert transformer filter for baseband signal is a complex procedure and tends to be difficult to incorporate together with other elements within the confines of a monolithic integrated circuit. The AFPC generator 71 for generating AFPC of oscillations supplied by the final local oscillator within the front-end tuner 70 is apt to be somewhat more complex in design than an AFPC generator for generating AFPC of beat-frequency oscillations supplied by the final local oscillator within the front-end tuner 70, which beat-frequency oscillations are at the carrier frequency of the IF double-sideband COFDM signal.

Figure 9:
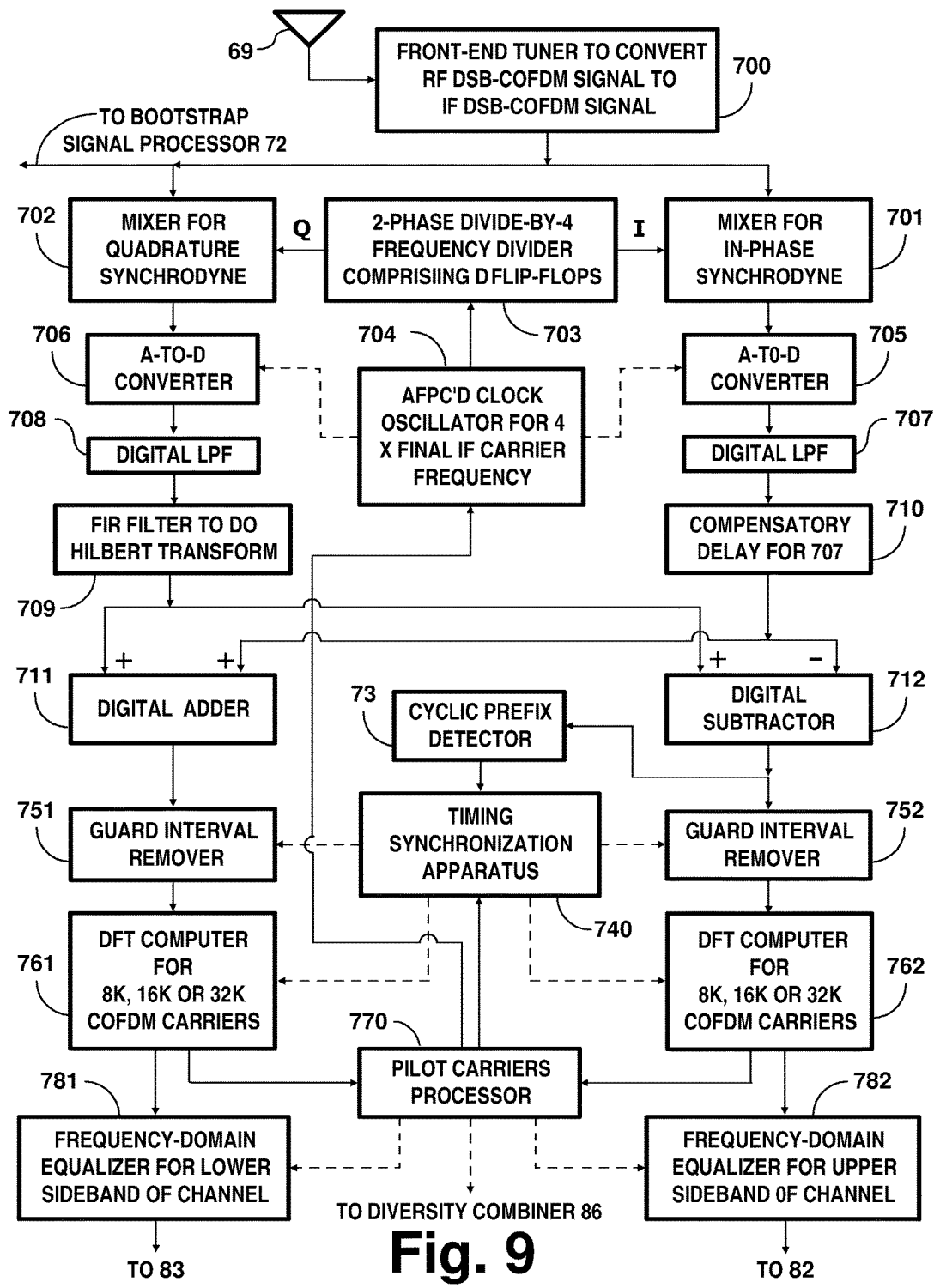
FIGS. 9 and 10 together form a schematic diagram of the general structure of receiver apparatus for independent-sideband (ISB) demodulation of DSB-COFDM signals using respective phase-shift methods to respond separately to the concurrent lower-frequency and upper-frequency sidebands of those signals, which receiver apparatus embodies aspects of the invention.

FIGS. 9 and 10 together depict receiver apparatus for independent-sideband (ISB) demodulation of DSB-COFDM signals using respective phase-shift methods to respond separately to the concurrent lower-frequency and upper-frequency sidebands of those signals. The receiver apparatus depicted in FIG. 9 extends the phase-shift methods for demodulating SSB amplitude-modulation signal described supra to demodulating the two sidebands of DSB-COFDM signals to certain extent separately from each other. A reception antenna 69 captures the radio-frequency COFDM signal for application as input signal to a front-end tuner 700 of the receiver. The front-end tuner 700 converts a selected radio-frequency DSB-COFDM signal to an intermediate-frequency DSB-COFDM signal, which is supplied to the respective signal input ports of mixers 701 and 702.

U.S. provisional Pat. App. 62/488,793 filed 23 Apr. 2017 by A. L. R. Limberg and titled "Double-sideband COFDM signal receivers that demodulate unfolded frequency spectrum" illustrates a beat-frequency oscillator (BFO) supplying in-phase (I) and quadrature (Q) beat-frequency oscillations to the respective carrier input ports of analog mixers and via a direct connection and via a −90° phase-shifter, respectively. Such practice is problematic in the following two respects. It is difficult to realize a phase-shifter with analog circuitry, which phase-shifter provides exact −90° phase shift despite change in BFO frequency. Also, maintaining the amplitudes of the beat-frequency oscillations to the respective carrier input ports of the two analog mixers the same is rather difficult.

Figure 11:
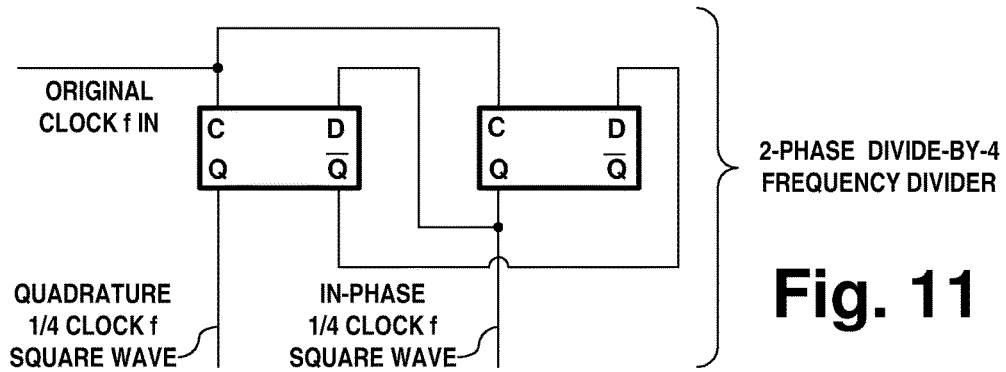
FIG. 11 is a schematic diagram of a two-phase divide-by-four frequency divider constructed from gated D flip-flops or data latches, which sort of frequency divider is an element in the receiver apparatus depicted in FIGS. 9 and 13-19.

The latter of these difficulties is avoided by mixers 701 and 702 being of switching type receiving I and Q square waves at their respective carrier input ports. Fundamental-frequency components of the I and Q square waves that are at quite exactly at 0° and −90° relative phasings, despite change in frequency, are supplied from a 2-phase divide-by-4 frequency divider 703 in response to rising edges of pulses from a clock oscillator 704. The frequency divider 703 can be constructed from two gated D flip flop-flops (or data latches) suitably connected as shown in FIG. 11. The clock oscillator 704 is subject to automatic frequency and phase control (AFPC) that adjusts the frequency of clock pulses to be four times the final intermediate-frequency (IF) carrier of the COFDM signals. A voltage-controlled crystal oscillator (VCXO) supplying oscillations nominally at 44 MHz is perhaps the optimal choice for the clock oscillator 704. The leading, in-phase (I) square wave that the frequency divider 703 supplies to the carrier input port of the mixer 701 conditions the mixer 701 to provide an in-phase synchrodyne of intermediate-frequency DSB-COFDM signal to baseband. The lagging, quadrature (Q) square wave that the frequency divider 703 supplies to the carrier input port of the mixer 702 conditions the mixer 702 to provide a quadrature synchrodyne of intermediate-frequency DSB-COFDM signal to baseband.

An analog-to-digital converter (ADC) 705 performs analog-to-digital conversion of the in-phase and quadrature components of the baseband signal supplied from the output port of the mixer 701. The sampling of the mixer 701 output signal by the A-to-D converter 705 is timed by a first set of clock pulses received from the clock oscillator 704. An analog-to-digital converter (ADC) 706 performs analog-to-digital conversion of the baseband signal supplied from the output port of the mixer 702. The sampling of the mixer 702 output signal by the A-to-D converter 706 is timed by a second set of alternate clock pulses received from the clock oscillator 704. The digitized in-phase baseband signal supplied from the output port of the A-to-D converter 705 is supplied to the input port of a digital lowpass filter 707. The digitized quadrature baseband signal supplied from the output port of the A-to-D converter 706 is supplied to the input port of a digital lowpass filter 708. The digital lowpass filters 707 and 708 are of similar design, each to supply a response to a respective sideband which response is free of components of image signal remnant from the synchrodyning procedures. Preferably, the design of the digital lowpass filters 707 and 708 provides a rapid roll-off of their higher-frequency responses, so as to suppress adjacent-channel interference (ACI).

The response of the digital lowpass filter 707 to quadrature baseband signal is supplied to the input port of a finite-impulse-response digital filter 709 for Hilbert transformation. The response of the digital lowpass filter 708 to in-phase baseband signal is supplied to the input port of a clocked digital delay line 710 that affords delay to compensate for the latent delay through the FIR filter 709. The Hilbert transform response of the FIR filter 709 and the response of the digital delay line 710 are supplied to respective addend input ports of a digital adder 711 operative to recover at baseband the lower sideband of the DSB-COFDM signal at its sum output port. The Hilbert transform response of the FIR filter 709 and the response of the digital delay line 710 are supplied respectively to the minuend input port and the subtrahend input port of a digital subtractor 712 operative to recover at baseband the upper sideband of the DSB-COFDM signal at its difference output port.

The sum output port of the digital adder 711 connects to the input port of a guard interval remover 751. The output port of the guard interval remover 751 is connected for supplying the input port of a discrete-Fourier-transform (DFT) computer 761 with windowed portions of the digitized lower sideband of the DSB-COFDM signal at baseband that span respective COFDM symbol intervals. The complex coordinates of QAM symbols the DFT computer 761 extracts from lower sideband carriers in each COFDM symbol sampling interval that convey coded data are supplied as parallel input signal to a frequency-domain channel equalizer 781 for QAM symbols extracted from the upper sideband of the double-sideband COFDM signal. Parallel output ports of the channel equalizer 781 are connected for supplying equalized QAM symbols to the parallel inputs of the P/S converter 83 in the FIG. 10 portion of the COFDM television receiver.

Subsequent to the recovery of the digitized upper sideband of the DSB-COFDM signal at baseband by phase shift method, it is supplied from the difference output port of the digital subtractor 712 to the input port of a guard interval remover 752. The output port of the guard interval remover 752 is connected for supplying the input port of a DFT computer 762 with windowed portions of the digitized upper sideband of the DSB-COFDM signal at baseband that span respective COFDM symbol intervals. The complex coordinates of QAM symbols the DFT computer 762 extracts from upper sideband carriers in each COFDM symbol sampling interval that convey coded data are supplied as parallel input signal to a frequency-domain channel equalizer 782 for QAM symbols extracted from the upper sideband of the double-sideband COFDM signal. Parallel output ports of the channel equalizer 782 are connected for supplying equalized QAM symbols to the parallel inputs of the P/S converter 82 in the FIG. 10 portion of the COFDM television receiver.

The DFT computers 761 and 762 are similar in construction, each configured so it can demodulate any one of 8K, 16K or 32K options as to the nominal number of OFDM carriers. The correct option is chosen responsive to an instruction from a controller 79 that generates a number of instructions used to configure the COFDM receiver to suit the broadcast standard used transmissions currently received.

The guard interval removers 751 and 752 are each constructed similarly to the guard interval remover 75 in the FIG. 4 receiver apparatus, removing guard intervals responsive to the occurrences of cyclic prefixes having been detected by a cyclic prefix detector 73. FIG. 9 shows the input port of the cyclic prefix detector 73 connected for detecting the occurrences of cyclic prefixes in the digitized upper sideband of the DSB-COFDM signal supplied at baseband from the output port of the digital subtractor 712. Alternatively, the input port of the cyclic prefix detector 73 can instead be connected for detecting the occurrences of cyclic prefixes in the digitized lower sideband of the DSB-COFDM signal supplied at baseband from the output port of the digital adder 711. The cyclic prefix detector 73 differentially combines the digitized samples of baseband COFDM signal with those samples as delayed by the duration of an effective COFDM symbol. Nulls in the difference signal so generated should occur, marking the guard intervals of the baseband COFDM signal. The nulls are processed to reduce any corruption caused by noise and to generate better-defined indications of the phasing of COFDM symbols. The output port of the cyclic prefix detector 73 is connected to supply these indications to a first of two input ports of timing synchronization apparatus 740. First and second output ports of the timing synchronization apparatus 740 are connected for supplying similar gating control signals to the control input ports of the guard interval removers 751 and 752. Third and fourth output ports of the timing synchronization apparatus 740 are connected for supplying indications of the phasing of COFDM symbols to the DFT computers 761 and 762 respectively.

The complex coordinates of QAM symbols extracted from pilot carriers in each COFDM symbol sampling interval are supplied as parallel input signal to a pilot carriers processor 770. The pilot carriers processor 770 responds to complex coordinates of QAM symbols extracted from lower-sideband pilot carriers to generate weighting coefficients for the frequency-domain channel equalizer 781 to apply to QAM symbols extracted from the upper sideband of the DSB-COFDM signal. A first of four output ports of the processor 77 that are explicitly shown in FIG. 9 is connected for supplying these weighting coefficients (via wiring depicted as a dashed-line connection) to the frequency-domain channel equalizer 781, which uses those weighting coefficients for adjusting its responses to the demodulation results for each of the lower-sideband COFDM carriers that convey data. The pilot carriers processor 770 responds to complex coordinates of QAM symbols extracted from upper-sideband pilot carriers to generate weighting coefficients for the frequency-domain channel equalizer 782 to apply to QAM symbols extracted from the upper sideband of the double-sideband COFDM signal. A second of the four output ports of the processor 77 that are explicitly shown in FIG. 9 is connected for supplying these weighting coefficients (via wiring depicted as a dashed-line connection) to the frequency-domain channel equalizer 782, which uses them for adjusting its responses to the demodulation results for each of the upper-sideband COFDM carriers that convey data.

A third of the output ports of the pilot carriers processor 770 that are explicitly shown in FIG. 9 is connected for supplying more accurate window-positioning information to the second input port of the timing synchronization apparatus 740. This window-positioning information is an adjustment generated by a feedback loop that seeks to minimize the noise accompanying pilot carriers, which noise increases owing to intercarrier interference from adjoining modulated carriers when window positioning is not optimal. A fourth of the output ports of the pilot carriers processor 770 explicitly shown in FIG. 9 is connected for forwarding automatic frequency and phase control (AFPC) developed from unmodulated pilot carriers to the AFPC input port of the clock oscillator 704. The real components of the unmodulated pilot carriers are multiplied by their respective imaginary components in the pilot carriers processor 770. The processor 770 sums and low-pass filters the resulting products to develop the AFPC signal that the processor 770 supplies to the clock oscillator 704. Responsive to this AFPC signal, the clock oscillator 704 regulates the frequency of its oscillations to be four times the carrier frequency of the final IF signal that the front-end tuner 700 supplies to the input ports of the mixers 701 and 702. This AFPC signal controls the frequency and phase of the clock pulses that the clock oscillator 704 supplies to the 2-phase divide-by-4 frequency divider 703.

A fourth of the output ports of the pilot carriers processor 77 explicitly shown in FIG. 9 is connected for supplying a diversity combiner 86 (depicted in FIG. 10) with information concerning the frequency spectrum of each successive COFDM symbol.

The FIG. 10 structure includes a bank 82 of parallel-to-serial (P/S) converters for the complex coordinates of the QAM symbol constellations in each upper-frequency half COFDM symbol, which first sets of QAM symbol constellations are received in parallel from the frequency-domain channel equalizer 782. The first sets of QAM symbol constellations are supplied serially from the output port of the bank 82 of P/S converters to the input port of a bank 84 of demappers for the first sets of QAM symbol constellations. The FIG. 10 structure also includes a bank 83 of parallel-to-serial (P/S) converters for the complex coordinates of the QAM symbol constellations in each lower-frequency half COFDM symbol, which second sets of QAM symbol constellations are received in parallel from the frequency-domain channel equalizer 781. The second sets of QAM symbol constellations are supplied serially from the output port of the bank 83 of P/S converters to the input port of a bank 85 of demappers for the second sets of QAM symbol constellations. Each of the banks 82 and 83 of P/S converters comprises respective P/S converters that are appropriate for each number of OFDM carriers that can obtain in a half COFDM symbol. The pair of P/S converters selected for current reception is determined by a control signal that the controller 79 supplies in common to each of the banks 82 and 83 of P/S converters. The elements of the FIG. 10 structure subsequent to the banks 82 and 83 of P/S converters are connected similarly to correspondingly numbered elements of the FIG. 5 structure and function similarly.

More specifically, FIG. 10 shows connections from the output ports of the banks 84 and 85 of demappers to respective input ports of a diversity combiner 86 of corresponding soft QAM labels. The output port of the diversity combiner 86 serially supplies soft bits of successive QAM labels to the input port of a QAM map label de-interleaver 87. The read-output port of the QAM map label de-interleaver 87 is connected to the input port of an iterative soft-input/soft-output (SISO) decoder 88 for LDPC coding. The output port of the decoder 88 connected for supplying the results of its decoding LDPC coding to the input port of a decoder 89 of BCH coding. The decoder 89 of BCH coding sends an indication of when it has decoded a correct BCH codeword back to the decoder 88 of LDPC coding via a control connection 90. The output port of the decoder 89 is connected for supplying the results of its decoding BCH coding to the input port of a BB Frame descrambler 91, which includes a de-jitter buffer and null-packet re-inserter not explicitly shown. The output port of the BB Frame descrambler 91 is connected to supply IP packets to the input port of an IP packet parser 92. The output port of the IP packet parser 92 is connected to supply IP packets to a packet sorter 93 for sorting IP packets according to their respective packet identifiers (PIDs) to one of the respective input ports of apparatus 94 for utilizing video data packets, apparatus 95 for utilizing audio data packets, and apparatus 96 for utilizing ancillary data packets.

FIG. 11 depicts two data latches—i.e., gated D flip-flops—connected to provide a two-phase divide-by-four frequency divider, such as the frequency divider 703 depicted in FIG. 9. The respective clock (C) input connections of the two data latches are each connected for receiving an original clock signal of frequency f, which clock signal is received from the clock oscillator 704 for the frequency divider 703 depicted in FIG. 9. Each of the two data latches has its own normal (Q) output connection and its own complementary ($\overline{Q}$) output connection. There is wire connection from the complementary ($\overline{Q}$) output connection of the data latch at left to the data (D) input connection of the data latch at right, and there is wire connection from the normal (Q) output connection of the data latch at right to the data (D) input connection of the data latch at left. The normal (Q) output connection of the data latch at right supplies a leading square wave having an "in-phase" fundamental frequency f/4, and the normal (Q) output connection of the data latch at left supplies a lagging square wave having a "quadrature" fundamental frequency f/4 that lags the "in-phase" fundamental frequency by 90°.

Figure 14:
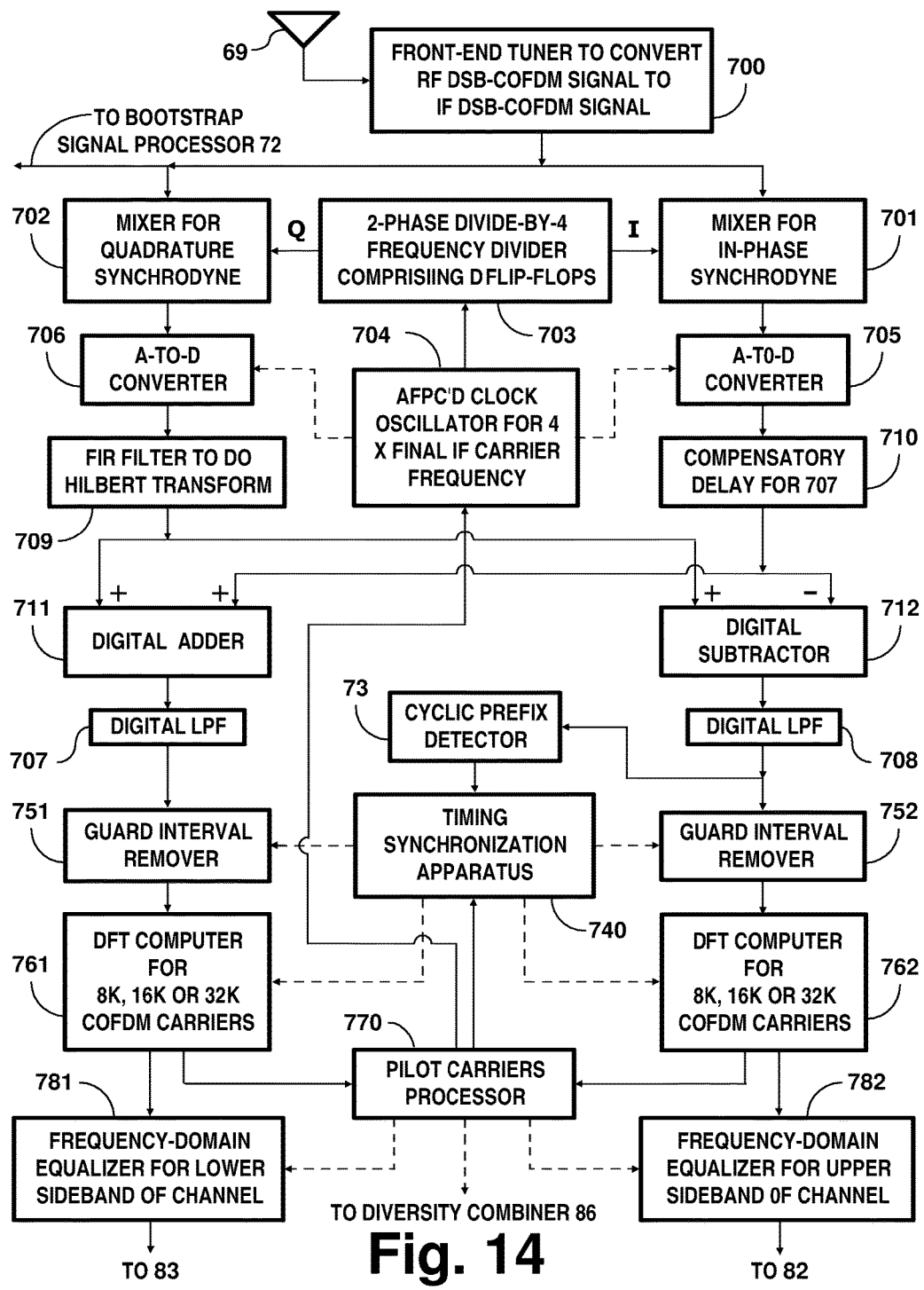
FIGS. 14 and 15 are schematic diagrams of variants of the FIG. 9 and FIG. 13 portions of COFDM receiver apparatus, respectively.
Figure 15:
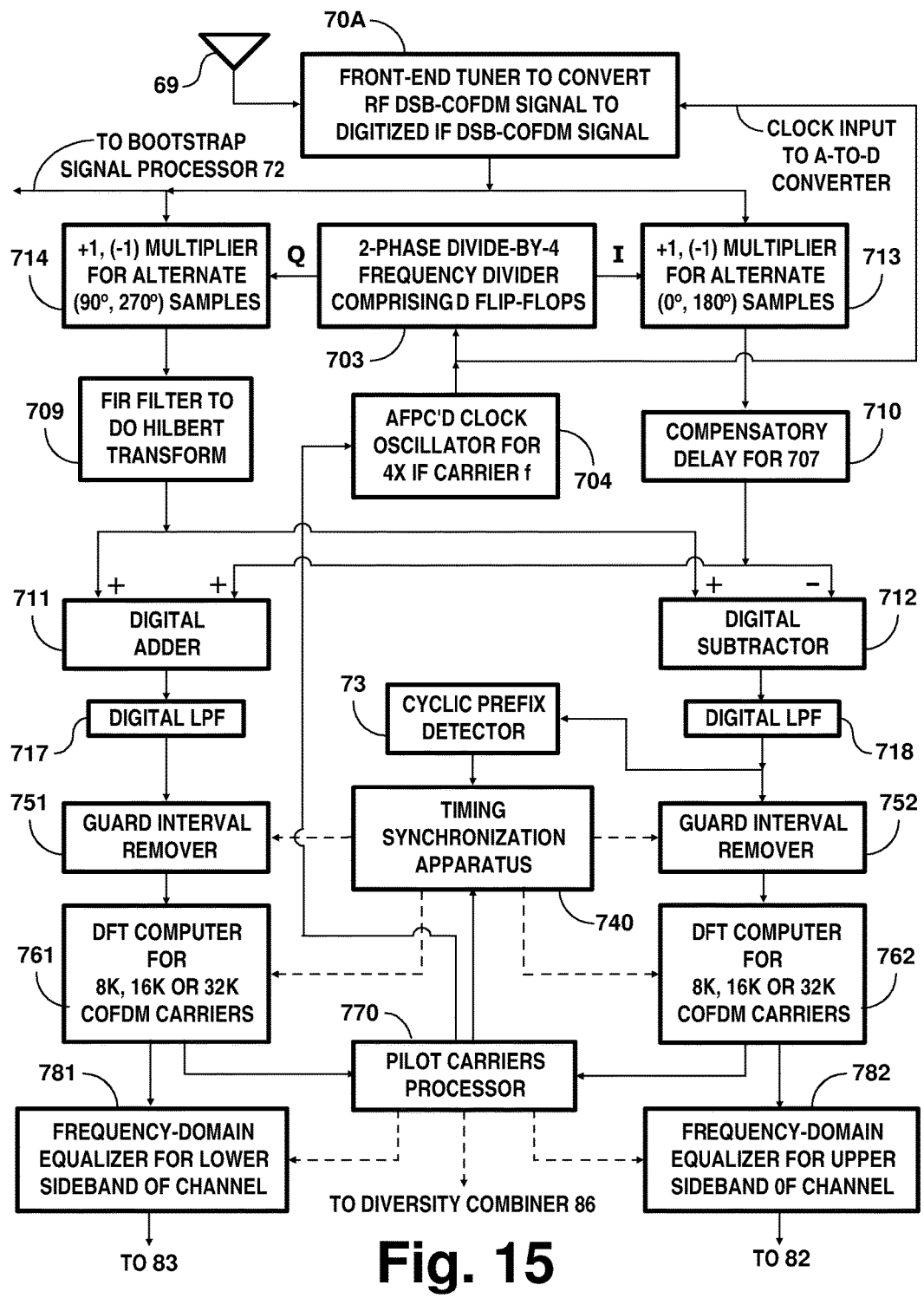
Figure 16:
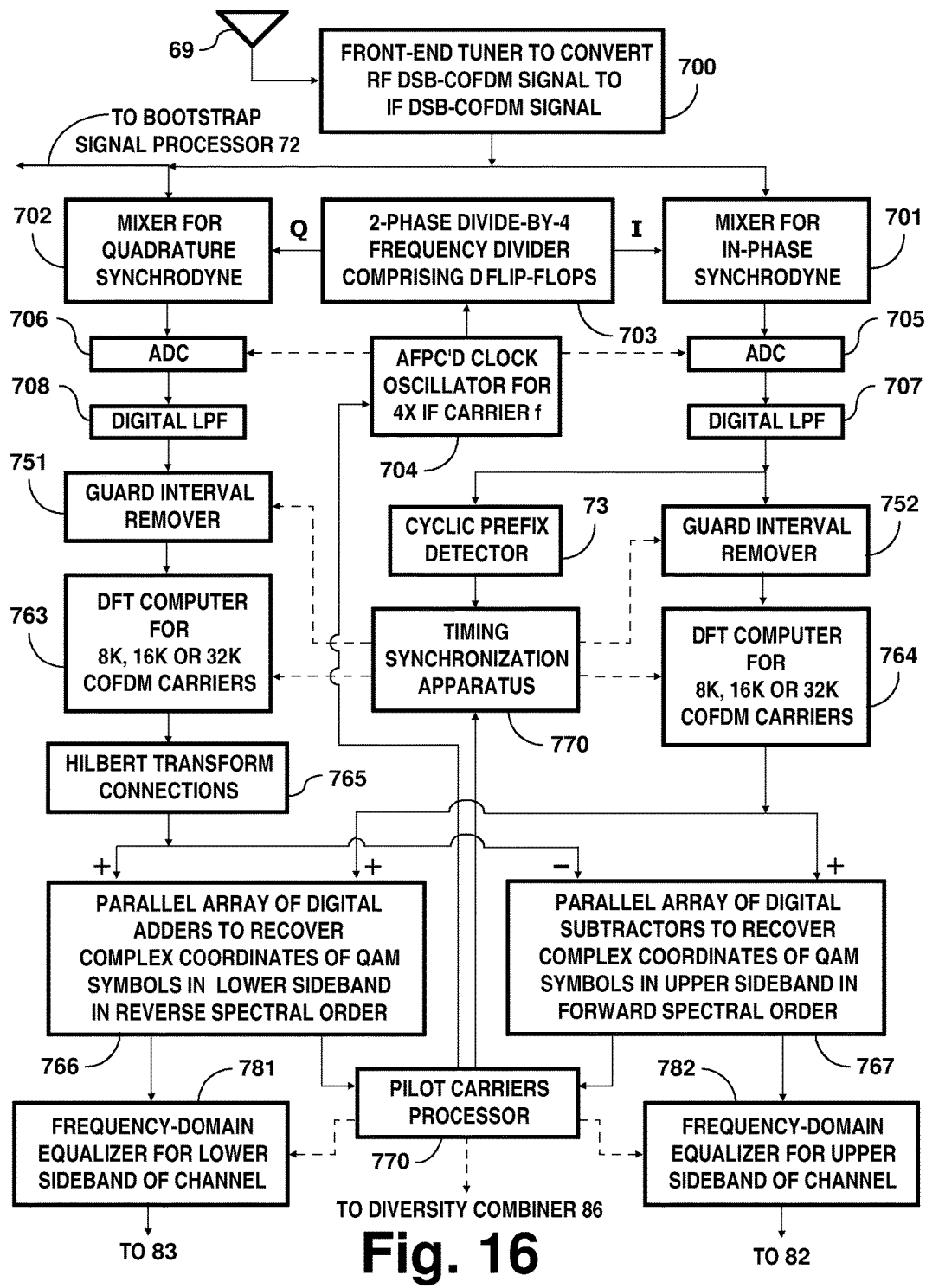
Figure 17:
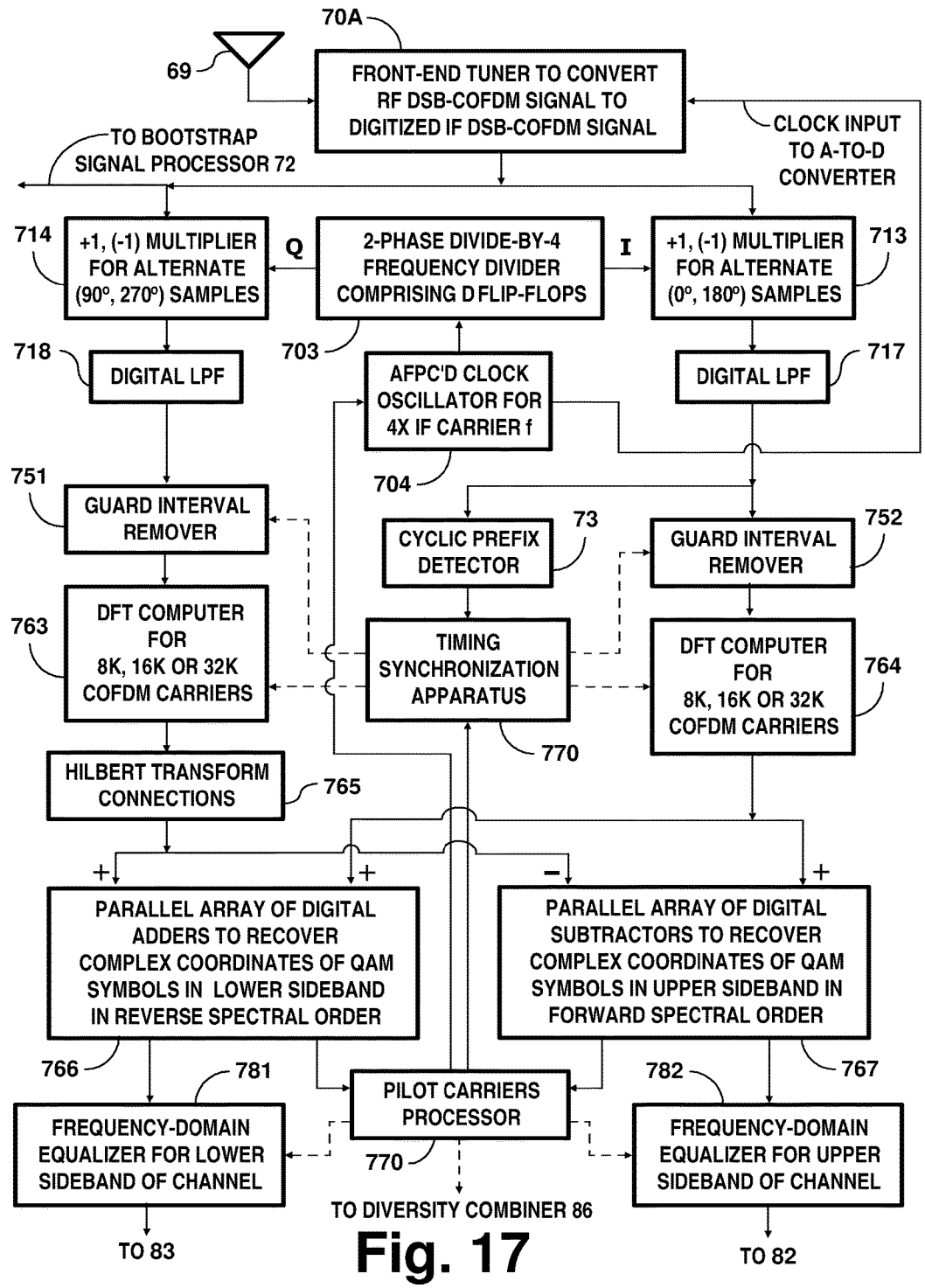

FIG. 12 depicts double-conversion front-end tuner structure suitable for the front-end tuner 700 depicted in FIGS. 9, 14 and 16 and for the front-end tuner 70A depicted in FIGS. 13, 15 and 17. Double-conversion front-end tuners are particularly advantageous over single-conversion front-end tuners when more television channels are more closely packed within the allocated television frequency spectrum. The structure is quite similar in general aspects to that described in U.S. Pat. No. 6,118,499 titled "Digital television signal receiver" granted to George Fang on 12 Sep. 2000. In a first frequency-conversion a selected radio-frequency DSB-COFDM signal is up-converted in frequency to first-intermediate-frequency DSB-COFDM signal at frequencies above the UHF television broadcasting band. The first-IF DSB-COFDM signal is suitable for surface-acoustic-wave (SAW) bandpass filtering. In a second frequency-conversion the bandpass-filtered first-IF DSB-COFDM signal is down-converted to second-intermediate-frequency DSB-COFDM signal at frequencies substantially below the conventional "final intermediate frequency" (e.g., 41 to 47 MHz in U.S. television receivers). The second-IF DSB-COFDM signal is at a sufficiently low frequency such that it can be directly sampled by an analog to digital conversion device after lowpass filtering to suppress image signal.

A crystal oscillator 200 is connected for supplying 1 MHz reference oscillations to phase-lock-loop frequency synthesizers 201 and 202. The PLL frequency synthesizer 201 is connected for supplying automatic frequency and phase control (AFPC) voltage to a voltage-controlled oscillator 203, which VCO 203 generates the first local oscillations used in the upward conversion of radio-frequency DSB-COFDM signal to first-IF DSB-COFDM signal. The PLL frequency synthesizer 202 is connected for supplying AFPC) voltage to a voltage-controlled oscillator 204, which VCO 204 generates the second local oscillations used in the downward conversion of first-IF DSB-COFDM signal to second-IF DSB-COFDM signal.

The PLL frequency synthesizer 201 includes a programmable frequency divider, a clocked counter that counts the first local oscillations supplied to its counter input connection from the VCO 203. When the count reaches_a selected large positive integer, the counter resets to zero count and generates a carry pulse supplied to an AFPC detector within the PLL frequency synthesizer 201. Responsive to carry pulses from the counter, that AFPC detector samples the 1 MHz oscillations from the crystal oscillator and integrates the response of such sampling to generate the AFPC voltage applied to the VCO 203. The crystal oscillator 200 is designed for supplying 1 MHz reference oscillations since it is the largest common submultiple of the central carrier frequencies of all the allocated TV broadcast channels in the U.S.A.

The PLL frequency synthesizer 202 includes a fixed frequency divider, a clocked counter that counts the second local oscillations supplied to its counter input connection from the VCO 204. When the count reaches_a prescribed large positive integer, the counter resets to zero count and generates a carry pulse supplied to an AFPC detector within the PLL frequency synthesizer 202. Responsive to carry pulses from the counter, that AFPC detector samples the 1 MHz oscillations from the crystal oscillator and integrates the response of such sampling to generate the AFPC voltage applied to the VCO 204. Choosing the prescribed large positive integer at which the counter in the PLL frequency synthesizer 202 resets to zero count is preferably done so as to position the central carrier frequency of the second-IF DSB-COFDM signal at 11 MHz. This frequency is low enough that analog-to-digital conversion of the second-IF DSB-COFDM signal is practical. Also, the fourth harmonic of the central carrier frequency of the second-IF signal is at 44 MHZ, which is at the center of the 41-47 megahertz final IF signals commonly used in prior-art television receivers. Since these frequencies are not allocated for high-power RF transmissions, this reduces the possibility of strong interference with operation of the clock oscillator 704 depicted in FIGS. 9 and 13-17.

The input port of a pre-filter 205 is connected for receiving radio-frequency (RF) DSB-COFDM signal supplied by an antenna or a cable distribution system. (The pre-filter 205 is typically constructed either as a group of fixed frequency band pass filters, or as a tracking type of filter.) The pre-filter 205 reduces the bandwidth of the signal entering the subsequent radio-frequency amplifier 206, which RF amplifier 206 is subject to automatic gain control (AGC). The pre-filter 205 reduces the number of channels amplified by the AGC'd RF amplifier 206, thereby reducing the intermodulation interference generated by the amplifier 206 and subsequent circuits. In a pre-filter 205 comprising a group of fixed-frequency bandpass filters, the proper band is selected according to channel selection information supplied from a controller not explicitly depicted in FIG. 12. Alternatively, in a tracking type pre-filter, an analog control voltage is generated responsive to channel selection information supplied from the controller. The controller also supplies the channel selection information to the PLL frequency synthesizer 201 for determining the frequency division its programmable frequency divider affords to oscillations supplied thereto from the VCO 203.

The RF output of the pre-filter 205 is amplified or attenuated to a desired level by the AGC'd RF amplifier 206 and then supplied to a first mixer 207, there to be mixed with first local oscillations from the VCO 203. The signal at the output port of first mixer 207, resulting from the desired TV channel signal being multiplied by the VCO 203 oscillations, is defined as the first intermediate frequency signal. The frequency of this first IF signal is the difference between the frequency of the VCO 203 first local oscillations and the frequency of the DSB-COFDM signal to be received. Since the mixer 207 shifts the spectrum of the desired TV channel to a frequency higher than the TV broadcast frequency, this operation is referred to as an up-conversion. The first IF is chosen to be above all of the spectrum used by terrestrial or cable distribution TV broadcasting in the particular environment in which the tuner operates in. By this choice, the image frequency (the frequency which is the numerical sum of the VCO 203 signal and the first IF frequency) generated in the up-conversion process can be rejected by the pre-filter 205. This choice of first intermediate frequencies also requires the frequency of the VCO 204 to be above the spectrum used by TV broadcasting, thereby avoiding other possible interference.

The first IF output signal supplied from the mixer 207 is amplified by a narrow-band amplifier 208 and then supplied to a first-IF bandpass filter 209 such as a dielectric resonance filter, a strip-line filter or a SAW filter. The characteristics of the first-IF BPF 209 are designed, with consideration to the characteristics of subsequent digital filtering that will be used to suppress ACI (adjacent-channel interference). I.e., the bandwidth of the first-IF BPF 209 is no less than that of a single digital TV channel, and the passband group delay response is sufficiently linear so as not to cause adverse effects on subsequent demodulation of second-IF DSB-COFDM signal. Furthermore, the first-IF BPF 209 is designed to have sufficient out-of-band attenuation at the image frequency range of the subsequent down-conversion process by a second mixer 210 so as not to introduce excessive image frequency interference to degrade the performance of the subsequent demodulation of second-IF DSB-COFDM signal. (In alternative front-end tuner designs the positions of the first-IF amplifier 208 and the first-IF BPF 209 within their cascade connection are interchanged.)

The output signal from the first-IF BPF 209 principally consists of just the desired TV channel signal as up-converted, possibly accompanied by small amounts of up-converted adjacent-channel signals that have not been completely attenuated owing to the band-edge roll-off characteristics of BPF 209. This signal is supplied to a second mixer 210 to be mixed with second local oscillations, which are supplied from the VCO 204. The signal supplied from the output port of the mixer 210, resulting from the first-IF DSB-COFDM signal being multiplied by second local oscillations from the VCO 204, is defined as the second-intermediate-frequency (second-IF) DSB-COFDM signal. The frequency of this second-IF DSB-COFDM signal is the numerical difference between the frequency of second local oscillations from the VCO 204 and the somewhat lower frequencies of the first-IF DSB-COFDM signal. The second-IF DSB-COFDM signal supplied from the output port of the mixer 210 is amplified by a second IF amplifier 211 of such design as to suppress image signals that have frequencies almost twice that of the frequency of the second local oscillations above the UHF TV band. Since the mixer 210 shifts the first IF signal to a lower frequency, this operation is referred to as a down-conversion.

The amplified second-IF DSB-COFDM signal supplied from the output port of the second IF amplifier 211 is applied to the input port of pseudo-RMS detection circuitry 212. The output port of the pseudo-RMS detection circuitry 212 is connected for supplying an approximation of the root-mean-square RMS voltage of the response from the second IF amplifier 211 to a first input port of circuitry 213 for generating respective automatic gain control (AGC) signals for the RF amplifier 206 and for the first IF amplifier 208. The peak-to-average ratio (PAPR) of COFDM signals is very high, and occasional peak clipping of them is better design. So, detecting the peak voltage of the response from the second IF amplifier 211 would not provide a good basis from which to develop AGC signals.

A second port of the circuitry 213 for generating AGC signals is connected for receiving pilot carrier amplitude information from the pilot carriers processor 770 depicted in FIG. 9, 13, 14 or 15. The pilot carrier amplitude information provides a more precise basis for assuring that the level of response from the second IF amplifier 211 is adjusted to suit subsequent analog-to-digital conversion and QAM demapping procedures.

Designs of circuitry for generating AGC signals in double-conversion radio receivers are known in the prior art. The circuitry 213 generates delayed AGC signal for the RF amplifier 206, avoiding reduction of the RF amplifier 206 gain as long as RF signal strength is not so strong that RF amplifier 206 response consistently drives the first mixer 207 outside its range of acceptably linear response. During the reception of such weaker strength RF signals, the circuitry 213 generates AGC signal for the first IF amplifier 208 that regulates its gain control to maintain desired value of the approximate RMS value of the second IF amplifier 211 response. This maintains the second mixer 210 within its range of acceptably linear response. The circuitry 213 generates the delayed AGC signal for the RF amplifier 206 so as to exhibit slower response to second IF amplifier 211 signal than the AGC signal for the first IF amplifier 208. This permits clipping of occasional extraordinarily large peaks of received COFDM signal in the first mixer 207 and the RF amplifier 206. The AGC signal for the first IF amplifier 208 that circuitry 213 generates no longer reduces the gain of the first IF amplifier 208 when circuitry 213 supplies delayed AGC signal is to the RF amplifier 206 for reducing its gain.

In a front-end tuner 70A configuration as used in FIGS. 13, 15 and 17, the amplified second-IF DSB-COFDM signal supplied from the output port of the second IF amplifier 211 is supplied to the input port of an analog-to-digital converter 214. The A-to-D converter 214 samples the amplified second-IF DSB-COFDM signal at a clock rate determined by the clock oscillator 704 depicted in FIG. 13, 15 or 17. The output port of the A-to-D converter 214 is connected for supplying the resulting digitized second-IF DSB-COFDM signal to the input port of a digital bandpass filter 215. Both the lower- and higher-frequency roll-offs of the bandpass response at the output port of the filter 215 are very steep, better to suppress adjacent-channel interference (ACI). The bandpass-filtered digital second-IF DSB-COFDM signal supplied from the output port of the filter 215 is suitable to provide the intermediate-frequency DSB-COFDM output signal for a front-end tuner 70A configuration.

The amplified second-IF DSB-COFDM signal supplied from the output port of the second IF amplifier 211 is suitable to provide the intermediate-frequency DSB-COFDM output signal for a front-end tuner 700 configuration. In such front-end tuner 700 configuration the A-to-D converter 214 and the digital bandpass filter 215 are unnecessary and can be omitted.

FIGS. 13 and 10 together depict a variant of the receiver apparatus for independent-sideband (ISB) demodulation of DSB-COFDM depicted in FIGS. 9 and 10, digital circuitry shown in FIG. 13 replacing some of the analog circuitry shown in FIG. 9. The front-end tuner 700 of FIG. 9 that converts a selected radio-frequency DSB-COFDM signal to an analog intermediate-frequency DSB-COFDM signal is replaced in FIG. 13 by a front-end tuner 70A that converts a selected RF DSB-COFDM signal to a digitized intermediate-frequency DSB-COFDM signal. This digitized DSB-COFDM signal is supplied from the output port of the front-end tuner 70A to respective signal input ports of +1, (−1) multipliers 713 and 714. A 2-phase divide-by-4 frequency divider 703 responds to rising edges of pulses from a clock oscillator 704, by supplying I and Q square waves to respective carrier input ports of the +1, (−1) multipliers 713 and 714. The clock oscillator 704 is subject to automatic frequency and phase control (AFPC) that adjusts the frequency of clock pulses to be four times the final intermediate-frequency (IF) carrier of the COFDM signals. The clock oscillator 704 is connected for supplying the clock pulses to an analog-to-digital converter in the front-end tuner 70A, which A-to-D converter digitizes the intermediate-frequency DSB-COFDM signal supplied to respective signal input ports of the +1, (−1) multipliers 713 and 714.

The leading I square wave that the frequency divider 703 supplies to the control input port of the +1, (−1) multiplier 713 conditions the +1, (−1) multiplier 713 to perform a 2-to-1 decimation of the 0°, 90°, 180° and 270° digital samples of DSB-COFDM signal supplied to its input port, selecting the 0° digital samples for multiplication by +1 responsive to positive half cycles of I square wave, and selecting the 180° digital samples for multiplication by −1 responsive to negative half cycles of I square wave. The output port of the +1, (−1) multiplier 713 is connected for supplying the in-phase synchrodyne results to the input port of a digital lowpass filter 717. The lowpass filter 717 responds to the baseband portion of the in-phase synchrodyne results, but not to image signal. FIG. 13 shows the output port of the lowpass filter 717 connected for supplying its response the input port of the clocked digital delay line 710 providing compensatory delay for the latent delay of the digital FIR filter 709.

The lagging Q square wave that the frequency divider 703 supplies to the control input port of the +1, (−1) multiplier 714 conditions the +1, (−1) multiplier 714 to to perform a 2-to-1 decimation of the 0°, 90°, 180° and 270° digital samples of DSB-COFDM signal supplied to its input port, selecting the 90° digital samples for multiplication by −1 responsive to negative half cycles of Q square wave, and selecting the 270° digital samples for multiplication by +1 responsive to positive half cycles of Q square wave. The output port of the +1, (−1) multiplier 714 is connected for supplying quadrature synchrodyne results to the input port of to the input port of a digital lowpass filter 718. The lowpass filter 718 responds to the baseband portion of the quadrature synchrodyne results, but not to image signal. FIG. 13 shows the output port of the lowpass filter 718 connected for supplying its response the input port of the FIR filter 709 for performing Hilbert transformation.

If the front-end tuner 70A contains digital lowpass filtering of the digitized IF DSB-COFDM signal with rapid roll-off to suppress ACI, there is no reason for the digital lowpass filters 717 and 718 necessarily having to have sharp roll-offs of higher frequencies to suppress ACI. The Hilbert transform response of the FIR filter 709 and the response from digital delay line 710 are utilized in the subsequent portions of the FIG. 13 and FIG. 10 receiver apparatus in the same way as in the corresponding portions of the FIG. 9 and FIG. 10 receiver apparatus.

FIG. 14 depicts a variant of the FIG. 9 portion of COFDM receiver apparatus in which digital lowpass filtering to suppress ACI and image signals remnant from synchrodyning is deferred until baseband responses to the lower and upper sidebands of the DSB-COFDM signal have been separated from each other. The digital lowpass filter 708 is removed from the connection between the output port of the A-to-D converter 706 and the input port of the FIR filter 709 to leave a direct connection between them. Also, the digital lowpass filter 707 is removed from the connection between the output port of the A-to-D converter 705 and the input port of the compensatory digital delay line 710 to leave a direct connection between them as well. FIG. 14 shows the digital lowpass filter 707 relocated for inclusion in the connection from the sum output port of the digital adder 711 to the input port of the guard interval remover 751. FIG. 14 shows the digital lowpass filter 708 relocated for inclusion in the connection from the difference output port of the digital subtractor 712 to the input port of the guard interval remover 752. The DFT computers 761 and 762 perform bandpass filtering of individual OFDM carriers which bandpass filtering should be unresponsive to frequencies outside baseband. This bandpass filtering may allow digital lowpass filters 707 and 708 to be replaced by respective direct connections in modified FIG. 14 structure.

FIG. 15 depicts a variant of the FIG. 13 portion of COFDM receiver apparatus in which digital lowpass filtering to suppress image signals remnant from synchrodyning is deferred until baseband responses to the lower and upper sidebands of the DSB-COFDM signal have been separated from each other. The digital lowpass filter 718 is removed from the connection between the output port of the +1, (−1) multiplier 714 and the input port of the FIR filter 709 to leave a direct connection between them. Also, the digital lowpass filter 717 is removed from the connection between the output port of the +1, (−1) multiplier 713 and the input port of the compensatory digital delay line 710 to leave a direct connection between them as well. FIG. 15 shows the digital lowpass filter 717 relocated for inclusion in the connection from the sum output port of the digital adder 711 to the input port of the guard interval remover 751. FIG. 15 shows the digital lowpass filter 718 relocated for inclusion in the connection from the difference output port of the digital subtractor 712 to the input port of the guard interval remover 752. The DFT computers 761 and 762 perform bandpass filtering of individual OFDM carriers which bandpass filtering should be unresponsive to frequencies outside baseband. This bandpass filtering may allow digital lowpass filters 717 and 718 to be replaced by respective direct connections in modified FIG. 15 structure.

FIGS. 16 and 10 together depict another general structure of receiver apparatus for ISB demodulation of DSB-COFDM signals with principal carrier being that of those DSB-COFDM signals. In accordance with further aspects of the invention, the FIG. 16 portion of this receiver apparatus employs novel modified phase-shift methods of ISB demodulation particularly well suited for DSB-COFDM signals. However, initial portions of the FIG. 16 apparatus are similar to the initial portions of the FIG. 9 apparatus.

As with the FIG. 9 apparatus, a reception antenna 69 captures the radio-frequency COFDM signal for application as input signal to a front-end tuner 700 of the receiver. The front-end tuner 700 converts a selected radio-frequency DSB-COFDM signal to an intermediate-frequency DSB-COFDM signal, which is supplied to the respective signal input ports of mixers 701 and 702. The mixers 701 and 702 are of switching type connected for receiving I and Q square waves at their respective carrier input ports, as supplied from a 2-phase divide-by-4 frequency divider 703 in response to rising edges of pulses from a clock oscillator 704. The clock oscillator 704 is subject to AFPC that adjusts the frequency of clock pulses to be four times the final IF carrier of the COFDM signals. The leading, in-phase (I) square wave that the frequency divider 703 supplies to the carrier input port of the mixer 701 conditions the mixer 701 to provide an in-phase synchrodyning of intermediate-frequency DSB-COFDM signal to baseband. The lagging, quadrature (Q) square wave that the frequency divider 703 supplies to the carrier input port of the mixer 702 conditions the mixer 702 to provide a quadrature synchrodyning of intermediate-frequency DSB-COFDM signal to baseband.

As with the FIG. 9 apparatus, an A-to-D converter 705 performs analog-to-digital conversion of the in-phase and quadrature components of the baseband signal supplied from the output port of the mixer 701. An A-to-D converter 706 performs analog-to-digital conversion of the baseband signal supplied from the output port of the mixer 702. The digitized in-phase baseband signal supplied from the output port of the A-to-D converter 705 is supplied to the input port of a digital lowpass filter 707. The digitized quadrature baseband signal supplied from the output port of the A-to-D converter 706 is supplied to the input port of a digital lowpass filter 708.

Subsequent portions of the FIG. 16 apparatus differ from subsequent portions of the FIG. 9 apparatus. The digital FIR filter 709 that the FIG. 9 apparatus includes for performing Hilbert transform is complex in nature and takes up considerable area on the silicon die in a monolithic integrated circuit construction. The FIG. 14 apparatus dispenses with the digital FIR filter 709, the digital delay line 710 compensating for the latent delay through the digital FIR filter 709, the digital adder 711 and the digital subtractor 712.

The digital lowpass filter 707 is connected for supplying digitized samples of baseband folded DSB-COFDM signal to the input port of the cyclic prefix detector 73. (Alternatively, the digital lowpass filter 708 is connected for supplying digitized samples of baseband folded DSB-COFDM signal to the input port of the cyclic prefix detector 73 instead). The cyclic prefix detector 73 differentially combines the digitized samples of baseband folded double-sideband COFDM signal with those samples as delayed by the duration of an effective COFDM symbol. Nulls in the difference signal so generated should occur, marking the guard intervals of the baseband folded DSB-COFDM signal. The nulls are processed to reduce any corruption caused by noise and to generate better-defined indications of the phasing of COFDM symbols. The output port of the cyclic prefix detector 73 is connected to supply these indications to the first of two input ports of the timing synchronization apparatus 740.

The signal input port of the guard interval remover 751 is connected for receiving digitized samples of a quadrature baseband COFDM signal from the output port of the digital lowpass filter 708. The output port of the guard interval remover 751 is connected for supplying the input port of a discrete-Fourier-transform (DFT) computer 763 with windowed portions of the quadrature baseband signal that span respective COFDM symbol intervals. The signal input port of the guard interval remover 752 is connected for receiving digitized samples of an in-phase baseband COFDM signal from the output port of the digital lowpass filter 707. The output port of the guard interval remover 752 is connected for supplying the input port of a discrete-Fourier-transform (DFT) computer 764 with windowed portions of the in-phase baseband signal that span respective COFDM symbol intervals. The DFT computers 763 and 764 are similar in construction, each having the capability of transforming COFDM carriers nominally 8K, 16K or 32K in number to the complex coordinates of respective QAM symbols. The DFT computers 763 and 764 perform bandpass filtering of individual OFDM carriers which bandpass filtering should be unresponsive to frequencies outside baseband. This bandpass filtering may allow digital lowpass filters 707 and 708 to be replaced by respective direct connections in modified FIG. 14 structure.

The timing synchronization apparatus 740 is connected for supplying gating control signals to respective control input ports of the guard interval removers 751 and 752. The timing synchronization apparatus 740 is further connected for supplying COFDM symbol timing information to the DFT computers 763 and 764. The indications concerning the phasing of COFDM symbols that the cyclic prefix detector 73 supplies to the timing synchronization apparatus 740 are sufficiently accurate for (a) initial windowing of the quadrature baseband folded DSB-COFDM signal that the guard interval remover 751 supplies to the DFT computer 763 and (b) initial windowing of the in-phase baseband folded DSB-COFDM signal that the guard interval remover 752 supplies to the DFT computer 764.

The output port of the DFT computer 763 is connected via Hilbert transformation connections 765 for supplying complex coordinates of QAM symbols conveyed by respective ones of the received COFDM carriers to first addend input ports of a parallel array 766 of digital complex-number adders and to minuend input ports of a parallel array 767 of digital complex-number subtractors. These connections 765 are such as to perform Hilbert transform of the complex coordinates of QAM symbols, which procedure is explained in greater detail in the remaining portion of this paragraph. The real coordinates of the complex coordinates of QAM symbols are applied as imaginary components of input signals to the first addend input ports of the parallel array 766 of digital adders and to the minuend input ports of the parallel array 767 of digital subtractors. The imaginary coordinates of the complex coordinates of QAM symbols are applied as real components of input signals to the first addend input ports of the parallel array 766 of digital adders and to thrminuend input ports of the parallel array 767 of digital subtractors. There is essentially no delay in this Hilbert transformation procedure, and it takes up little if any extra area on the silicon die in a monolithic integrated circuit construction. The output port of the DFT computer 764 is connected for supplying complex coordinates of QAM symbols conveyed by respective ones of the received COFDM carriers to second addend input ports of the parallel array 766 of digital complex-number adders and to subtrahend input ports of the parallel array 767 of digital complex-number subtractors.

The parallel array 766 of digital adders additively combines the complex coordinates of QAM symbols the DFT computer 763 generates, as transformed by the Hilbert transformation connections 765, with the complex coordinates of corresponding QAM symbols the DFT computer 764 generates. The sum output ports of the parallel array 766 of digital adders recover at baseband the complex coordinates of QAM symbols from the lower sideband of the DSB-COFDM signal. The complex coordinates of QAM symbols extracted from pilot carriers in each COFDM symbol sampling interval are supplied as parallel input signal to the pilot carriers processor 770. The complex coordinates of QAM symbols extracted from carriers in each COFDM symbol sampling interval that convey coded data are supplied as parallel input signal to the frequency-domain channel equalizer 781 for QAM symbols extracted from the lower sideband of the double-sideband COFDM signal.

The parallel array 767 of digital subtractors differentially combines the complex coordinates of QAM symbols the DFT computer 763 generates, as transformed by the Hilbert transformation connections 765, with the complex coordinates of corresponding QAM symbols the DFT computer 764 generates. The difference output ports of the parallel array 767 of digital subtractors recover at baseband the complex coordinates of QAM symbols from the upper sideband of the DSB-COFDM signal. The complex coordinates of QAM symbols extracted from pilot carriers in each COFDM symbol sampling interval are supplied as parallel input signal to the pilot carriers processor 770. The complex coordinates of QAM symbols extracted from carriers in each COFDM symbol sampling interval that convey coded data are supplied as parallel input signal to the frequency-domain channel equalizer 782 for QAM symbols extracted from the upper sideband of the DSB-COFDM signal.

FIGS. 17 and 10 together depict a variant of the receiver apparatus for ISB demodulation of DSB-COFDM depicted in FIGS. 16 and 10, digital circuitry depicted in FIG. 17 replacing some of the analog circuitry depicted in FIG. 16. FIG. 17 depicts modification of FIG. 16 morphologically and operationally similar to the modification of FIG. 9 depicted in FIG. 13. The components 700-702 and 705-708 of FIG. 16 are replaced in FIG. 17 by components 70A, 713, 714, 717 and 718 previously described in reference to FIG. 13. The DFT computers 763 and 764 perform bandpass filtering of individual OFDM carriers which bandpass filtering should be unresponsive to frequencies outside baseband. This bandpass filtering may allow digital lowpass filters 717 and 718 to be replaced by respective direct connections in modified FIG. 17 structure.

Figure 18:
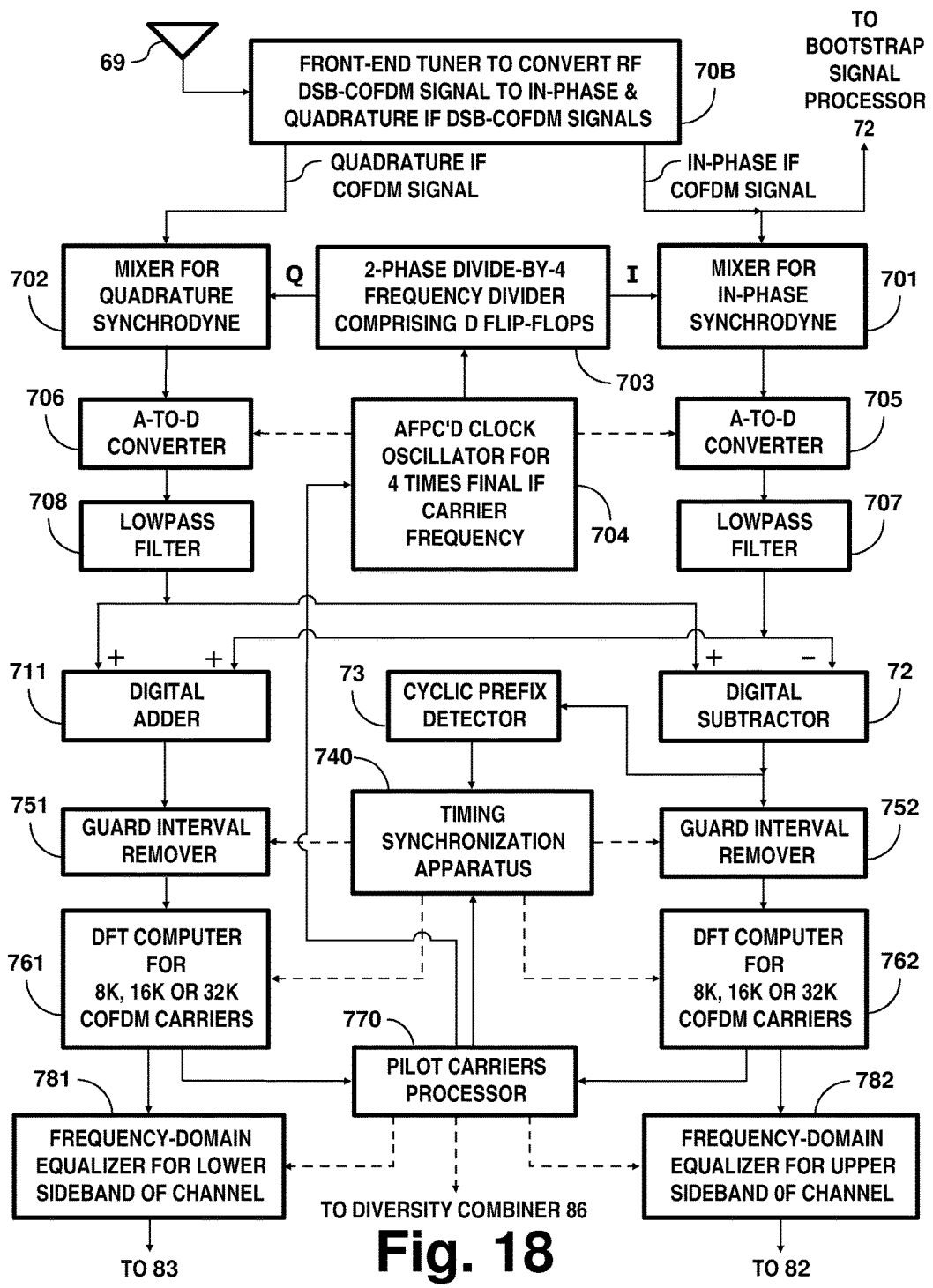

FIGS. 18 and 10 together depict the general structure of receiver apparatus for ISB demodulation of DSB-COFDM signals using methods based on methods for demodulating SSB amplitude-modulation signals described by Donald K. Weaver, Jr. in his paper "A third method of generation and detection of single sideband signals", Proceedings of the IRE, vol. 44, December 1956 issue, pp. 1703-1705. The FIG. 14 structure for ISB demodulation of DSB-COFDM signals differs from the FIG. 9 structure for ISB demodulation of DSB-COFDM signals in the following regards. The front-end tuner 700 to convert RF DSB-COFDM signal to IF DSB-COFDM signal for application to the multiplicand input ports of the mixers 701 and 702 is replaced by a front-end tuner 70B to convert RF DSB-COFDM signal to (a) an in-phase IF DSB-COFDM signal for application to the multiplicand input port of the mixer 701 and (b) a quadrature IF DSB-COFDM signal for application to the multiplicand input port of the mixer 702. The application of quadrature IF DSB-COFDM signal, rather than in-phase IF DSB-COFDM signal, to the multiplicand input port of the mixer 702 obviates the need for an FIR digital filter 709 for Hilbert transformation. Accordingly, there is no call for digital delay line 710 to compensate for latent delay through the filter 709.

An A-to-D converter 705 performs analog-to-digital conversion of the in-phase and quadrature components of the baseband signal supplied from the output port of the mixer 701. An A-to-D converter 706 performs analog-to-digital conversion of the baseband signal supplied from the output port of the mixer 702. The digitized in-phase baseband signal supplied from the output port of the A-to-D converter 705 is supplied to the input port of a digital lowpass filter 707. The digitized quadrature baseband signal supplied from the output port of the A-to-D converter 706 is supplied to the input port of a digital lowpass filter 708. Preferably, the design of the digital lowpass filters 707 and 708 provides a rapid roll-off in frequency response, so as to suppress adjacent-channel interference (ACI). The DFT computers 761 and 762 perform bandpass filtering of individual OFDM carriers which bandpass filtering should be unresponsive to frequencies outside baseband. This bandpass filtering may allow digital lowpass filters 707 and 708 to be replaced by respective direct connections in modified FIG. 18 structure.

The output port of the lowpass filter 707 and the output port of the lowpass filter 708 are connected to respective addend input ports of the digital adder 711, which is operative to recover at baseband the lower sideband of the DSB-COFDM signal at its sum output port. The output ports of the lowpass filters 707 and 708 are respectively connected to the subtrahend input port and the minuend input port of the digital subtractor 712, which is operative to recover at baseband the upper sideband of the DSB-COFDM signal at its difference output port. The responses from the sum output port of of the digital adder 711 and from the difference output port of the digital subtractor 712 are utilized in the subsequent portions of the FIG. 18 and FIG. 10 receiver apparatus in the same way as in the corresponding portions of the FIG. 9 and FIG. 10 receiver apparatus.

The FIG. 18 DSB-COFDM demodulation apparatus like the FIG. 16 DSB-COFDM demodulation apparatus obviates the need for an FIR digital filter to perform Hilbert transformation. However, the need for the front-end tuner 70B to convert RF DSB-COFDM signal to both in-phase and quadrature IF DSB-COFDM signals subject to the same amplification presents somewhat of a problem, which problem does not obtain in the FIG. 16 DSB-COFDM demodulation apparatus.

Figure 19:
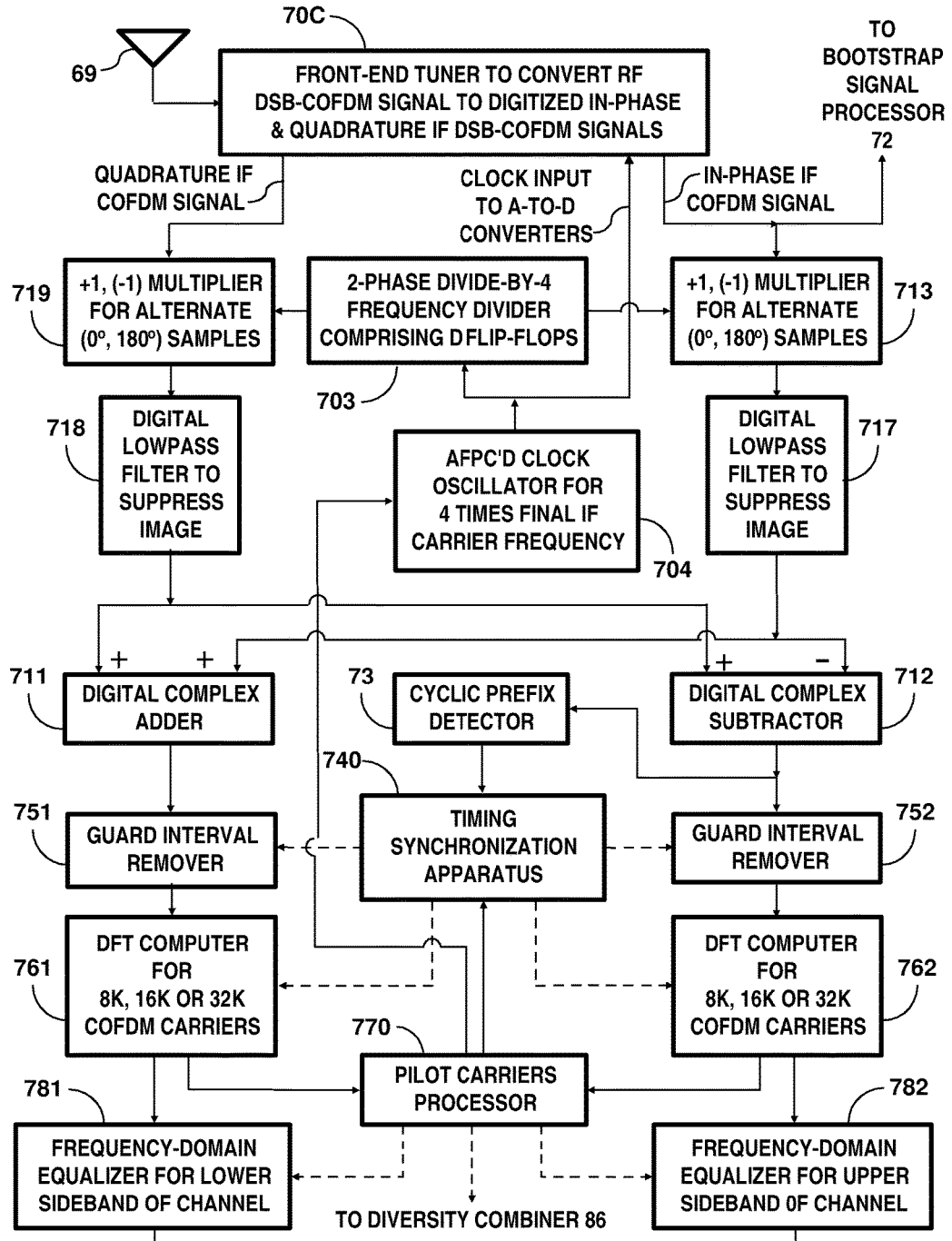

FIGS. 19 and 10 together form a schematic diagram of a variant of the receiver apparatus for ISB demodulation of DSB-COFDM depicted in FIGS. 18 and 10, digital circuitry depicted in FIG. 19 replacing some of the analog circuitry depicted in FIG. 18. The front-end tuner 70B depicted in FIG. 18 that is operable to convert RF DSB-COFDM signal to both in-phase and quadrature analog IF DSB-COFDM signals is replaced in FIG. 19 by a front-end tuner 70C operable to convert RF DSB-COFDM signal to both in-phase and quadrature digital IF DSB-COFDM signals. The front-end tuner 70C is connected to supply the in-phase digital IF DSB-COFDM signals to the multiplicand input port of the +1, (−1) multiplier 713 for in-phase synchrodyne to baseband. The front-end tuner 70C is connected to supply the quadrature digital IF DSB-COFDM signals to the multiplicand input port of a +1, (−1) multiplier 719 for quadrature synchrodyne to baseband. A 2-phase divide-by-4 frequency divider 703 responds to rising edges of pulses from a clock oscillator 704, by supplying I and Q square waves to respective carrier input ports of the +1, (−1) multipliers 713 and 719. The clock oscillator 704 is subject to automatic frequency and phase control (AFPC) that adjusts the frequency of clock pulses to be four times the final intermediate-frequency (IF) carrier of the COFDM signals.

The leading I square wave that the frequency divider 703 supplies to the control input port of the +1, (−1) multiplier 713 conditions the +1, (−1) multiplier 713 to select the 0° digital samples of the in-phase second-IF DSB-COFDM signal for multiplication by +1 responsive to positive half cycles of I square wave, and selecting the 180° digital samples of the in-phase second-IF DSB-COFDM signal for multiplication by −1 responsive to negative half cycles of I square wave. The output port of the +1, (−1) multiplier 713 is connected for supplying the in-phase synchrodyne results to the input port of a digital lowpass filter 717. The lowpass filter 717 responds to the baseband portion of the in-phase synchrodyne results, but not to image signal.

The lagging Q square wave that the frequency divider 703 supplies to the control input port of the +1, (−1) multiplier 719 conditions the +1, (−1) multiplier 719 to select the 0° digital samples of the quadrature second-IF DSB-COFDM signal for multiplication by +1 responsive to positive half cycles of Q square wave, and selecting the 180° digital samples of the quadrature second-IF DSB-COFDM signal for multiplication by −1 responsive to negative half cycles of Q square wave. The output port of the +1, (−1) multiplier 719 is connected for supplying quadrature synchrodyne results to the input port of to the input port of a digital lowpass filter 718. The lowpass filter 718 responds to the baseband portion of the quadrature synchrodyne results, but not to image signal.

If the front-end tuner 70C contains digital lowpass filtering of the digitized IF DSB-COFDM signal with rapid roll-off in frequency response for suppressing ACI, there is no reason for the digital lowpass filters 717 and 718 necessarily having to have rapid roll-offs in frequency response to suppress ACI. The output port of the lowpass filter 717 and the output port of the lowpass filter 718 are connected to respective addend input ports of the digital adder 711, which is operative to recover at baseband the lower sideband of the DSB-COFDM signal at its sum output port. The output ports of the lowpass filters 717 and 788 are respectively connected to the subtrahend input port and the minuend input port of the digital subtractor 712, which is operative to recover at baseband the upper sideband of the DSB-COFDM signal at its difference output port. The responses from the sum output port of of the digital adder 711 and from the difference output port of the digital subtractor 712 are utilized in the subsequent portions of the FIG. 19 and FIG. 10 receiver apparatus in the same way as in the corresponding portions of the FIG. 9 and FIG. 10 receiver apparatus. The bandpass filtering of individual OFDM carriers in DFT computers 761 and 762 may allow digital lowpass filters 717 and 718 to be replaced by respective direct connections in modified FIG. 19 structure.

Rather than operating two DFT computers in parallel in the in-phase and quadrature branches of the receiver apparatus shown in any of FIGS. 9 and 13-19, it is possible to use a single DFT computer in time-division multiplex to serve both branches. While this can reduce "hardware" requirements, higher operating speeds will be required to implement such multiplex.

Figure 20:
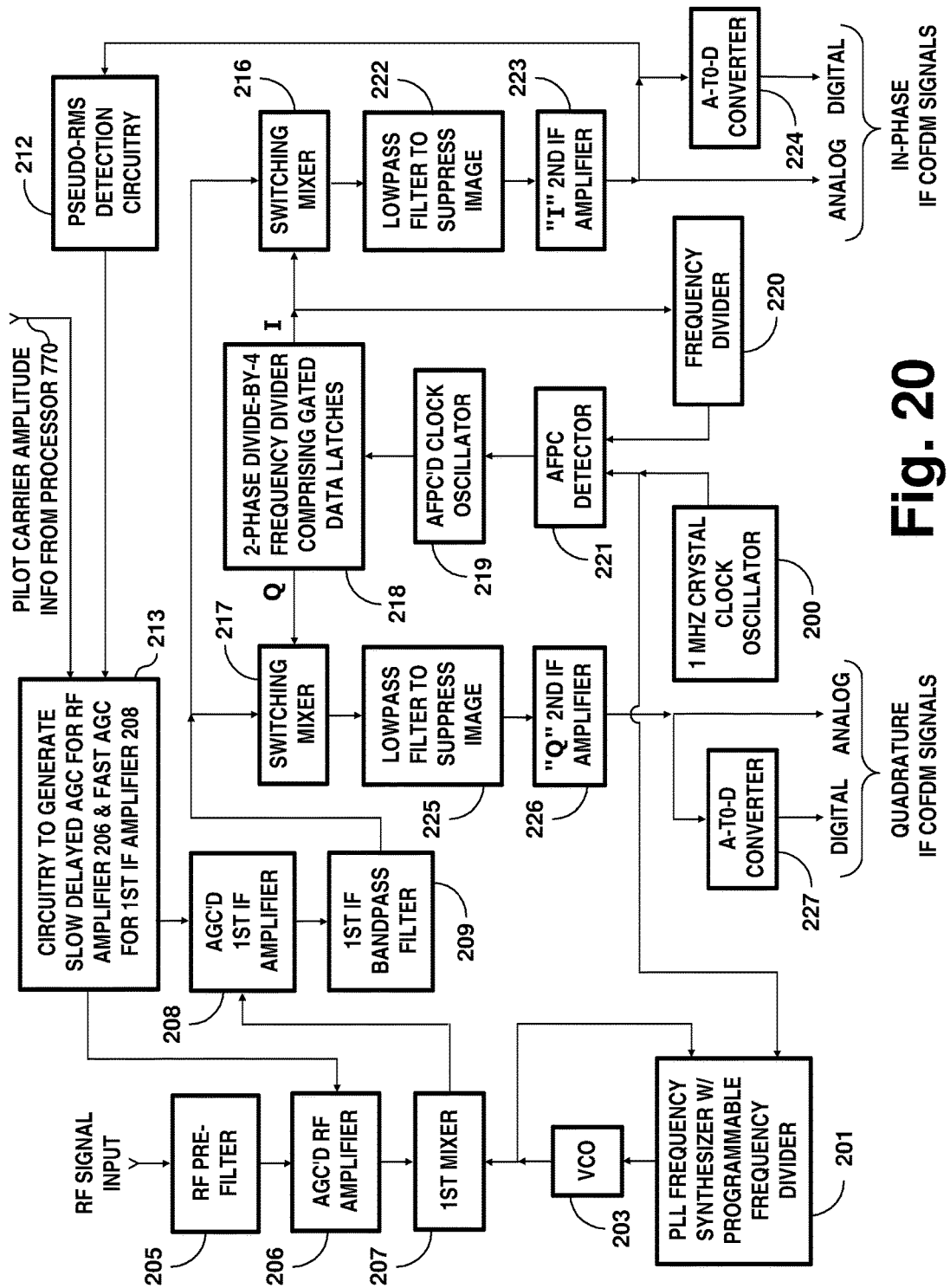
FIG. 20 is a schematic diagram of plural superheterodyne front-end tuner structure suitable for inclusion in the FIGS. 18 and 19 apparatuses for demodulating DSB-COFDM signals.

FIG. 20 depicts plural superheterodyne front-end tuner structure suitable for implementing the front-end tuner 70B depicted in FIG. 18 or for implementing the front-end tuner 70C depicted in FIG. 19. Elements 200-209, 212 and 213 of the FIG. 20 structure are similar to the elements 200-209, 212 and 213 in the FIG. 12 double superheterodyne front-end tuner structure. A crystal clock oscillator 200 is connected for supplying 1 MHz reference oscillations to a PLL frequency synthesizer 201 that supplies AFPC voltage to a voltage-controlled oscillator (VCO) 203. VCO 203 generates the first local oscillations used in the upward conversion of radio-frequency DSB-COFDM signal to first-IF DSB-COFDM signal. The input port of a pre-filter 205 is connected for receiving RF DSB-COFDM signal supplied by an antenna or a cable distribution system. The RF output of the pre-filter 205 is amplified or attenuated to a desired level by an AGC'd RF amplifier 206 and then supplied to a first mixer 207, there to be mixed with oscillations from the first local oscillator 203 to generate first IF signal. The first IF output signal supplied from the mixer 207 is amplified by a narrow-band amplifier 208 and then supplied to a first-IF bandpass filter 209 such as a dielectric resonance filter, a strip-line filter or a SAW filter. The input port of pseudo-RMS detection circuitry 212 is connected for receiving amplified second-IF DSB-COFDM signal supplied from the output port of a second IF amplifier. The output port of the pseudo-RMS detection circuitry 212 is connected for supplying an approximation of the root-mean-square RMS voltage of the amplified second-IF DSB-COFDM signal to a first input port of circuitry 213 for generating respective automatic gain control (AGC) signals for the RF amplifier 206 and for the first IF amplifier 208. A second port of the circuitry 213 for generating AGC signals is connected for receiving pilot carrier amplitude information from the pilot carriers processor 770 depicted in FIG. 18 or 19.

The single second mixer 210 of the FIG. 12 front-end tuner structure is replaced by two switching mixers 216 and 217 in the front-end tuner structure depicted in FIG. 20. A 2-phase divide-by-4 frequency divider 218 responds to rising edges of pulses from a clock oscillator 219, by supplying I and Q square waves to respective carrier input ports of the switching mixers 216 and 217. The fundamental frequency of the Q square wave lags the fundamental frequency of the Q square wave by 90° ($\pi/4$ radians). The clock oscillator 219 is subject to automatic frequency and phase control (AFPC) responsive to voltage supplied from a PLL frequency synthesizer comprising the divide-by-4 frequency divider 218, a further frequency divider 220 and an AFPC detector 221. The input port of the frequency divider 220 is connected to receive the I square wave applied to the carrier input port of the switching mixer 216. The output port of the frequency divider 220 is connected to a first input port of the AFPC detector 221. A second input port of the AFPC detector 221 is connected for receiving reference-frequency oscillations from the crystal oscillator 200. The output port of the AFPC detector 221 is connected for supplying voltage to the clock oscillator 219 to implement automatic frequency and phase control (AFPC) thereof.

The output port of the switching mixer 216 connects to the input port of a lowpass filter 222 that suppresses image signal in the response supplied from its output port to the input port of an amplifier 223 of the in-phase ("I") second-IF signal. The output port of the "I" second-IF amplifier 223 is connected to supply analog amplified in-phase second-IF signal suitable for an output signal from the FIG. 18 front-end tuner 70B. FIG. 20 shows this amplified in-phase second-IF signal applied to the input port of an analog-to-digital converter 224 that responds to supply digital amplified in-phase second-IF signal suitable for a digital output signal from the FIG. 19 front-end tuner 70C.

The output port of the switching mixer 217 connects to the input port of a lowpass filter 225 that suppresses image signal in the response supplied from its output port to the input port of an amplifier 226 of the quadrature ("Q") second-IF signal. The output port of the "Q" second-IF amplifier 226 is connected to supply analog amplified quadrature second-IF signal suitable for an output signal from the FIG. 18 front-end tuner 70B. FIG. 20 shows this amplified quadrature second-IF signal applied to the input port of an analog-to-digital converter 227 that responds to supply digital amplified quadrature second-IF signal suitable for a digital output signal from the FIG. 19 front-end tuner 70C.

FIG. 20 shows the input port of the pseudo-RMS detection circuitry 212 connected for receiving amplified in-phase second-IF signal from the output port of the "I" second-IF amplifier 223. With such connection the measurement of second-IF signal amplitude by the pseudo-RMS detection circuitry 212 takes into account the amplitudes of the pilot carriers in the DSB-COFDM signal. Alternatively, the pseudo-RMS detection circuitry 212 is connected instead for receiving amplified quadrature second-IF signal from the output port of the "Q" second-IF amplifier 226. With such connection the measurement of second-IF signal amplitude by the pseudo-RMS detection circuitry 212 is unresponsive to the amplitudes of the pilot carriers in the DSB-COFDM signal.

The modified phase shift method of ISB demodulation as described in connection with FIGS. 16 and 17 avoids the need for a digital FIR filter to perform Hilbert transform, but introduces parallel arrays of digital adders and digital subtractors to perform Hilbert transform. Receiver apparatus using a Weaver method of ISB demodulation as described in connection with FIGS. 18 and 19 also avoids the need for a digital FIR filter to perform Hilbert transform, but the modified phase shift method of ISB demodulation is more practical to implement. The modified phase shift method of ISB demodulation avoids having to deal with some of the known problems encountered when employing the Weaver method. The orthogonal relationship between the in-phase and quadrature IF DSB-COFDM signals that the front-end tuner supplies has to be scrupulously maintained, if a Weaver method of ISB demodulation is to perform well. The FIG. 20 structure for front-end tuners seeks addresses this problem by using the 2-phase divide-by-4 frequency divider 218 responsive to output signal from the clock oscillator 219. However, the frequency of oscillations supplied from the clock oscillator 219 will approach 3 GHz, in order to position the fundamental frequencies of the I and Q square waves from the frequency divider 218 above the UHF band for television broadcasting. The respective gains of the in-phase and quadrature IF DSB-COFDM signals that the front-end tuner supplies have to match closely, if a Weaver method of ISB demodulation is to perform well.

The improved methods of demodulating double-sideband digital amplitude-modulation signals described supra can have broad application. Such methods can be utilized by the bootstrap signal processor 72 depicted in FIG. 4, by way of specific example.

Modifications and variations can be made in the specifically described apparatuses without departing from the spirit or scope of the invention in certain broader ones of its aspects. For example, while preferred structures depicted in FIGS. 9 and 13-19 remove guard intervals before computing discrete Fourier transforms, guard interval removal can be done after computing discrete Fourier transforms at a slight cost in required operating power. In other variations of the structures depicted in FIGS. 9 and 13-19 the AFPC'd clock oscillator 204 is replaced by a fixed-frequency clock oscillator such as a crystal-controlled oscillator. AFPC signals from the pilot carriers processor 770 are supplied to the front-end tuner for fine-tuning a local oscillator therein, so that the principal carrier of intermediate-frequency DSB-COFDM signal(s) supplied from the front end tuner is appropriate for in-phase and quadrature synchrodynes to baseband in those variations of the structures depicted in FIGS. 9 and 13-19.

Persons skilled in the art of designing DTV systems and acquainted with this disclosure are apt to discern that various other modifications and variations can be made in the specifically described apparatuses without departing from the spirit or scope of the invention in certain broader ones of its aspects. Accordingly, it is intended that such modifications and variations of the specifically described apparatuses be considered to result in further embodiments of the invention, to be included within the scope of the appended claims and their equivalents in accordance with the doctrine of equivalents.

In the appended claims, the word "said" rather than the word "the" is used to indicate the existence of an antecedent basis for a term being provided earlier in the claims. The word "the" is used for purposes other than to indicate the existence of an antecedent basis for a term appearing earlier in the claims, the usage of the word "the" for other purposes being consistent with customary grammar in the American English language.

What is claimed is:

1. Receiver apparatus for double-sideband coded orthogonal frequency-division modulation (COFDM) radio-frequency signals, said receiver apparatus comprising:
   means for selectively receiving a double-sideband coded orthogonal frequency-division modulation (DSB-COFDM) radio-frequency signal;
   means for developing a first set of QAM symbols descriptive of the discrete Fourier transform of COFDM carriers from the upper sideband of the selectively received DSB-COFDM radio-frequency signal;
   means for developing a second set of QAM symbols descriptive of the discrete Fourier transform of COFDM carriers from the lower sideband of the selectively received DSB-COFDM radio-frequency signal;
   means for serially arranging said first set of QAM symbols in each COFDM symbol according to ascending spectral order of COFDM carriers in said upper sideband of said selectively received double-sideband coded orthogonal frequency-division modulation radio-frequency signal;
   means for serially arranging said second set of QAM symbols in each COFDM symbol according to descending spectral order of COFDM carriers in said lower sideband of said selectively received DSB-COFDM radio-frequency signal;
   means for demapping said first set of QAM symbols as thus serially arranged to recover a first succession of QAM symbol map labels in soft-bit format and for demapping said second set of QAM symbols as thus serially arranged to recover a second succession of QAM symbol map labels in soft-bit format; and
   a diversity combiner of soft bits of corresponding QAM symbol map labels in said first and second successions thereof, thereby to reproduce soft bits of coded data.

2. Receiver apparatus as set forth in claim 1, wherein means for demapping said first set of QAM symbols and for demapping said second set of QAM symbols comprises:
   a first demapper connected for demapping said first set of QAM symbols as thus serially arranged to recover said first succession of QAM symbol map labels in soft-bit format; and
   a second demapper connected for demapping said second set of QAM symbols as serially arranged to recover said second succession of QAM symbol map labels in soft-bit format.

3. Receiver apparatus as set forth in claim 1, wherein means for demapping said first set of QAM symbols and for demapping said second set of QAM symbols comprises:
   an interleaver for temporally interleaving successive ones of said second set of QAM symbols with successive ones of said first set of QAM symbols;
   a demapper for demapping said temporally interleaved QAM symbols to recover temporally interleaved QAM symbol labels in soft-bit format; and
   a de-interleaver of said temporally interleaved QAM symbol labels in soft-bit format for separating out (a) said first succession of QAM symbol map labels in soft-bit format for forwarding to said diversity combiner and (b) said second succession of QAM symbol map labels in soft-bit format for forwarding to said diversity combiner.

4. Receiver apparatus as set forth in claim 1, wherein said diversity combiner of soft bits of corresponding QAM symbol map labels in said first and second successions thereof comprises:
   a maximal-ratio combiner for combining corresponding soft bits of said first succession of QAM symbol map labels and of said second succession of QAM symbol map labels based on their respective likelihoods of being correct.

5. Receiver apparatus as set forth in claim 1, further comprising:
   means for applying frequency-domain channel equalization to those of the QAM symbols in each COFDM symbol that convey coded data prior to the demapping of those QAM symbols.

6. Receiver apparatus as set forth in claim 5, wherein said diversity combiner comprises:
   a maximal-ratio combiner for combining corresponding soft bits of said first succession of QAM symbol map labels and of said second succession of QAM symbol map labels based on their respective likelihoods of being correct;
   a first adjuster for reducing the respective likelihoods of soft bits of selected ones of said first succession of QAM symbol map labels being correct before supplying them to said maximal-ratio combiner, said selected ones of said first succession of QAM symbol map labels being those of said first set of QAM symbols that are out of normal amplitude range; and
   a second adjuster for reducing the respective likelihoods of soft bits of selected ones of said second succession of QAM symbol map labels being correct before supplying them to said maximal-ratio combiner, said selected ones of said second succession of QAM symbol map labels being those of said second set of QAM symbols that are out of normal amplitude range.

7. Receiver apparatus as set forth in claim 2, said receiver apparatus comprising:
   a front-end tuner to provide said means for selectively receiving a DSB-COFDM radio-frequency signal and further to convert the selected DSB-COFDM radio-frequency signal to a digitized baseband single-sideband COFDM signal, using a pilot carrier located at one of lower-frequency and upper-frequency edges of said selected one of DSB-COFDM radio-frequency signals as principal carrier for determining zero frequency in said baseband single-sideband COFDM signal;
   a cyclic prefix detector connected for detecting occurrences of cyclic prefixes in said baseband single-sideband COFDM signal;
   a guard interval removal unit for supplying a windowed response to said baseband single-sideband COFDM signal supplied thereto from said front-end tuner, said guard interval remover responsive to said cyclic prefix detector detecting each occurrence of a cyclic prefix for eliminating the current guard interval from said windowed response supplied by said guard interval remover;

a discrete Fourier transform (DFT) computer providing both (a) said means for developing said first set of QAM symbols descriptive of the discrete Fourier transform of COFDM carriers from the upper sideband of the selectively received DSB-COFDM radio-frequency signal and (b) said means for developing a second set of QAM symbols descriptive of the discrete Fourier transform of COFDM carriers from the lower sideband of the selectively received DSB-COFDM radio-frequency signal; and a frequency-domain channel equalizer for equalizing the gains of responses thereof to respective ones of said first and said second sets of QAM symbols developed by said DFT computer that convey coded data, said first set of QAM symbols in each COFDM symbol being equalized before serially supplying said first demapping means with the equalized complex coordinates of the first set of QAM symbols arranged according to ascending spectral order of COFDM carriers in said upper sideband of said selectively received DSB-COFDM radio-frequency signal, and said second set of QAM symbols in each COFDM symbol being equalized before serially supplying said second demapping means with the equalized complex coordinates of the second set of QAM symbols arranged according to descending spectral order of COFDM carriers in said lower sideband of said selectively received DSB-COFDM radio-frequency signal.

8. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to an analog DSB-COFDM intermediate-frequency signal;

means for supplying an in-phase beat signal and a quadrature beat signal that lags said in-phase beat-frequency signal;

a first mixer connected for heterodyning said DSB-COFDM intermediate-frequency signal with said in-phase beat signal to generate a baseband in-phase synchrodyne response;

a second mixer connected for heterodyning said DSB-COFDM intermediate-frequency signal with said quadrature beat signal to generate a baseband quadrature synchrodyne response;

a first analog-to-digital converter connected for digitizing said baseband in-phase synchrodyne response from said first mixer;

a first digital lowpass filter for lowpass filtering the digitized baseband in-phase synchrodyne response to suppress image signal and adjacent-channel interference in the response from said first digital lowpass filter;

a second analog-to-digital converter connected for digitizing said baseband quadrature synchrodyne response from said second mixer;

a second digital lowpass filter for lowpass filtering the digitized baseband quadrature synchrodyne response to suppress image signal and adjacent-channel interference in the response from said second digital lowpass filter;

a digital finite-impulse-response (FIR) filter for generating a Hilbert transform response to response from said second digital lowpass filter, said digital FIR filter having latent delay therethrough;

a clocked digital delay line for delaying the digitized baseband quadrature synchrodyne response supplied from said first digital lowpass filter to compensate for said latent delay through said digital FIR filter;

a digital adder connected to combine the responses from said digital FIR filter and from said clocked digital delay line additively, thus to generate a sum output signal providing a baseband response to the lower sideband of said DSB-COFDM intermediate-frequency signal;

a digital subtractor connected to combine the responses from said digital FIR filter and from said clocked digital delay line differentially, thus to generate a difference output signal providing a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting the each occurrence of a cyclic prefix for eliminating the current guard interval from said windowed response supplied by said first guard interval remover;

a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;

first and second discrete Fourier transform (DFT) computers similar in structure, said first DFT computer connected for performing DFT on said windowed response of said first guard interval remover to generate complex coordinates of said second set of QAM symbols, said second DFT computer connected for performing DFT on said windowed response of said second guard interval remover to generate complex coordinates of said first set of QAM symbols;

a first frequency-domain equalizer configured for equalizing the gains of responses supplied therefrom responsive to the complex coordinates of respective ones of said second set of QAM symbols that convey coded data, as supplied from said first DFT computer;

a second frequency-domain equalizer configured for equalizing the gains of responses supplied therefrom responsive to the complex coordinates of respective ones of said first set of QAM symbols that convey coded data, as supplied from said second DFT computer;

a first parallel-to-serial converter connected for receiving the responses of said second frequency-domain channel equalizer to the complex coordinates of respective ones of said first set of QAM symbols that convey coded data, said first parallel-to-serial converter further connected for supplying the equalized complex coordinates of said first set of QAM symbols serially to said means for demapping said first set of QAM symbols and for demapping said second set of QAM symbols; and a second parallel-to-serial converter connected for receiving the responses of said first frequency-domain channel equalizer to the complex coordinates of respective ones of said second set of QAM symbols that convey coded data, said second parallel-to-serial converter further connected for supplying the equalized complex coordinates of said second set of QAM symbols serially to said means for demapping said first set of QAM symbols and for demapping said second set of QAM symbols.

9. Receiver apparatus as set forth in claim 8, wherein said first mixer is a first switching mixer, wherein said second mixer is a second switching mixer, and wherein said means for supplying an in-phase beat signal and a quadrature beat signal that lags said in-phase beat-frequency signal comprises:

a clock oscillator for supplying clock pulses at a rate four times the center frequency of said DSB-COFDM intermediate-frequency signal; and a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

10. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to a digitized DSB-COFDM intermediate-frequency signal;

a clock oscillator for supplying clock pulses at a rate four times the center frequency of said DSB-COFDM intermediate-frequency signal;

a 2-phase divide-by-4 frequency divider connected for responding to said clock pulses to generate an in-phase first square wave and to generate a quadrature second square wave;

a first+1/(−1) multiplier connected in effect for multiplying by +1 samples of said digitized DSB-COFDM intermediate-frequency signal as selected in response to positive-going half-cycles of said in-phase first square wave and for multiplying by −1 samples of said digitized DSB-COFDM intermediate-frequency signal as selected in response to negative-going half-cycles of said in-phase first square wave, thereby to generate a baseband in-phase synchrodyne response;

a second+1/(−1) multiplier connected in effect for multiplying by +1 samples of said digitized DSB-COFDM intermediate-frequency signal as selected in response to negative-going half-cycles of said quadrature second square wave and for multiplying by −1 samples of said digitized DSB-COFDM intermediate-frequency signal as selected in response to positive-going half-cycles of said quadrature second square wave, thereby to generate a quadrature synchrodyne response;

a first digital lowpass filter for lowpass filtering said baseband in-phase synchrodyne response to suppress image signal in the response from said first digital lowpass filter;

a second digital lowpass filter for lowpass filtering said baseband quadrature synchrodyne response to suppress image signal in the response from said second digital lowpass filter;

a digital finite-impulse-response (FIR) filter for generating a Hilbert transform response to response from said second digital lowpass filter, said digital FIR filter having latent delay therethrough;

a clocked digital delay line for delaying the digitized baseband quadrature synchrodyne response supplied from said first digital lowpass filter to compensate for said latent delay through said digital FIR filter;

a digital adder connected to combine the responses from said digital FIR filter and from said clocked digital delay line additively, thus to generate a sum output signal providing a baseband response to the lower sideband of said DSB-COFDM intermediate-frequency signal;

a digital subtractor connected to combine the responses from said digital FIR filter and from said clocked digital delay line differentially, thus to generate a difference output signal providing a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting each occurrence of a cyclic prefix for removing the current guard interval from said windowed response to said sum output signal;

a second guard interval remover for supplying a windowed response to said difference output signal from said digital subtractor, said second guard interval remover responsive to said cyclic prefix detector detecting said each occurrence of a cyclic prefix for removing the current guard interval from said windowed response to said difference output signal;

first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of said first set of QAM symbols;

a first frequency-domain equalizer configured for equalizing the gains of responses thereof to the complex coordinates of respective ones of said second set of QAM symbols that convey coded data, as supplied from said first DFT computer;

a second frequency-domain equalizer configured for equalizing insofar as possible the gains of responses thereof to the complex coordinates of respective ones of said first set of QAM symbols that convey coded data, as supplied from said second DFT computer;

a first parallel-to-serial converter connected for receiving responses of said second frequency-domain channel equalizer to the complex coordinates of respective ones of said first set of QAM symbols that convey coded data, said first parallel-to-serial converter further connected for supplying the equalized complex coordinates of said respective ones of said first set of QAM symbols serially to said means for demapping said first set of QAM symbols and for demapping said second set of QAM symbols; and a second parallel-to-serial converter connected for receiving responses of said first frequency-domain channel equalizer to the complex coordinates of respective ones of said second set of QAM symbols that convey coded data, said second parallel-to-serial converter further connected for supplying the equalized complex coordinates of said respective ones of said second set of QAM symbols serially to said means for demapping said first set of QAM symbols and for demapping said second set of QAM symbols.

11. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to an analog DSB-COFDM intermediate-frequency signal;

means for supplying an in-phase beat signal and a quadrature beat signal that lags said in-phase beat-frequency signal;

a first mixer connected for heterodyning said DSB-COFDM intermediate-frequency signal with said in-phase beat signal to generate a baseband in-phase synchrodyne response;

a second mixer connected for heterodyning said DSB-COFDM intermediate-frequency signal with said quadrature beat signal to generate a baseband quadrature synchrodyne response;

a first analog-to-digital converter connected for digitizing said baseband in-phase synchrodyne response from said first mixer;

a second analog-to-digital converter connected for digitizing said baseband quadrature synchrodyne response from said second mixer;

a digital finite-impulse-response (FIR) filter for generating a Hilbert transform response to digitized said baseband quadrature synchrodyne response from said second analog-to-digital converter, said digital FIR filter having latent delay therethrough;

a clocked digital delay line for delaying the digitized baseband in-phase synchrodyne response supplied from said first analog-to-digital converter to compensate for said latent delay through said digital FIR filter;

a digital adder connected to combine the responses from said digital FIR filter and from said clocked digital delay line additively, thus to generate a digital sum signal including a baseband response to the lower sideband of said DSB-COFDM intermediate-frequency signal;

a first digital lowpass filter for lowpass filtering said digital sum signal to suppress image signal and any adjacent-channel interference that might otherwise accompany baseband response to the lower sideband of said DSB-COFDM intermediate-frequency signal in the response from said first digital lowpass filter;

a digital subtractor connected to combine the responses from said digital FIR filter and from said clocked digital delay line differentially, thus to generate a digital difference signal including a baseband response to the upper sideband of said DSB-COFDM intermediate-frequency signal;

a second digital lowpass filter for lowpass filtering said digital difference signal to suppress image signal and any adjacent-channel interference that might otherwise accompany baseband response to the upper sideband of said DSB-COFDM intermediate-frequency signal in the response from said second digital lowpass filter;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said response from said first digital lowpass filter, said first guard interval remover responsive to said cyclic prefix detector detecting each occurrence of a cyclic prefix for eliminating the current guard interval from the windowed response of that said first guard interval remover;

a second guard interval remover for supplying a windowed response to the response of said second digital lowpass filter, said second guard interval remover responsive to said cyclic prefix detector detecting said each occurrence of a cyclic prefix for eliminating the current guard interval from the windowed response of that said second guard interval remover;

first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of respective ones of said first set of QAM symbols;

a first frequency-domain equalizer configured for equalizing the gains of responses thereof to the complex coordinates of respective ones of said second set of QAM symbols that convey coded data, as supplied from said first DFT computer;

a second frequency-domain equalizer configured for equalizing the gains of responses thereof to the complex coordinates of respective ones of said first set of QAM symbols that convey coded data, as supplied from said second DFT computer;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

12. Receiver apparatus as set forth in claim 11, wherein said first mixer is a first switching mixer, wherein said second mixer is a second switching mixer, and wherein said means for supplying an in-phase beat signal and a quadrature beat signal that lags said in-phase beat-frequency signal comprises:
   a clock oscillator for supplying clock pulses at a rate four times the center frequency of said DSB-COFDM intermediate-frequency signal; and
   a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

13. Receiver apparatus as set forth in claim 1, said receiver apparatus comprising:
   a front-end tuner to provide said means for selectively receiving a DSB-COFDM radio-frequency signal and further to convert the selected one of DSB-COFDM radio-frequency signals to a digitized DSB-COFDM intermediate-frequency signal;
   a clock oscillator for supplying clock pulses at a rate four times the center frequency of said DSB-COFDM intermediate-frequency signal;
   a 2-phase divide-by-4 frequency divider connected for responding to said clock pulses to generate an in-phase first square wave and to generate a quadrature second square wave;
   a first+1/(−1) multiplier connected in effect for multiplying by +1 samples of said digitized DSB-COFDM intermediate-frequency signal as selected in response to positive-going half-cycles of said in-phase first square wave and for multiplying by −1 samples of said digitized DSB-COFDM intermediate-frequency signal as selected in response to negative-going half-cycles of said in-phase first square wave, thereby to generate a baseband in-phase synchrodyne response;
   a second+1/(−1) multiplier connected in effect for multiplying by +1 samples of said digitized DSB-COFDM intermediate-frequency signal as selected in response to negative-going half-cycles of said quadrature second square wave and for multiplying by −1 samples of said digitized DSB-COFDM intermediate-frequency signal as selected in response to positive-going half-cycles of said quadrature second square wave, thereby to generate a quadrature synchrodyne response;
   a digital finite-impulse-response (FIR) filter for generating a Hilbert transform response to said baseband quadrature synchrodyne response from said first+1/(−1) multiplier, said digital FIR filter having latent delay therethrough;
   a clocked digital delay line for delaying the baseband in-phase synchrodyne response supplied from said second to compensate for said latent delay through said digital FIR filter;
   a digital adder connected to combine the responses from said digital FIR filter and from said clocked digital delay line additively, thus to generate a sum output signal including a baseband response to the lower sideband of said DSB-COFDM intermediate-frequency signal;
   a first digital lowpass filter for lowpass filtering said digital sum signal to suppress image signal and any adjacent-channel interference that might otherwise accompany baseband response to the lower sideband of said DSB-COFDM intermediate-frequency signal in said response from said first digital lowpass filter;
   a digital subtractor connected to combine the responses from said digital FIR filter and from said clocked digital delay line differentially, thus to generate a digital difference signal including a baseband response to the upper sideband of said DSB-COFDM intermediate-frequency signal;
   a second digital lowpass filter for lowpass filtering said digital difference signal to suppress image signal and any adjacent-channel interference that might otherwise accompany baseband response to the upper sideband of said DSB-COFDM intermediate-frequency signal in said response from said second digital lowpass filter;
   a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;
   a first guard interval remover for supplying a windowed response to said response from said first digital lowpass filter, said first guard interval remover responsive to said cyclic prefix detector detecting each occurrence of a cyclic prefix for eliminating the current guard interval from the windowed response of that said first guard interval remover;
   a second guard interval remover for supplying a windowed response to the response of said second digital lowpass filter, said second guard interval remover responsive to said cyclic prefix detector detecting said each occurrence of a cyclic prefix for eliminating the current guard interval from the windowed response of that said second guard interval remover;
   first and second discrete Fourier transform (DFT) computers similar in structure, said first DFT computer connected for performing DFT on said windowed response of said first guard interval remover to generate complex coordinates of said second set of QAM symbols, said second DFT computer connected for performing DFT on said windowed response of said second guard interval remover to generate complex coordinates of said first set of QAM symbols;
   a first frequency-domain equalizer configured for equalizing the gains of responses thereof to the complex coordinates of respective ones of said second set of QAM symbols that convey coded data, as supplied from said first DFT computer;
   a second frequency-domain equalizer configured for equalizing the gains of responses thereof to the complex coordinates of respective ones of said first set of QAM symbols that convey coded data, as supplied from said second DFT computer;
   a first parallel-to-serial converter connected for receiving from said second frequency-domain channel equalizer responses thereof to the complex coordinates of said first set of QAM symbols that convey coded data, said first parallel-to-serial converter further connected for supplying the equalized complex coordinates of said first set of QAM symbols serially to said means for demapping said first set of QAM symbols and for demapping said second set of QAM symbols; and
   a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

14. Receiver apparatus as set forth in claim 1, said receiver apparatus comprising:
a front-end tuner to provide said means for selectively receiving a DSB-COFDM radio-frequency signal and further to convert the selected one of DSB-COFDM radio-frequency signals to an analog DSB-COFDM intermediate-frequency signal;
means for supplying an in-phase beat signal and a quadrature beat signal that lags said in-phase beat-frequency signal;
a first mixer connected for heterodyning said DSB-COFDM intermediate-frequency signal with said in-phase beat signal to generate a baseband in-phase synchrodyne response;
a first analog-to-digital converter connected for digitizing said baseband in-phase synchrodyne response from said first mixer;
a first digital lowpass filter connected for suppressing image signal and adjacent-channel interference in response thereof to digitized said baseband in-phase synchrodyne response from said first analog-to-digital converter;
a second mixer connected for heterodyning said DSB-COFDM intermediate-frequency signal with said quadrature beat signal to generate a baseband quadrature synchrodyne response;
a second analog-to-digital converter connected for digitizing said baseband quadrature synchrodyne response from said second mixer;
a second digital lowpass filter connected for suppressing image signal and adjacent-channel interference in response thereof to digitized said baseband quadrature synchrodyne response from said second analog-to-digital converter;
a cyclic prefix detector for detecting an occurrence of a cyclic prefix in at least one of the respective responses of said first and second digital lowpass filters;
a first guard interval remover for supplying a windowed response to said response from said second digital lowpass filter, said first guard interval remover responsive to said cyclic prefix detector detecting each occurrence of a cyclic prefix for eliminating the current guard interval from the windowed response of that said first guard interval remover;
a second guard interval remover for supplying a windowed response to the response of said first digital lowpass filter, said second guard interval remover responsive to said cyclic prefix detector detecting said each occurrence of a cyclic prefix for eliminating the current guard interval from the windowed response of that said second guard interval remover;
first and second discrete Fourier transform (DFT) computers similar in structure, said first DFT computer connected for performing DFT on said windowed response of said first guard interval removal unit, said second DFT computer connected for performing DFT on said windowed response of said second guard interval removal unit;
a parallel array of digital adders having respective first summand input ports connected for receiving complex coordinates of QAM symbols as supplied from said first DFT computer via connections Hilbert transforming the complex coordinates of said QAM symbols supplied from said first DFT computer, having respective second summand input ports connected for receiving complex coordinates of QAM symbols as supplied from said second DFT computer, said digital adders having respective sum output ports for supplying complex coordinates of a second set of QAM symbols conveyed by the lower sideband of said double-sideband COFDM intermediate-frequency signal;
a parallel array of digital subtractors having respective subtrahend input ports connected for receiving complex coordinates of QAM symbols as supplied from said first DFT computer via connections Hilbert transforming the complex coordinates of said QAM symbols supplied from said first DFT computer, having respective minuend input ports connected for receiving complex coordinates of QAM symbols as supplied from said second DFT computer, said digital subtractors having respective difference output ports for supplying complex coordinates of a first set of QAM symbols conveyed by the upper sideband of said double-sideband COFDM intermediate-frequency signal;
a first frequency-domain equalizer configured for equalizing the gains of responses thereof to the complex coordinates of respective ones of said second set of QAM symbols that convey coded data, as supplied from the sum output ports of said parallel array of digital adders;
a second frequency-domain equalizer configured for equalizing the gains of responses thereof to the complex coordinates of respective ones of said first set of QAM symbols that convey coded data, as supplied from the difference output ports of said parallel array of digital subtractors;
a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and
a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

15. Receiver apparatus as set forth in claim 14, wherein said first mixer is a first switching mixer, wherein said second mixer is a second switching mixer, and wherein said means for supplying an in-phase beat signal and a quadrature beat signal that lags said in-phase beat-frequency signal comprises:
a clock oscillator for supplying clock pulses at a rate four times the center frequency of said DSB-COFDM intermediate-frequency signal; and
a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

16. Receiver apparatus as set forth in claim 1, said receiver apparatus comprising:
a front-end tuner to provide said means for selectively receiving a DSB-COFDM radio-frequency signal and further to convert the selected one of DSB-COFDM radio-frequency signals to a digitized DSB-COFDM intermediate-frequency signal;
a clock oscillator for supplying clock pulses at a rate four times the center frequency of said DSB-COFDM intermediate-frequency signal;
a 2-phase divide-by-4 frequency divider connected for responding to said clock pulses to generate an in-phase first square wave and to generate a quadrature second square wave;
a first+1/(−1) multiplier connected in effect for multiplying by +1 samples of said digitized DSB-COFDM intermediate-frequency signal as selected in response to positive-going half-cycles of said in-phase first square wave and for multiplying by −1 samples of said digitized DSB-COFDM intermediate-frequency signal as selected in response to negative-going half-cycles of said in-phase first square wave, thereby to generate a baseband in-phase synchrodyne response;
a second+1/(−1) multiplier connected in effect for multiplying by +1 samples of said digitized DSB-COFDM intermediate-frequency signal as selected in response to negative-going half-cycles of said quadrature second square wave and for multiplying by −1 samples of said digitized DSB-COFDM intermediate-frequency signal as selected in response to positive-going half-cycles of said quadrature second square wave, thereby to generate a quadrature synchrodyne response;
a first digital lowpass filter for lowpass filtering in-phase synchrodyne response from said first+1/(−1) multiplier to suppress image signal and any adjacent-channel interference that might otherwise accompany baseband in-phase synchrodyne response from said first digital lowpass filter;
a second digital lowpass filter for lowpass filtering said quadrature synchrodyne response from said second+1/(−1) multiplier to suppress image signal and any adjacent-channel interference that might otherwise accompany baseband quadrature synchrodyne response from said second digital lowpass filter;
a cyclic prefix detector for detecting an occurrence of a cyclic prefix in at least one of the respective responses of said first and second digital lowpass filters;
a first guard interval removal unit responsive to said cyclic prefix detector detecting an occurrence of a cyclic prefix for removing the current guard interval from its windowed response to the response from said second digital lowpass filter;
a second guard interval removal unit responsive to said cyclic prefix detector detecting an occurrence of a cyclic prefix for removing the current guard interval from its windowed response to the response from said first digital lowpass filter;
first and second discrete Fourier transform (DFT) computers similar in structure, the first DFT computer connected for performing DFT on said windowed response of said first guard interval removal unit, the second DFT computer connected for performing DFT on said windowed response of said second guard interval removal unit;
a parallel array of digital adders having respective first summand input ports connected for receiving complex coordinates of QAM symbols as supplied from said first DFT computer via connections Hilbert transforming the complex coordinates of said QAM symbols supplied from said first DFT computer, having respective second summand input ports connected for receiving complex coordinates of QAM symbols as supplied from said second DFT computer, said digital adders having respective sum output ports for supplying complex coordinates of a second set of QAM symbols conveyed by the lower sideband of said double-sideband COFDM intermediate-frequency signal;
a parallel array of digital subtractors having respective subtrahend input ports connected for receiving complex coordinates of QAM symbols as supplied from said first DFT computer via connections Hilbert transforming the complex coordinates of said QAM symbols supplied from said first DFT computer, having respective minuend input ports connected for receiving complex coordinates of QAM symbols as supplied from said second DFT computer, said digital subtractors having respective difference output ports for supplying complex coordinates of a first set of QAM symbols conveyed by the upper sideband of said double-sideband COFDM intermediate-frequency signal;
a first frequency-domain equalizer configured for equalizing the gains of responses thereof to the complex coordinates of respective ones of said second set of QAM symbols that convey coded data, as supplied from the sum output ports of said parallel array of digital adders;
a second frequency-domain equalizer configured for equalizing the gains of responses thereof to the complex coordinates of respective ones of said first set of QAM symbols that convey coded data, as supplied from the difference output ports of said parallel array of digital subtractors;
a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and
a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

17. Receiver apparatus as set forth in claim 1, said receiver apparatus comprising:
a front-end tuner to provide said means for selectively receiving a DSB-COFDM radio-frequency signal and further to convert the selected one of DSB-COFDM radio-frequency signals to analog in-phase and quadrature DSB-COFDM intermediate-frequency signals;

means for supplying an in-phase beat signal and a quadrature beat signal that lags said in-phase beat-frequency signal;
a first mixer connected for heterodyning said analog in-phase DSB-COFDM intermediate-frequency signal with said in-phase beat signal to generate a baseband in-phase synchrodyne response;
a first analog-to-digital converter connected for digitizing said baseband in-phase synchrodyne response from said first mixer;
a first digital lowpass filter connected for suppressing image signal and adjacent-channel interference in its response to digitized said baseband in-phase synchrodyne response from said first analog-to-digital converter;
a second mixer connected for heterodyning said analog quadrature DSB-COFDM intermediate-frequency signal with said quadrature beat signal to generate a baseband quadrature synchrodyne response;
a second analog-to-digital converter connected for digitizing said baseband quadrature synchrodyne response from said second mixer;
a second digital lowpass filter connected for suppressing image signal and adjacent-channel interference in its response to digitized said baseband quadrature synchrodyne response from said second analog-to-digital converter;
a digital adder connected to combine the response from said first digital lowpass filter and the response from said second digital lowpass filter additively, thus to generate a sum output signal providing a baseband response to the lower sideband of said DSB-COFDM intermediate-frequency signal;
a digital subtractor connected to combine the response from said first digital lowpass filter and the response from said second digital lowpass filter differentially, thus to generate a difference output signal providing a baseband response to the upper sideband of said DSB-COFDM intermediate-frequency signal;
a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;
a first guard interval remover for supplying a windowed response to said sum output signal from said digital adder, said first guard interval remover responsive to said cyclic prefix detector detecting each occurrence of a cyclic prefix for eliminating the current guard interval from said windowed response supplied by said first guard interval remover;
a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;
first and second discrete Fourier transform (DFT) computers similar in structure, said first DFT computer connected for performing DFT on said windowed response of said first guard interval remover to generate complex coordinates of said second set of QAM symbols, said second DFT computer connected for performing DFT on said windowed response of said second guard interval remover to generate complex coordinates of said first set of QAM symbols;
a first frequency-domain equalizer configured for equalizing the gains of responses thereof to the complex coordinates of respective ones of said second set of QAM symbols that convey coded data, as supplied from said first DFT computer;
a second frequency-domain equalizer configured for equalizing the gains of responses thereof to the complex coordinates of respective ones of said first set of QAM symbols that convey coded data, as supplied from said second DFT computer;
a first parallel-to-serial converter connected for receiving from said second frequency-domain channel equalizer responses to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and
a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

18. Receiver apparatus as set forth in claim 17, wherein said first mixer is a first switching mixer, wherein said second mixer is a second switching mixer, and wherein said means for supplying an in-phase beat signal and a quadrature beat signal that lags said in-phase beat-frequency signal comprises:
a clock oscillator for supplying clock pulses at a rate four times the center frequency of said DSB-COFDM intermediate-frequency signal; and
a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

19. Receiver apparatus as set forth in claim 1, said receiver apparatus comprising:
a front-end tuner to provide said means for selectively receiving a DSB-COFDM radio-frequency signal and further to convert the selected one of DSB-COFDM radio-frequency signals to a digitized in-phase DSB-COFDM intermediate-frequency signal and to a digitized quadrature DSB-COFDM intermediate-frequency signal;
a clock oscillator for supplying clock pulses at a rate four times the center frequency of said DSB-COFDM intermediate-frequency signal;
a 2-phase divide-by-4 frequency divider connected for responding to said clock pulses to generate an in-phase first square wave and to generate a quadrature second square wave;
a first+1/(−1) multiplier connected in effect for multiplying by +1 samples of said digitized in-phase DSB-COFDM intermediate-frequency signal as selected in response to positive-going half-cycles of said in-phase first square wave and for multiplying by −1 samples of said digitized in-phase DSB-COFDM intermediate-frequency signal as selected in response to negative-going half-cycles of said in-phase first square wave, thereby to generate a baseband in-phase synchrodyne response;

a second+1/(−1) multiplier connected in effect for multiplying by +1 samples of said digitized quadrature DSB-COFDM intermediate-frequency signal as selected in response to negative-going half-cycles of said quadrature second square wave and for multiplying by −1 samples of said digitized quadrature DSB-COFDM intermediate-frequency signal as selected in response to positive-going half-cycles of said quadrature second square wave, thereby to generate a baseband quadrature synchrodyne response;

a first digital lowpass filter for lowpass filtering said in-phase synchrodyne response from said first+1/(−1) multiplier to suppress image signal and any adjacent-channel interference that might otherwise accompany baseband in-phase synchrodyne response from said first digital lowpass filter;

a second digital lowpass filter for lowpass filtering said quadrature synchrodyne response from said second+1/(−1) multiplier to suppress image signal and any adjacent-channel interference that might otherwise accompany baseband quadrature synchrodyne response from said second digital lowpass filter;

a digital adder connected to combine the response from said first digital lowpass filter and the response from said second digital lowpass filter additively, thus to generate a sum output signal providing a baseband response to the lower sideband of said DSB-COFDM intermediate-frequency signal;

a digital subtractor connected to combine the response from said first digital lowpass filter and the response from said second digital lowpass filter differentially, thus to generate a difference output signal providing a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting each occurrence of a cyclic prefix for eliminating the current guard interval from said windowed response supplied by said first guard interval remover;

a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;

first and second discrete Fourier transform (DFT) computers similar in structure, said first DFT computer connected for performing DFT on said windowed response of said first guard interval remover to generate complex coordinates of said second set of QAM symbols, said second DFT computer connected for performing DFT on said windowed response of said second guard interval remover to generate complex coordinates of said first set of QAM symbols;

a first frequency-domain equalizer configured for equalizing the gains of responses thereof to the complex coordinates of respective ones of said second set of QAM symbols that convey coded data, as supplied from said first DFT computer;

a second frequency-domain equalizer configured for equalizing the gains of responses thereof to the complex coordinates of respective ones of said first set of QAM symbols that convey coded data, as supplied from said second DFT computer;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

20. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to an analog DSB-COFDM intermediate-frequency signal;

means for supplying an in-phase beat signal and a quadrature beat signal that lags said in-phase beat-frequency signal;

a first mixer connected for heterodyning said DSB-COFDM intermediate-frequency signal with said in-phase beat signal to generate a baseband in-phase synchrodyne response;

a second mixer connected for heterodyning said DSB-COFDM intermediate-frequency signal with said quadrature beat signal to generate a baseband quadrature synchrodyne response;

a first analog-to-digital converter connected for digitizing said baseband in-phase synchrodyne response from said first mixer;

a second analog-to-digital converter connected for digitizing said baseband quadrature synchrodyne response from said second mixer;

a digital finite-impulse-response (FIR) filter for generating a Hilbert transform response to digitized said baseband quadrature synchrodyne response from said second analog-to-digital converter, said digital FIR filter having latent delay therethrough;

a clocked digital delay line for delaying the digitized baseband in-phase synchrodyne response supplied from said first analog-to-digital converter to compensate for said latent delay through said digital FIR filter;

a digital adder connected to combine the responses from said digital FIR filter and from said clocked digital delay line additively to recover a digital sum signal including baseband response to the lower sideband of said DSB-COFDM intermediate-frequency signal;

a digital subtractor connected to combine the responses from said digital FIR filter and from said clocked digital delay line differentially to recover a digital difference signal including a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting each occurrence of a cyclic prefix for eliminating the current guard interval from said windowed response supplied by said first guard interval remover;

a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;

first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of respective ones of said first set of QAM symbols;

a first frequency-domain equalizer configured for equalizing the gains of responses thereof to the complex coordinates of respective ones of said second set of QAM symbols that convey coded data, as supplied from said first DFT computer;

a second frequency-domain equalizer configured for equalizing the gains of responses thereof to the complex coordinates of respective ones of said first set of QAM symbols that convey coded data, as supplied from said second DFT computer;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

21. Receiver apparatus as set forth in claim 20, wherein said first mixer is a first switching mixer, wherein said second mixer is a second switching mixer, and wherein said means for supplying an in-phase beat signal and a quadrature beat signal that lags said in-phase beat-frequency signal comprises:

a clock oscillator for supplying clock pulses at a rate four times the center frequency of said DSB-COFDM intermediate-frequency signal; and a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

22. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to a digitized DSB-COFDM intermediate-frequency signal;

a clock oscillator for supplying clock pulses at a rate four times the center frequency of said DSB-COFDM intermediate-frequency signal;

a 2-phase divide-by-4 frequency divider connected for responding to said clock pulses to generate an in-phase first square wave and to generate a quadrature second square wave;

a first+1/(−1) multiplier connected in effect for multiplying by +1 samples of said digitized DSB-COFDM intermediate-frequency signal as selected in response to positive-going half-cycles of said in-phase first square wave and for multiplying by −1 samples of said digitized DSB-COFDM intermediate-frequency signal as selected in response to negative-going half-cycles of said in-phase first square wave, thereby to generate a baseband in-phase synchrodyne response;

a second+1/(−1) multiplier connected in effect for multiplying by +1 samples of said digitized DSB-COFDM intermediate-frequency signal as selected in response to negative-going half-cycles of said quadrature second square wave and for multiplying by −1 samples of said digitized DSB-COFDM intermediate-frequency signal as selected in response to positive-going half-cycles of said quadrature second square wave, thereby to generate a quadrature synchrodyne response;

a digital finite-impulse-response (FIR) filter for generating a Hilbert transform response to said baseband quadrature synchrodyne response from said first+1/(−1) multiplier, said digital FIR filter having latent delay therethrough;

a clocked digital delay line for delaying the baseband in-phase synchrodyne response supplied from said second to compensate for said latent delay through said digital FIR filter;

a digital adder connected to combine the responses from said digital FIR filter and from said clocked digital delay line additively thus to generate a baseband response to the lower sideband of said DSB-COFDM intermediate-frequency signal;

a digital subtractor connected to combine the responses from said digital FIR filter and from said clocked digital delay line differentially thus to generate a digital difference signal including a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting the each occurrence of a cyclic prefix for eliminating the current guard interval from said windowed response supplied by said first guard interval remover;

a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;

first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of respective ones of said first set of QAM symbols;

a first frequency-domain equalizer configured for equalizing the gains of responses said second set of QAM symbols that convey coded data, as supplied from said first DFT computer;

a second frequency-domain equalizer configured for equalizing the gains of responses thereof to the complex coordinates of respective ones of said first set of QAM symbols that convey coded data, as supplied from said second DFT computer;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

23. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to an analog DSB-COFDM intermediate-frequency signal;

means for supplying an in-phase beat signal and a quadrature beat signal that lags said in-phase beat-frequency signal;

a first mixer connected for heterodyning said DSB-COFDM intermediate-frequency signal with said in-phase beat signal to generate a baseband in-phase synchrodyne response;

a first analog-to-digital converter connected for digitizing said baseband in-phase synchrodyne response from said first mixer;

a second mixer connected for heterodyning said DSB-COFDM intermediate-frequency signal with said quadrature beat signal to generate a baseband quadrature synchrodyne response;

a second analog-to-digital converter connected for digitizing said baseband quadrature synchrodyne response from said second mixer;

a cyclic prefix detector for detecting an occurrence of a cyclic prefix in at least one of the respective responses of said first and second analog-to-digital converters;

a first guard interval removal unit for generating a windowed response to digitized baseband in-phase synchrodyne response from said second analog-to-digital converter, said first guard interval removal unit responsive to said cyclic prefix detector detecting each occurrence of a cyclic prefix for eliminating the current guard interval from said windowed response generated by said first analog-to-digital converter;

a second guard interval removal unit for generating a windowed response to digitized baseband quadrature synchrodyne response from said first analog-to-digital converter, said second guard interval removal unit responsive to said cyclic prefix detector detecting each occurrence of a cyclic prefix for eliminating the current guard interval from said windowed response generated by said second analog-to-digital converter;

first and second discrete Fourier transform (DFT) computers similar in structure, said first DFT computer connected for performing DFT on said windowed response of said first guard interval removal unit, said second DFT computer connected for performing DFT on said windowed response of said second guard interval removal unit;

a parallel array of digital adders having respective first summand input ports connected for receiving complex coordinates of QAM symbols as supplied from said first DFT computer via connections Hilbert transforming the complex coordinates of respective ones of said QAM symbols supplied from said first DFT computer, having respective second summand input ports connected for receiving complex coordinates of respective ones of QAM symbols as supplied from said second DFT computer, said digital adders having respective sum output ports for supplying complex coordinates of respective ones of a second set of QAM symbols conveyed by the lower sideband of said double-sideband COFDM intermediate-frequency signal;

a parallel array of digital subtractors having respective subtrahend input ports connected for receiving complex coordinates of QAM symbols as supplied from said first DFT computer via connections Hilbert transforming the complex coordinates of said QAM symbols supplied from said first DFT computer, having respective minuend input ports connected for receiving complex coordinates of QAM symbols as supplied from said second DFT computer, said digital subtractors having respective difference output ports for supplying complex coordinates of respective ones of a first set of QAM symbols conveyed by the upper sideband of said double-sideband COFDM intermediate-frequency signal;

a first frequency-domain equalizer configured for equalizing the gains of responses thereof to the complex coordinates of respective ones of said second set of QAM symbols that convey coded data, as supplied from the sum output ports of said parallel array of digital adders;

a second frequency-domain equalizer configured for equalizing the gains of responses thereof to the complex coordinates of respective ones of said first set of QAM symbols that convey coded data, as supplied from the difference output ports of said parallel array of digital subtractors;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

24. Receiver apparatus as set forth in claim 23, wherein said first mixer is a first switching mixer, wherein said second mixer is a second switching mixer, and wherein said means for supplying an in-phase beat signal and a quadrature beat signal that lags said in-phase beat-frequency signal comprises:

a clock oscillator for supplying clock pulses at a rate four times the center frequency of said DSB-COFDM intermediate-frequency signal; and a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

25. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to a digitized DSB-COFDM intermediate-frequency signal;

a clock oscillator for supplying clock pulses at a rate four times the center frequency of said DSB-COFDM intermediate-frequency signal;

a 2-phase divide-by-4 frequency divider connected for responding to said clock pulses to generate an in-phase first square wave and to generate a quadrature second square wave;

a first+1/(−1) multiplier connected in effect for multiplying by +1 samples of said digitized DSB-COFDM intermediate-frequency signal as selected in response to positive-going half-cycles of said in-phase first square wave and for multiplying by −1 samples of said digitized DSB-COFDM intermediate-frequency signal as selected in response to negative-going half-cycles of said in-phase first square wave, thereby to generate a baseband in-phase synchrodyne response;

a second+1/(−1) multiplier connected in effect for multiplying by +1 samples of said digitized DSB-COFDM intermediate-frequency signal as selected in response to negative-going half-cycles of said quadrature second square wave and for multiplying by −1 samples of said digitized DSB-COFDM intermediate-frequency signal as selected in response to positive-going half-cycles of said quadrature second square wave, thereby to generate a quadrature synchrodyne response;

a cyclic prefix detector for detecting an occurrence of a cyclic prefix in at least one of said baseband in-phase synchrodyne response and said baseband quadrature synchrodyne response;

a first guard interval removal unit for supplying a windowed response to said baseband quadrature synchrodyne response from said second+1/(−1) multiplier, said first guard interval removal unit responsive to said cyclic prefix detector detecting each occurrence of a cyclic prefix for removing the current guard interval from said windowed response to said baseband quadrature synchrodyne response;

a second guard interval removal unit for supplying a windowed response to said baseband in-phase synchrodyne response from said first+1/(−1) multiplier, said second guard interval removal unit responsive to said cyclic prefix detector detecting each occurrence of a cyclic prefix for eliminating the current guard interval from said windowed response to said baseband in-phase synchrodyne response;

first and second discrete Fourier transform (DFT) computers similar in structure, said first DFT computer connected for performing DFT on said windowed response of said first guard interval removal unit, said second DFT computer connected for performing DFT on said windowed response of said second guard interval removal unit;

a parallel array of digital adders having respective first summand input ports connected for receiving complex coordinates of QAM symbols as supplied from said first DFT computer via connections Hilbert transforming the complex coordinates of said QAM symbols supplied from said first DFT computer, having respective second summand input ports connected for receiving complex coordinates of QAM symbols as supplied from said second DFT computer, said digital adders having respective sum output ports for supplying complex coordinates of a second set of QAM symbols conveyed by the lower sideband of said double-sideband COFDM intermediate-frequency signal;

a parallel array of digital subtractors having respective subtrahend input ports connected for receiving complex coordinates of QAM symbols as supplied from said first DFT computer via connections Hilbert transforming the complex coordinates of said QAM symbols supplied from said first DFT computer, having respective minuend input ports connected for receiving complex coordinates of QAM symbols as supplied from said second DFT computer, said digital subtractors having respective difference output ports for supplying complex coordinates of a first set of QAM symbols conveyed by the upper sideband of said double-sideband COFDM intermediate-frequency signal;

a first frequency-domain equalizer configured for equalizing the gains of responses thereof to the complex coordinates of respective ones of said second set of QAM symbols that convey coded data, as supplied from the sum output ports of said parallel array of digital adders;

a second frequency-domain equalizer configured for equalizing the gains of responses thereof to the complex coordinates of respective ones of said first set of QAM symbols that convey coded data, as supplied from the difference output ports of said parallel array of digital subtractors;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

26. Receiver apparatus as set forth in claim 1, said receiver apparatus comprising:

a front-end tuner to provide said means for selectively receiving a DSB-COFDM radio-frequency signal and further to convert the selected one of DSB-COFDM radio-frequency signals to analog in-phase and quadrature DSB-COFDM intermediate-frequency signals;

means for supplying an in-phase beat signal and a quadrature beat signal that lags said in-phase beat-frequency signal;

a first mixer connected for heterodyning said analog in-phase DSB-COFDM intermediate-frequency signal with said in-phase beat signal to generate a baseband in-phase synchrodyne response;

a first analog-to-digital converter connected for digitizing said baseband in-phase synchrodyne response from said first mixer;

a second mixer connected for heterodyning said analog quadrature DSB-COFDM intermediate-frequency signal with said quadrature beat signal to generate a baseband quadrature synchrodyne response;

a second analog-to-digital converter connected for digitizing said baseband quadrature synchrodyne response from said second mixer;

a digital adder connected to combine the response from said first analog-to-digital converter and the response from said second analog-to-digital converter additively, thus to generate a sum output signal providing a baseband response to the lower sideband of said DSB-COFDM intermediate-frequency signal;

a digital subtractor connected to combine the response from said first analog-to-digital converter and the response from said second analog-to-digital converter differentially, thus to generate a difference output signal providing a baseband response to the upper sideband of said DSB-COFDM intermediate-frequency signal;

a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;

a first guard interval remover for supplying a windowed response to said sum output signal from said digital adder, said first guard interval remover responsive to said cyclic prefix detector detecting the each occurrence of a cyclic prefix for eliminating the current guard interval from said windowed response supplied by said first guard interval remover;

a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;

first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of respective ones of said first set of QAM symbols;

a first frequency-domain equalizer configured for equalizing the gains of responses thereof to the complex coordinates of respective ones of said second set of QAM symbols that convey coded data, as supplied from said first DFT computer;

a second frequency-domain equalizer configured for equalizing the gains of responses thereof to the complex coordinates of respective ones of said first set of QAM symbols that convey coded data, as supplied from said second DFT computer;

a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

27. Receiver apparatus as set forth in claim 26, wherein said first mixer is a first switching mixer, wherein said second mixer is a second switching mixer, and wherein said means for supplying an in-phase beat signal and a quadrature beat signal that lags said in-phase beat-frequency signal comprises:
   a clock oscillator for supplying clock pulses at a rate four times the center frequency of said DSB-COFDM intermediate-frequency signal; and
   a 2-phase divide-by-4 frequency divider connected for responding to said clock pulses to generate a leading first square wave for application to said first switching mixer as said in-phase beat signal and to generate a lagging second square wave for application to said second switching mixer as said quadrature beat signal.

28. Receiver apparatus as set forth in claim 1, said receiver apparatus comprising:
   a front-end tuner to provide said means for selectively receiving a DSB-COFDM radio-frequency signal and further to convert the selected one of DSB-COFDM radio-frequency signals to a digitized in-phase DSB-COFDM intermediate-frequency signal and to a digitized quadrature DSB-COFDM intermediate-frequency signal;
   a clock oscillator for supplying clock pulses at a rate four times the center frequency of said DSB-COFDM intermediate-frequency signal;
   a 2-phase divide-by-4 frequency divider connected for responding to said clock pulses to generate an in-phase first square wave and to generate a quadrature second square wave;
   a first+1/(−1) multiplier connected in effect for multiplying by +1 samples of said digitized in-phase DSB-COFDM intermediate-frequency signal as selected in response to positive-going half-cycles of said in-phase first square wave and for multiplying by −1 samples of said digitized in-phase DSB-COFDM intermediate-frequency signal as selected in response to negative-going half-cycles of said in-phase first square wave, thereby to generate a baseband in-phase synchrodyne response;
   a second+1/(−1) multiplier connected in effect for multiplying by +1 samples of said digitized quadrature DSB-COFDM intermediate-frequency signal as selected in response to negative-going half-cycles of said quadrature second square wave and for multiplying by −1 samples of said digitized quadrature DSB-COFDM intermediate-frequency signal as selected in response to positive-going half-cycles of said quadrature second square wave, thereby to generate a baseband quadrature synchrodyne response;
   a digital adder connected to combine the response from said first+1/(−1) multiplier and the response from said second+1/(−1) multiplier additively to recover a baseband response to the lower sideband of said DSB-COFDM intermediate-frequency signal;
   a digital subtractor connected to combine the response from said first+1/(−1) multiplier and the response from said second+1/(−1) multiplier differentially to recover a baseband response to the upper sideband of said DSB-COFDM intermediate-frequency signal;
   a cyclic prefix detector connected for detecting occurrences of cyclic prefixes in at least one of the respective baseband responses to the upper sideband of said DSB-COFDM intermediate-frequency signal and to the lower sideband of said DSB-COFDM intermediate-frequency signal;
   a first guard interval remover for supplying a windowed response to said sum output signal from said digital adder, said first guard interval remover responsive to said cyclic prefix detector detecting each occurrence of a cyclic prefix for eliminating the current guard interval from said windowed response supplied by said first guard interval remover;
   a second guard interval remover for supplying a windowed response to said difference output signal from said digital subtractor, said second guard interval remover responsive to said cyclic prefix detector detecting said each occurrence of a cyclic prefix for eliminating the current guard interval from said windowed response supplied by said second guard interval remover;
   first and second discrete Fourier transform (DFT) computers similar in structure, said first DFT computer connected for performing DFT on said windowed response of said first guard interval remover to generate complex coordinates of respective ones of said second set of QAM symbols, said second DFT computer connected for performing DFT on said windowed response of said second guard interval remover to generate complex coordinates of respective ones of said first set of QAM symbols;
   a first frequency-domain equalizer configured for equalizing the gains of responses thereof to the complex coordinates of respective ones of said second set of QAM symbols that convey coded data, as supplied from said first DFT computer;
   a second frequency-domain equalizer configured for equalizing the gains of responses thereof to the complex coordinates of respective ones of said first set of QAM symbols that convey coded data, as supplied from said second DFT computer;
   a first parallel-to-serial converter connected for receiving from said second frequency-domain channel equalizer responses thereof to the complex coordinates of respective ones of said first set of QAM symbols that convey coded data, said first parallel-to-serial converter further connected for supplying the equalized complex coordinates of respective ones of said first set of QAM symbols serially to said means for demapping said first set of QAM symbols and for demapping said second set of QAM symbols; and
   a second parallel-to-serial converter connected for receiving from said first frequency-domain channel equalizer responses thereof to the complex coordinates of respective ones of said second set of QAM symbols that convey coded data, said second parallel-to-serial converter further connected for supplying the equalized complex coordinates of respective ones of said second set of QAM symbols serially to said means for demapping said first set of QAM symbols and for demapping said second set of QAM symbols.

29. Receiver apparatus for double-sideband coded orthogonal frequency-division modulation (COFDM) radio-frequency signals, said receiver apparatus comprising:
   means for selectively receiving a double-sideband coded orthogonal frequency-division modulation (DSB-COFDM) radio-frequency signal;

means for developing a first set of QAM symbols descriptive of the discrete Fourier transform of COFDM carriers from the upper sideband of the selectively received DSB-COFDM radio-frequency signal;

means for developing a second set of QAM symbols descriptive of the discrete Fourier transform of COFDM carriers from the lower sideband of the selectively received DSB-COFDM radio-frequency signal;

means for serially arranging said first set of QAM symbols in each COFDM symbol according to ascending spectral order of COFDM carriers in said upper sideband of said selectively received double-sideband coded orthogonal frequency-division modulation radio-frequency signal;

means for serially arranging said second set of QAM symbols in each COFDM symbol according to descending spectral order of COFDM carriers in said lower sideband of said selectively received DSB-COFDM radio-frequency signal;

means for demapping said first set of QAM symbols as thus serially arranged to recover a first succession of QAM symbol map labels in soft-bit format and for demapping said second set of QAM symbols as thus serially arranged to recover a second succession of QAM symbol map labels in soft-bit format; and a diversity combiner of corresponding QAM symbol map labels in said first and second successions thereof, thereby to reproduce soft bits of coded data.

30. Receiver apparatus as set forth in claim 29, wherein said diversity combiner comprises:

a maximal-ratio combiner for combining corresponding soft bits of said first succession of QAM symbol map labels and of said second succession of QAM symbol map labels based on their respective likelihoods of being correct;

a first adjuster for reducing the respective likelihoods of selected ones of said first succession of QAM symbol map labels being correct before supplying them to said maximal-ratio combiner, said selected ones of said first succession of QAM symbol map labels being those of said first set of QAM symbols that are out of normal amplitude range; and a second adjuster for reducing the respective likelihoods of selected ones of said second succession of QAM symbol map labels being correct before supplying them to said maximal-ratio combiner, said selected ones of said second succession of QAM symbol map labels being those of said second set of QAM symbols that are out of normal amplitude range.

* * * * *